United States Patent
Kent et al.

(10) Patent No.: US 11,926,548 B2
(45) Date of Patent: *Mar. 12, 2024

(54) FLOW CONTROL RISER WITHIN A STORMWATER TREATMENT SYSTEM

(71) Applicant: Bio Clean Environmental Services, Inc., Irving, TX (US)

(72) Inventors: Greg B. Kent, Boerne, TX (US); Zachariha J. Kent, Fair Oaks Ranch, TX (US); Anthony Spolar, San Diego, CA (US)

(73) Assignee: Bio Clean Environmental Services, Inc., Carlsbad, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/984,020

(22) Filed: Aug. 3, 2020

(65) Prior Publication Data

US 2021/0155518 A1 May 27, 2021

Related U.S. Application Data

(60) Provisional application No. 62/939,634, filed on Nov. 24, 2019.

(51) Int. Cl.
*C02F 3/04* (2023.01)
*C02F 3/10* (2023.01)
(Continued)

(52) U.S. Cl.
CPC .............. *C02F 3/327* (2013.01); *C02F 3/046* (2013.01); *C02F 3/104* (2013.01); *C02F 2103/001* (2013.01)

(58) Field of Classification Search
CPC ......... E03F 5/0404; E03F 5/101; E03F 5/103; E03F 5/106; E03F 5/14; C02F 3/046;
(Continued)

(56) References Cited

U.S. PATENT DOCUMENTS

| 1,793,599 A | 2/1931 | Egan |
| 2,118,157 A | 12/1934 | Camp |

(Continued)

FOREIGN PATENT DOCUMENTS

| CA | 2684057 | 2/2015 |
| DE | 4341805 C1 | 1/1995 |

(Continued)

OTHER PUBLICATIONS

Nagasaka Yuji; Shinko Tsushokk, "Rainwater filter and maintaining method for its device and rainwater filtering method and its controlling equipment", Translation 5132993 (Original Doc. published May 28, 1993), 6 pages.

(Continued)

*Primary Examiner* — Joseph W Drodge
(74) *Attorney, Agent, or Firm* — THOMPSON HINE, LLP

(57) ABSTRACT

A horizontal flow water treatment method and wetland biofilter system with improved flow control via a tubular apparatus and further comprising a chamber with impermeable outer walls spaced away from permeable interior walls of a media filtration bed such that a catch basin is formed between the outer walls and the interior walls. The catch basin creates an open area around the perimeter of the interior walls for influent water to fill within the open area on all sides before penetrating the filtration media, providing a large surface area for influent water to interact with the media filtration bed. The influent water enters the catch basin in a horizontal flow path to provide for pre-settling of particulates before making contact with the filtration media. The biofilter design increases the available surface area of the media filtration bed by up to four times for a given volume of water, and thereby minimizes the loading or infiltration rate on the media filtration bed.

22 Claims, 41 Drawing Sheets

(51) Int. Cl.
*C02F 3/32* (2023.01)
*C02F 103/00* (2006.01)

(58) Field of Classification Search
CPC .. C02F 3/06; C02F 3/327; C02F 3/104; C02F 2103/001; C02F 1/281; C02F 1/283; C02F 1/285; C02F 1/286; C02F 2101/306; C02F 2101/32; C02F 2201/004; Y02W 10/10; B01D 24/38; B01D 24/42; B01D 24/425
USPC ................ 210/150, 151, 170.03, 602, 747.3
See application file for complete search history.

(56) References Cited

U.S. PATENT DOCUMENTS

| | | | | |
|---|---|---|---|---|
| 4,225,434 | A | 9/1980 | Ernst et al. | |
| 4,522,533 | A * | 6/1985 | Campbell | E03F 5/106 405/40 |
| 4,833,083 | A | 5/1989 | Saxena | |
| 4,999,111 | A | 3/1991 | Williamson | |
| 5,087,362 | A | 2/1992 | Brown | |
| 5,174,897 | A | 12/1992 | Wengrzynek | |
| 5,198,113 | A | 3/1993 | Daniels | |
| 5,437,786 | A | 8/1995 | Horsley et al. | |
| 5,486,291 | A | 1/1996 | Todd et al. | |
| 5,549,817 | A | 8/1996 | Horsley et al. | |
| 5,573,671 | A | 11/1996 | Klein | |
| 5,653,255 | A | 8/1997 | Platz | |
| 5,702,593 | A | 12/1997 | Horsley et al. | |
| 5,893,975 | A | 4/1999 | Eifert | |
| 5,951,866 | A | 9/1999 | Grove et al. | |
| 6,077,423 | A * | 6/2000 | Roy | E03F 5/14 210/170.03 |
| 6,467,994 | B1 | 10/2002 | Ankeny et al. | |
| 6,569,321 | B2 | 5/2003 | Coffman | |
| 6,592,761 | B2 | 7/2003 | Wofford | |
| 6,638,424 | B2 | 10/2003 | Stever et al. | |
| 6,649,048 | B2 * | 11/2003 | de Ridder | E03F 5/125 210/170.03 |
| 6,652,743 | B2 | 11/2003 | Wallace et al. | |
| 6,905,599 | B2 | 6/2005 | Allard | |
| 7,108,783 | B2 * | 9/2006 | Glazik | E03F 5/0404 210/170.03 |
| 7,200,405 | B2 | 4/2007 | Rudolf et al. | |
| 7,388,664 | B2 | 6/2008 | Oldham | |
| 7,425,261 | B2 | 9/2008 | Siviter et al. | |
| 7,425,262 | B1 | 9/2008 | Kent | |
| 7,470,362 | B2 | 12/2008 | Kent | |
| 7,497,234 | B2 | 3/2009 | Robinson | |
| 7,674,378 | B2 | 3/2010 | Kent | |
| 7,967,979 | B2 * | 6/2011 | Grewal | C02F 3/327 210/170.03 |
| 8,303,816 | B2 * | 11/2012 | Kent | C02F 3/327 210/170.03 |
| 8,333,885 | B1 * | 12/2012 | Iorio | C02F 3/327 210/170.03 |
| 8,535,533 | B2 | 9/2013 | Allard | |
| 8,545,696 | B2 * | 10/2013 | Tyner | E03F 5/106 210/170.03 |
| 8,771,515 | B2 * | 7/2014 | Kent | C02F 3/327 210/170.03 |
| 8,940,170 | B2 * | 1/2015 | Kent | C02F 3/327 210/170.03 |
| 9,409,805 | B2 * | 8/2016 | Kent | C02F 3/327 |
| 9,962,638 | B1 * | 5/2018 | Tucker | B01D 35/02 |
| 10,294,135 | B2 * | 5/2019 | Kent | C02F 3/327 |
| 11,053,147 | B2 * | 7/2021 | Kent | C02F 3/327 |
| 2003/0024874 | A1 | 2/2003 | Wallace et al. | |
| 2003/0047509 | A1 | 3/2003 | Whitehill | |
| 2003/0159989 | A1 | 8/2003 | Davis et al. | |
| 2004/0074846 | A1 | 4/2004 | Stever et al. | |
| 2004/0173522 | A1 | 9/2004 | Allard | |
| 2005/0183997 | A1 | 8/2005 | Happel et al. | |
| 2006/0078387 | A1 * | 4/2006 | Allard | E03F 5/0404 405/45 |
| 2006/0151387 | A1 | 7/2006 | Yost et al. | |
| 2006/0180546 | A1 | 8/2006 | Stuth, Sr. et al. | |
| 2008/0073277 | A1 * | 3/2008 | Paoluccio | E03F 5/0404 210/163 |
| 2008/0142438 | A1 * | 6/2008 | Kent | C02F 3/327 210/170.03 |
| 2009/0045145 | A1 | 2/2009 | Kent et al. | |
| 2009/0133582 | A1 | 5/2009 | Snowball | |
| 2011/0100904 | A1 | 5/2011 | Baron et al. | |
| 2011/0186492 | A1 | 8/2011 | Holtz | |
| 2013/0180903 | A1 | 7/2013 | Kowalsky | |
| 2013/0292315 | A1 | 11/2013 | Duncan | |
| 2014/0305856 | A1 * | 10/2014 | Deskins | B01D 24/40 210/205 |
| 2021/0017041 | A1 * | 1/2021 | Kent | E03F 5/14 |
| 2021/0114905 | A1 * | 4/2021 | Kent | C02F 3/327 |
| 2022/0134260 | A1 * | 5/2022 | Mason | B01D 24/002 210/266 |
| 2022/0144677 | A1 * | 5/2022 | Kent | C02F 3/327 |

FOREIGN PATENT DOCUMENTS

| | | |
|---|---|---|
| JP | S60-92527 A | 5/1985 |
| JP | 5132993 A | 5/1993 |
| KR | 200317493 Y1 | 6/2003 |
| KR | 10-0402625 B1 | 10/2003 |
| KR | 10-0706269 B1 | 4/2007 |
| WO | WO2004050823 A1 | 6/2004 |
| WO | 2007015109 A2 | 2/2007 |
| WO | 2008127479 | 10/2008 |

OTHER PUBLICATIONS

Hans-Ulrich Dipl Ing Klein, "Process and apparatus for the biological purification of water", Translation 4341805 (Original Doc. published Jan. 19, 1995), 18 pages.

No applicant nor title translated in English, Translation 200317493 (Original Doc. published Jun. 25, 2003), 6 pages.

Bluegreennllink Co LTD; Oh Jae Il, "Apparatus for Purifying Runoff", Translation 10-0402625 B1 (Original Doc. published Oct. 8, 2003), 25 pages.

Environmental Facilities Man Co, "A containment purification apparatus of non-point sources by the early stage storm runoff", Translation 10-0706269 B1 (Original Doc. published Apr. 12, 2007), 9 pages.

World Intellectual Property Office, "Written Opinion and International Search Report" PCT/US2007/088635, 8 pages, (Published 2007).

* cited by examiner

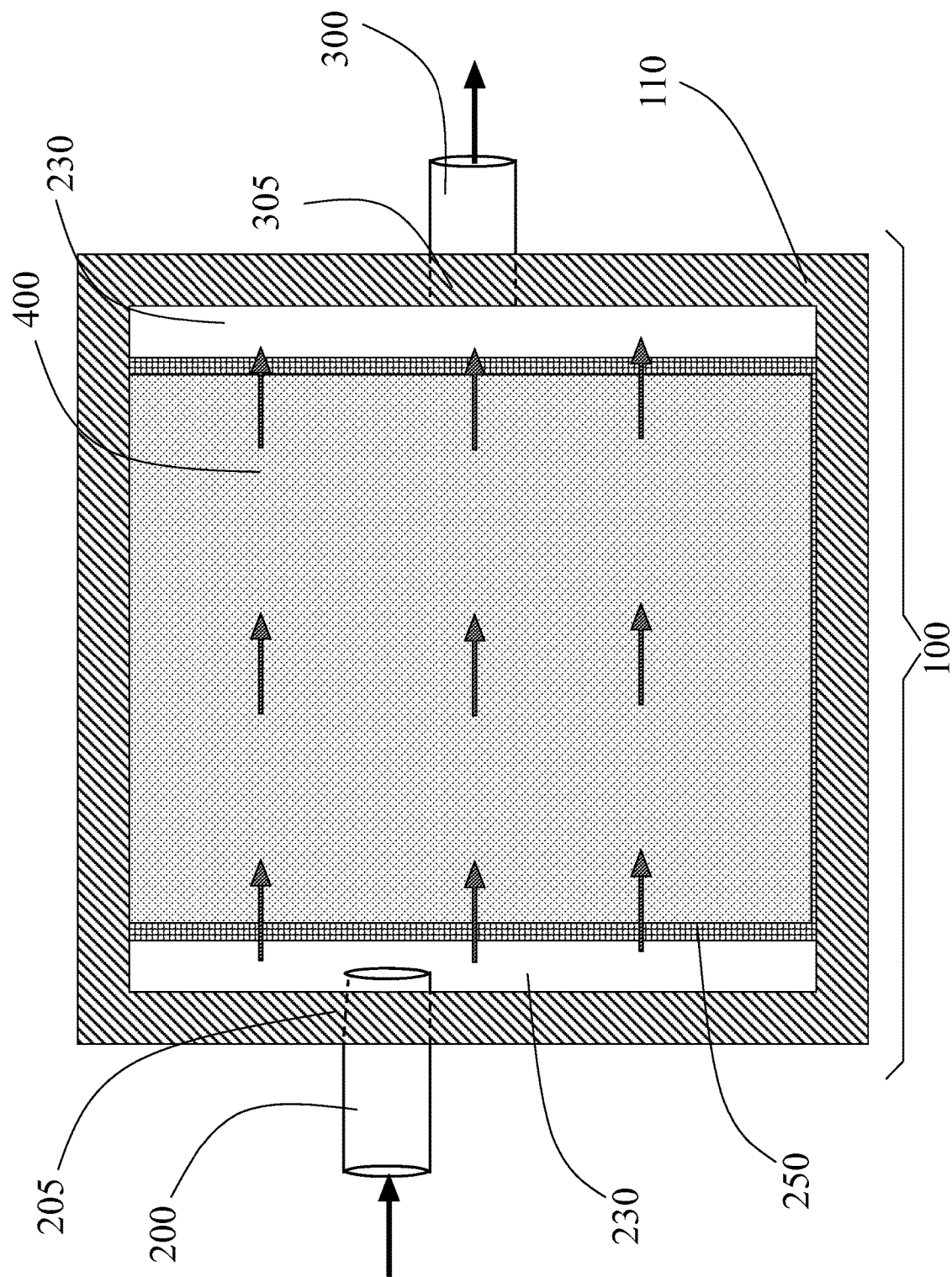

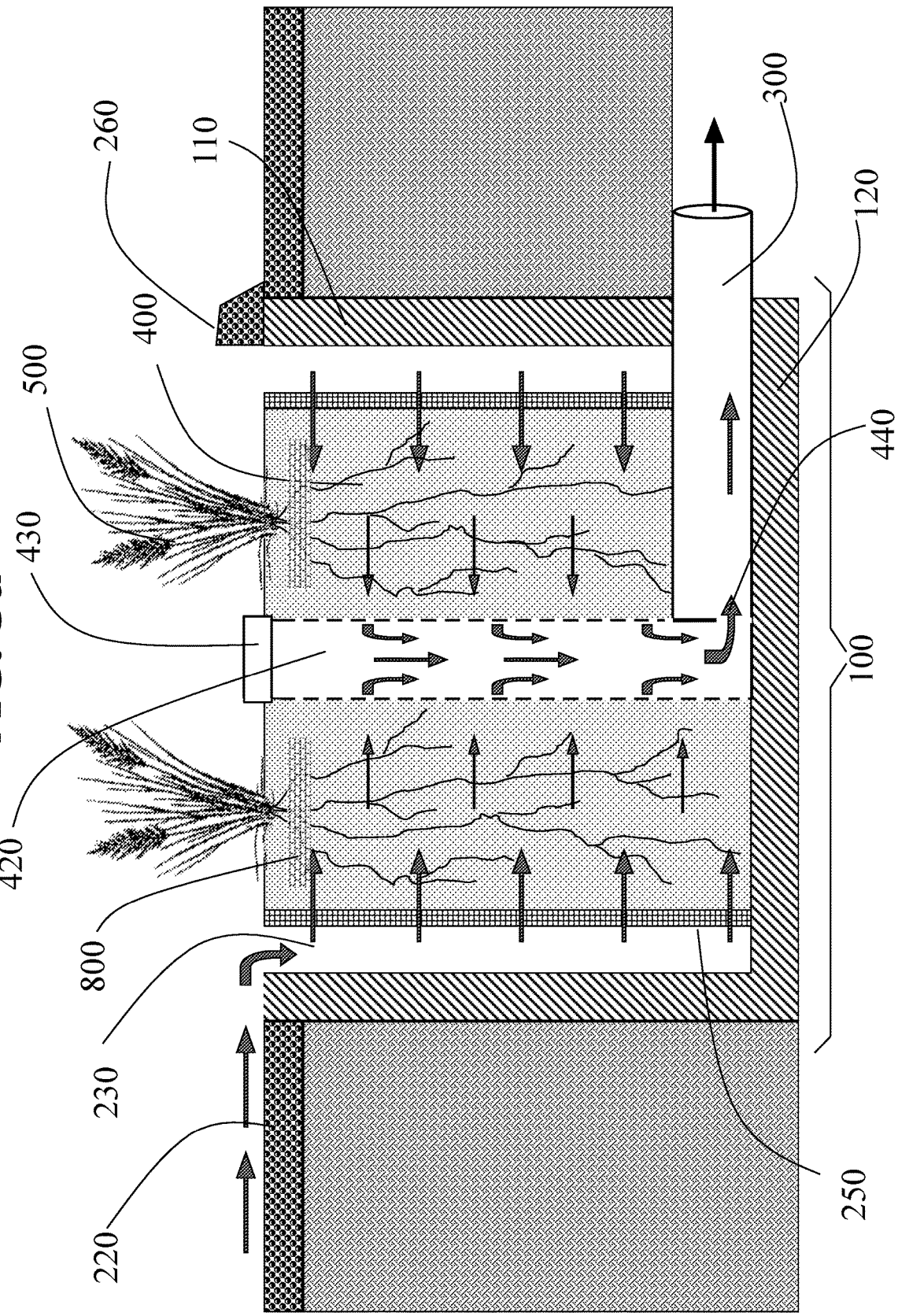

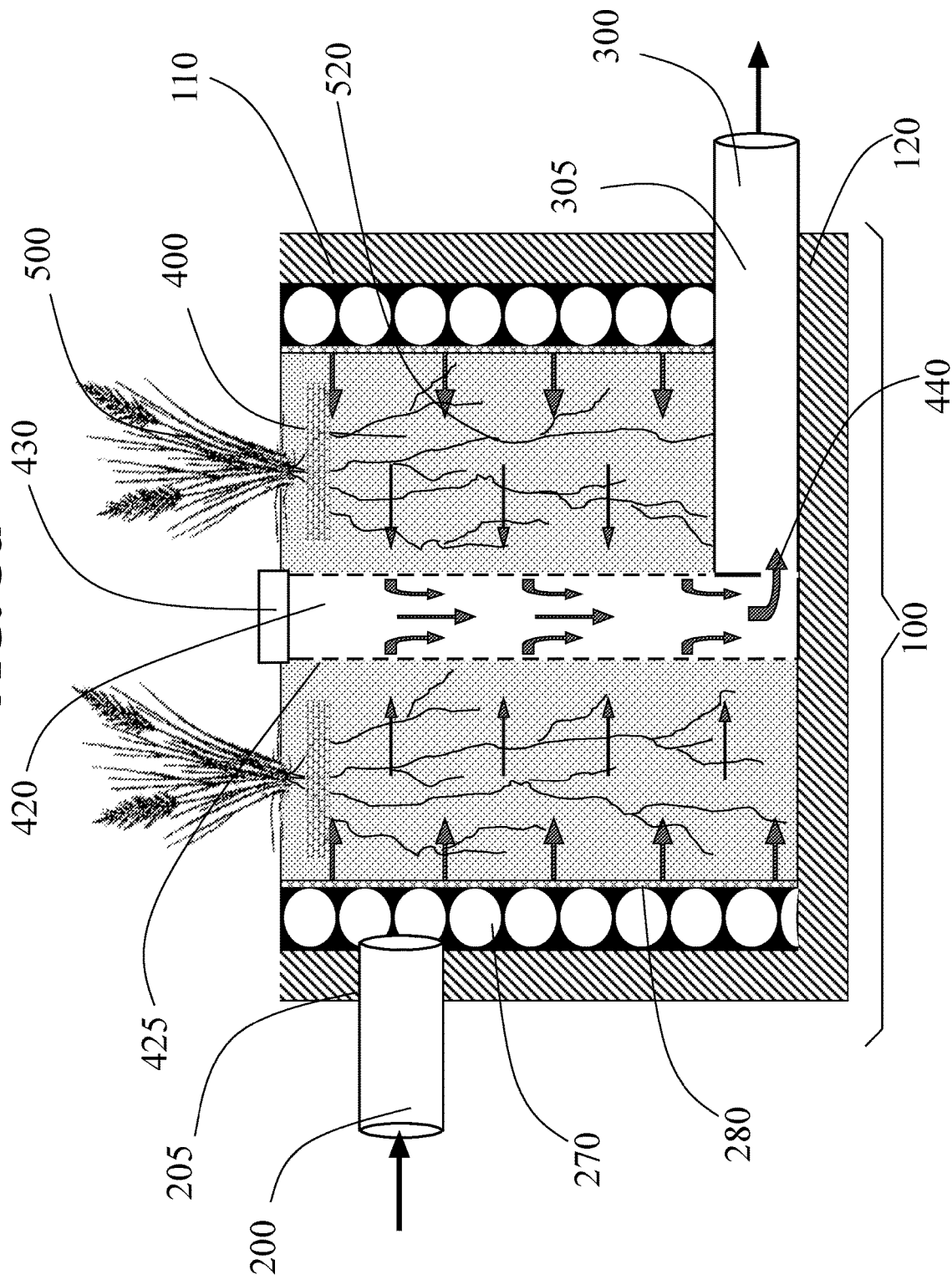

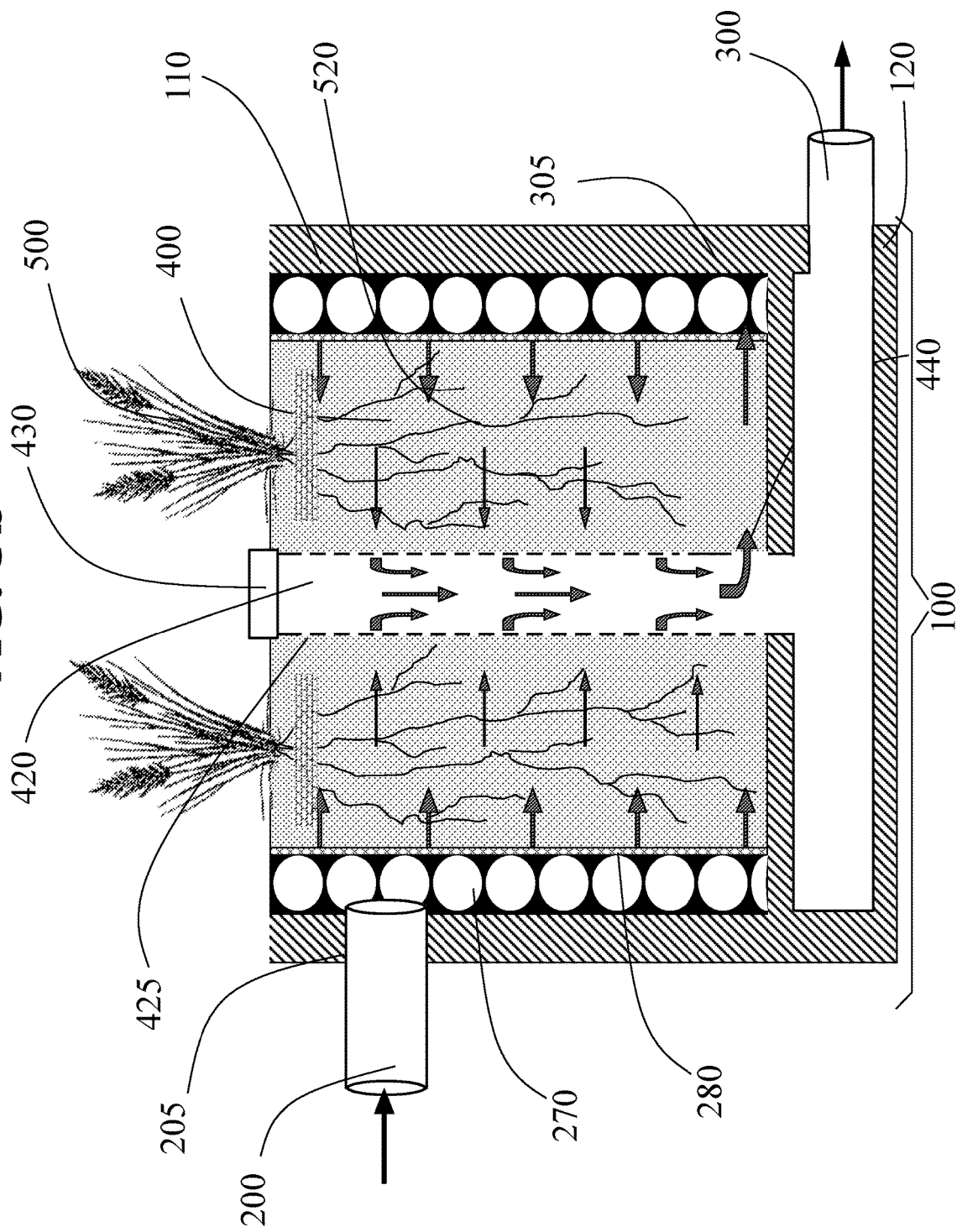

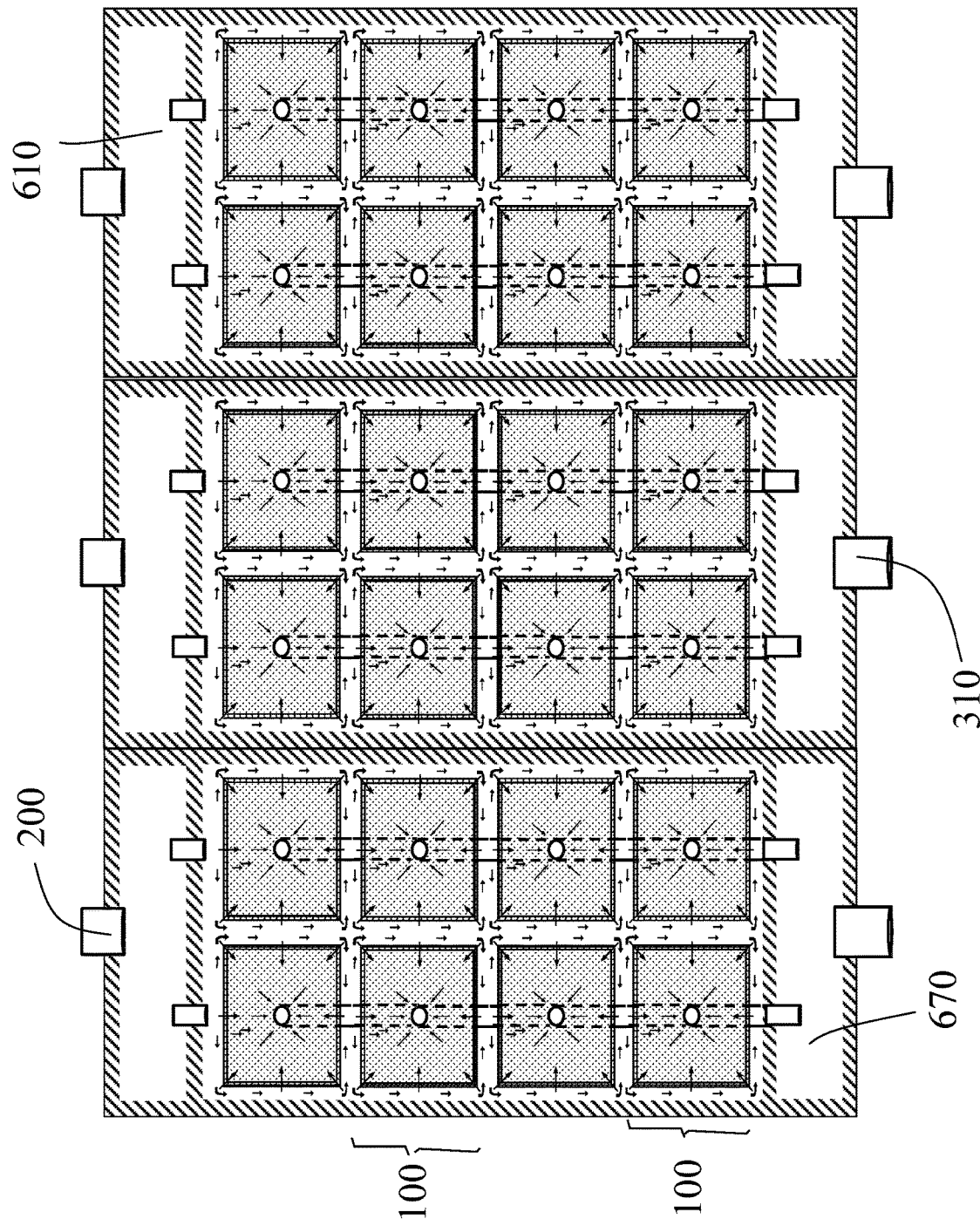

FLOW CONTROL RISER WITHIN A STORMWATER TREATMENT SYSTEM

CROSS-REFERENCE TO RELATED APPLICATIONS

The present application is a non-provisional application of U.S. Provisional Application No. 62/939,634, filed Nov. 24, 2019 which is a continuation in part of U.S. Provisional Patent Application No. 62/923,701, filed Oct. 21, 2019, which is a continuation in part of U.S. patent application Ser. No. 16/417,472, filed May 20, 2019; which is a continuation of U.S. patent application Ser. No. 14/284,154, filed May 21, 2014 and issued as U.S. Pat. No. 10,294,135; which is a continuation of U.S. patent application Ser. No. 13/668,455, filed Nov. 5, 2012 and issued as U.S. Pat. No. 8,771,515, which is a continuation of U.S. patent application Ser. No. 13/215,077, filed Aug. 22, 2011 and issued as U.S. Pat. No. 8,303,816, all of which are hereby incorporated herein by reference in their entireties.

FIELD OF INVENTION

The present invention relates, in general, to a water capture, drainage, and treatment system, and method of using the same. More particularly, the present invention relates to an improved horizontal flow urban wetland biofiltration system for stormwater treatment. The system presented utilizes a water flow control riser with multiple orifices. Implementation of a flow control riser with multiple orifices within a downward flow and horizontal flow biofiltration system enhances the system's overall performance. Notably, the flow control riser with multiple orifices maintains consistent filtration loading rates during stormwater fill-up and drain down states within the system.

Biofiltration systems are sized based upon a treatment flow rate calculated by a rainfall intensity and drainage area. The rainfall intensity used is generally the peak intensity for 85 to 90% of the storm events that occur within a year based on historical data. Unfortunately, these biofiltration systems do not perform optimally when the flow rate is below or above the calculated flow rate; generally, many storms are much smaller with lower flow rates than what the system is designed for. The inclusion of a single orifice at the bottom of the "underdrain" or "chamber outlet tube"; as described in prior art, can control the flow to the desired loading rate at only one water elevation. At lower water elevations (i.e. during drain and fill-up periods, or smaller storms) the loading rate is higher than desired, which decreases performance. Other biofiltration systems known in the art have no flow control riser or orifice and these generally have a loading rate much higher than the target which causes the same issues, such as poor performance and rapid clogging.

Conversely, a biofiltration system with a flow control riser containing multiple orifices presented here can control the flow to the desired loading rate at all water elevations including lower water elevations (i.e. during drain down and fill-up periods, or smaller storms). This ensures optimal performance (consistent loading rate on the filtration media bed) over the entire operational flow range the system will encounter. Multiple orifices flatten the spike in increased loading rate from the water level in the system ranging from empty to up until it reaches the peak water level (also known as the hydraulic grade line or HGL). Multiple orifices result in the loading rate being lower than the desired loading rate during fill up and drain down, further improving the system's performance during these periods and smaller storms.

Additionally, when a flow control riser with multiple orifices is integrated within a horizontal wetland biofiltration system, it can also improve volume control within the system and any upstream pre-storage and related hydromodification requirements. Some wetland biofiltration systems, such as the one disclosed here can be coupled with an upstream, underground water storage chamber. A flow control riser with multiple orifices creates a more consistent discharge rate during fill-up and drain down periods. A benefit of this consistent discharge is that the size of the upstream, underground chamber can be reduced but still meet the hydromodification requirements relating to matching the pre-development hydrograph. This decreases the cost associated with building an underground storage chamber. The improvements disclosed here exceed the performance of standard downward flow biofiltration systems as well as different types of horizontal flow filtration and biofiltration systems with collection tubes with a single orifice along with any related upstream storage systems.

BACKGROUND OF THE INVENTION

Water treatment systems have been in existence for many years. These systems treat stormwater surface runoff or other polluted water. Stormwater surface runoff is of concern for two main reasons: one because of the effects of its volume and flow rate, and two, because of the pollution and contamination it can carry. The volume and flow rate of stormwater is important because high volumes and high flow rates can cause erosion and flooding. Pollution and contamination are important because stormwater is carried into our rivers and streams, from there into our lakes and wetlands, and furthermore because it can eventually reach our oceans. Pollution and contamination that is carried by stormwater can have adverse effects on the health and ecological balance of the environment.

The Clean Water Act of 1972 enforced by the U.S. Environmental Protection Agency (EPA) set the stage for vast improvements to a water infrastructure and quality. Water pollution has been divided into two categories: point source and non-point source. Point sources include wastewater and industrial waste. Point sources are more easily identifiable, and therefore direct measures can be taken to control them. The other category, non-point source, is more difficult to identify. Stormwater runoff is the major contributor to non-point source pollution in rivers, lakes, streams and oceans. Studies have suggested and confirmed the leading cause of pollution to our waterways is from contaminated stormwater runoff. As we build houses, buildings, parking lots, roads and other impervious areas, we increase the amount of water that runs off the land and into our stormwater drainage systems, which all lead to rivers, lakes, streams and the ocean. As more land becomes impervious, less of the rain seeps back into the ground. This leads to less groundwater recharge and higher velocity flows in streams, which cause erosion and increased loads of contaminants into these waterways.

There are some sources of pollutants that are present in stormwater runoff. Sediments come from hillsides and other natural areas that are disturbed during construction and other human activities. When land is stripped of vegetation the soil more easily erodes and finds its way to storm drains. Trash and other unnatural debris are dropped on the ground every day which finds its ways into the drainage system and ultimately our waterways. Leaves from trees and grass clippings from landscape activities that land on hardscape areas no longer decompose back into the ground but flow to our storm drains and collect in huge concentrations in lakes and streams. These organic substances leach out huge loads of nutrients and they decompose and cause large algae blooms which deplete the dissolved oxygen levels and kill fish and other organisms. Other unnatural sources of nutrients including nitrogen, phosphorus, and ammonia come from residential and agricultural fertilizers that are used in access and find their way to storm drains. Nutrients are one of the number one pollutants of concern in our nations.

Other major pollutants of concern include heavy metals which come from numerous sources and are harmful to fish and other organisms including humans. Many of our waterways are no longer safe to swim in or fish in and therefore no longer have any beneficial use. Heavy metals include but are not limited to zinc, copper, lead, mercury, cadmium and selenium. These metals come from car tires and brake pads, paints, galvanized roofs and fences, industrial activities, minim, recycling centers, any metal materials left uncovered. Other major pollutants of concern are hydrocarbons which include oils and grease. These pollutants come from leaky cars and other heavy equipment and include hydraulic fluid, break fluid, diesel, gasoline, motor oils, cooking oils and other industrial activities.

Bacteria, pesticides and organic compounds are a few other categories of pollutants which are also harmful to our waterways, wildlife and humans. Over the last 20 years the EPA has been monitoring the pollutant concentrations in most of the streams, rivers and lakes throughout the country. Over 50% of four waterways are impaired for one or more of the above-mentioned pollutants. As part of the Phase 1 and Phase 2 NPDES (National Pollutant Discharge Elimination System) permits which control industrial and non-industrial development activities the control of these sources of pollutants in now mandated. Phase 1 was initiated in 1997 and Phase 2 was initiated in 2003. While there are many requirements to these permits the three main focuses are on source control, during construction pollution control and post construction pollution control. Post construction control mandates that any new land development or redevelopment activities are required to incorporate methods and solutions that both control increased flows of rain water off the site and decrease (filter out) the concentration of pollutants off of these developed sites. These are commonly known as quantity and quality control. Another part of these requirements is for existing publicly owned developed areas to retrofit the existing drainage infrastructure with quality and quantity control methods and technologies to decrease the existing amount of rainwater runoff and pollutant concentrations.

One of the main categories of technology that help with obtaining these goals are referred to as structural best management practices or BMPs. Structural BMPs are proprietary and non-proprietary technologies that are developed to store and/or remove pollutants from stormwater. Methods such as detention ponds, detention basins, or regional wetlands are used to control the volume of runoff which provides some pollutant reduction capabilities. Over the past 10 years numerous technologies have been invented to effectively store water underground and thus freeing up buildable land above them. Various treatment technologies such as catch basin filters, hydrodynamic separators, and media filters are used to remove pollutants. These technologies commonly work by using the following unit processes: screening, separation, physical filtration, and chemical filtration.

Other technologies such as bio swales, infiltration trenches, and biorentention areas commonly known as low impact development (LID) or green infrastructure (GI) have recently been implemented in the last 10 years to both control/reduce volume discharge of stormwater and remove pollutants from stormwater. These LID technologies have proven successful at removing difficult pollutants such as bacteria, dissolved nutrients and metals as they provide not only physical and chemical, but also biological filtration processes by incorporating a living vegetation element which creates a living microbial community within the media by the plants' root systems which assist in pollutant removal. Biological filtration processes have proven to be excellent at removing many of the pollutants that physical and chemical filtration systems alone cannot. While these technologies are effective, they take up substantial amounts of space which are not always available on various construction projects. As such a need has arisen for compact LID technologies that offer the same advantages as their larger and therefor, more expensive counterparts.

Biofiltration BMPs and other LIDs offer an aesthetic benefit for developed sites because they may incorporate above ground vegetation, shrubs, trees or any combination thereof. Typically, this vegetative bed is supported by a filtration soil media layer within the underground chambers. Many biofiltration systems (bioretention, bio swales, planter boxes, wetlands) implemented to date, while visually appeasing, present a variety of challenges with loading rate consistency, minimizing clogging rates, and optimizing flow control.

Recent technological advancements in the field have focused on taking the traditional bioretention concept which is focused around vertical downward flow media filtration beds which pool water on top of the bed, making them up to a tenth of the size smaller by using high flow rate filtration media. As with traditional large bioretention systems these new compact biorentention systems accept stormwater runoff directly without pre-treatment and therefore receive large amounts of particulates that can clog the media filtration bed. This clogging has been exacerbated with these compact systems as the surface area of the media is only one-tenth that of the traditional large bioretention systems. These downward flow systems are notorious for clogging as sediments accumulate on top of the media filtration bed's surface. There is a need for a better way of constructing biofiltration systems which allows the systems to still be compact by maximizing the media surface area for a given media bed volume and to improve the stormwater flow load rate. The greater the surface area for a given volume of media, the lower the loading rate on the media, and therefore less probability of clogging. Also, the traditional downward vertical flow path as seen in much of the prior art, is most problematic for clogging, as gravity allows inflow particulates to quickly and easily accumulate on top of the media bed.

Additionally, stormwater is characterized by large concentrations of various pollutants including trash, debris and sediments. Reports have shown that for urbanized area an average of 7.6 cubic feet of trash and 2.4 cubic yards of sediment are generated per acre of impervious surface per year. In many areas, where proper erosion control measures are not taken, which is common, the loading of sediment is much higher. Therefore, a system which has a media bed designed to minimize clogging along with a pre-treatment chamber to remove trash and sediments provides huge advantages to the end user. Considering the collection of these pollutants, maintenance of stormwater BMPs can be very expensive and a burden to property owners. There is, thus a need for a system that can minimize maintenance costs.

Also, with changing stormwater regulations, a move is being made from flow based design to volume based design. Volume based design requires treatment along with volume control and reduction. Volume based design requires not only a treatment system but an upstream, storage system (above ground or underground) with an outlet control. Only horizontal flow biofilters can be placed downstream of the storage system. By having the biofilter downstream with its built in flow control riser with multiple orifices, it not only provides treatment but also acts as a more efficient outlet control structure to optimize volume control and reduction. This eliminates the need for an additional outlet flow control structure generally constructed with any type of stormwater storage system.

Some systems include a wetlands chamber having a vegetative submerged bed, one or more walls, a floor, one or more inlet water transfer pipes and one or more outlet water transfer pipes. Examples of related systems are described in U.S. Pat. Nos. 7,425,262 B1, 7,470,362 B2 and 7,674,378, the contents of each of which are incorporated herein by reference in their entirety. In other systems, each of the walls and floor have an inner and outer metal mesh wall, with a space between the inner and outer walls to house stonewool filtration media slabs. Having a catch basin or chamber also includes one or more inflow pipes in one or more of the four walls to allow influent to pass into the catch basin. The system is configured so that the sediments and associated pollutants settle out of the influent and accumulate on the floor of the catch basin or chamber. A filtration panel comprising four or more walls enclosing an open space housing a filtration media bed, the walls being water permeable in structure to allow passage of water in either direction, with the filtration media bed filing the entire chamber of the filtration panel and being water permeable.

Contaminated water such as stormwater and wastewater contain high levels of particulate pollutants such as total suspended solids (TSS), metals, organics, nutrients, and hydrocarbons. These particulates cause media filtration beds to clog, which decreases their treatment flow capacity and increases the maintenance and replacement requirements of the granular media within the media filtration bed. Because of the clogging, a need has arisen which further increases the amount of initial media bed surface area for a given volume of filter media. By increasing the amount of available media bed surface area for a given volume of media the surface loading rate decreases for a given flow of water and therefore decreases the rate at which media will clog due to particulates.

Traditional downward flow media filtration beds have their initial media surface area lay horizontal, perpendicular with the force of gravity. Therefore, pollutant particles accumulate on top of the media bed and clog the media at a much faster rate and thereby decreasing the media filtration beds flow rate and performance, along with increasing the required maintenance and decreasing the life of the media before replacement is needed.

With the ever-changing stormwater regulations, a system providing features which lowers maintenance costs, increases performance and pollutant removal, and can be integrated with storages systems, and placed downstream are in great need and demand. Furthermore, the smaller these systems are, the easier they can be integrated into urban areas with space restrictions. In other words, the easier it is made to incorporate these types of systems into urban areas, the greater overall affect we will have on reducing pollution in rivers, lakes and streams.

SUMMARY OF THE INVENTION

In general, filtration and biofiltration BMPs are sized based upon a loading rate (gpm/sq ft or in/hr). One of the limitations of biofiltration BMP systems known to those familiar with the art, is disproportionate filtration load taxation of the bottom portions of filtration media, particularly during smaller storm events and dry weather flows. Most systems are designed to accommodate calculated filtration loading rates based on the average stormwater flows expressed in cubic feet a second (CFS) or gallons per minute (GPM) of a specific locale. These systems can function effectively as long as storm events and dry weather water flows are within the calculated loading target range (measured in gallons per minute per square feet, or gpm/sq ft). When hydraulic conveyance is outside of the optimal range, the entire filtration media bed is not utilized, and particulate removal is not optimized and clogging rates and load distribution is not equal.

A solution for creating a more even distribution of water flow with a filtration or biofiltration bed with the inclusion of flow control riser tube with a single orifice, wherein the orifices provide passive, even distribution of stormwater, moving within the filtration system and utilizes a greater distribution across the entire filter media column.

The addition of a single orifice in a flow control riser tube passively controls the flow rate to the target level only at the peak hydraulic grade line (water level). As an example, integration of riser tubes with a single orifice is taught in U.S. Pat. Nos. 9,604,160, 10,145,765, and 10,369,496 by Zachariha J. Kent and are incorporated herein by reference. However, the flow control risers known in the art, including the related U.S. Pat. Nos. 8,303,816, 8,771,515, and 10,294,135 by Greg B. Kent, et al. incorporate only one orifice or collection tube hole, which may restrict the effectiveness in loading rate distribution during all hydraulic variances of different stormwater flow events.

In contrast, the addition of flow control riser tube(s) with multiple orifices solves the problem of higher loading rates in the filter media bed during fill up and drain down periods.

The present invention describes a system and method for providing enhanced stormwater treatment and volume control while reducing materials required for system installation which in turn lowers the cost and size of the system. The disclosed horizontal wetland biofiltration system may reduce the footprint required in a developed area such as a parking lot or other impervious, developed landsites by up to 30 percent while providing the same amount of filtration media surface area required to meet state and local regulations when compared to traditional downward flow biofiltration systems (bioretention). The more consistent discharge of the volume being treated optimizes the post-development hydrograph more closely to the pre-development hydrograph. Even for large storm management projects when multiple wetland biofilter systems are assembled end-to-end or side-by-side (as seen in FIGS. 34 and 36), the overall footprint of the system is lower because of the inclusion of a flow 260 control riser with multiple orifices.

Embodiments described herein are directed to a horizontal flow wetland biofilter system comprising a chamber with impermeable outer walls spaced away from permeable interior walls of a media filtration bed to form a peripheral catch basin. The catch basin provides an open area around the perimeter of the interior walls for influent water to fill within the open 265 area on most or all sides of the chamber; thereby providing a large surface area for influent water to penetrate the filtration media bed. The influent water enters the chamber and penetrates the media filtration bed in a horizontal flow path in order to provide for pre-settling of particulates before making contact with the media filtration bed. The chamber may be disposed below ground and connected with an adjacent water storage chamber for receiving influent water. The chamber may additionally include a flow control orifice or flotation valve to further regulate the flow of water through the chamber.

In one embodiment of the invention, a wetland biofilter chamber comprises one or more outer side walls and a floor section defining a substantially enclosed chamber; a media filtration bed disposed within the chamber and defined by one or more permeable inner side walls, wherein the permeable inner side walls of the media filtration bed are separated from the outer side walls of the chamber and define a catch basin for receiving an influent; a collection tube disposed within the media filtration bed and extending vertically from a top portion of the media filtration bed to a lower portion of the media filtration bed; and at least one outlet opening connecting the lower portion of the collection tube within an outside of the chamber.

The outer side walls and floor section may be impermeable.

The one or more outer side walls may include an intake opening to receive an influent into the catch basin.

The intake opening may be located on a lower half of a side wall.

The wetland biofilter chamber may further comprise an outlet tube disposed horizontally across the floor section of the chamber and connecting the collection tube with the at least one outlet opening.

The collection tube may be permeable.

The permeable collection tube may be perforated.

The height of the collection tube may be approximately 5% to approximately 100% of the height of the media filtration bed.

The collection tube may further comprise an orifice, or restriction plate which restricts the flow of filtered influent to the outlet tube.

The restriction plate may be connected with a flotation valve disposed within the collection tube which controls the restriction plate based on a level of influent in the collection tube.

The catch basin may have a width of approximately 0.1 inches to approximately 10 feet.

The catch basin may have a width of approximately 1 inch to approximately 2 feet.

The height of the inner side walls may be approximately 25% to approximately 100% of the height of the chamber walls.

The thickness of the media filtration bed may be approximately 0.25 inches to approximately 80 feet.

The thickness of the media filtration bed may be approximately 1 to approximately 4 feet.

The catch basin may include a substantially hollow structural matrix.

In another embodiment, a method of filtering influent in a biofilter chamber comprises: receiving an influent into a catch basin of the biofilter chamber, wherein the catch basin is disposed around an inner periphery of the chamber between one or more outer side walls of the chamber and one or more inner permeable inner side walls of a media filtration bed; filtering the influent through the media filtration bed; collecting the filtered influent from the media filtration bed at a collection tube extending vertically within the media filtration bed from a top portion of the media filtration bed to a lower portion of the media filtration bed; passing the filtered influent from the collection tube to at least one outlet opening connected with an outside of the biofilter chamber.

The method may further comprise receiving the influent into the catch basin from an intake opening located on a lower half of a side wall.

The method may further comprise receiving the influent into the catch basin from an intake opening located on an upper half of a side wall.

The method may further comprise receiving the influent into the catch basin from an opening in the top of the biofilter chamber.

The method may further comprise passing the filtered influent from the collection tube to at least one outlet opening using an outlet tube disposed horizontally across the floor section of the chamber and connected on a first end with the collection tube and on a second end with the at least one outlet opening.

The method may further comprise restricting the flow of influent using a restriction plate disposed within the collection tube.

The method may further comprise restricting the flow of filtered influent when a floatation valve disposed within the collection tube and connected with the restriction plate falls below a defined level.

The method may further comprise receiving the influent from an adjacent storage chamber or pre-treatment chamber.

The method may further comprise a flow control riser with multiple orifices. In one method a flow control riser with multiple orifices is smaller in diameter and inserted within a perforated collection tube, which is larger in diameter. In this method, the flow control riser with multiple orifices and perforated collection tube is located within the chamber. In another method the flow control riser with multiple orifices is affixed within the discharge chamber as opposed to the main chamber.

An alternate method relies on the integration of flow control riser with multiple orifices which may be sized differently depending on the water flow control objectives. For example, a flow control riser with multiple orifices configured with different sizes may lead to smaller biofiltration systems without reduction in efficiency. Taller or shorter biofiltration systems may have more or less orifices based upon the volume control requirements and the height of the media filtration bed.

The method may further comprise a series of chambers assembled side-by-side or side-by-side and end-to-end creating a larger wetland biofiltration system.

From this description, in conjunction with other items, the advantages of the said invention will become clear and apparent, more so based upon the hereinafter descriptions and claims, which are supported by drawings with numbers relating to parts, wherein are described in the following sections containing the relating numbers.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings:

FIG. 1a is a top plan view of another embodiment of a horizontal flow wetland biofilter system with a catch basin;

FIG. 3 is a side elevational section view of an embodiment of the horizontal flow wetland biofilter system installed below a ground surface level which receives water from an adjacent impervious surface area;

FIG. 3a is an alternative embodiment of FIG. 3 and it includes the flow control riser with multiple orifices;

FIG. 5a is a side elevational section view of an embodiment of the horizontal flow wetland biofilter system showing the hollow structural matrix forming the catch basin;

FIG. 5b is a side elevational section view of an alternate embodiment of the horizontal flow wetland biofilter system showing the hollow structural matrix forming the catch basin with a second chamber positioned below the first chamber;

FIG. 36 is a top view of multiple horizontal flow wetland biofilter chambers with assembled side-by-side and end-to-end and demonstrates the flow of water through the system.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Overview

A water filtration apparatus with a unique filtration chamber design which maximizes the available surface area of filtration media for a given volume of water will be described herein. The water filtration system includes an enclosed chamber which houses a media filtration bed and a hollow structural matrix 270 or permeable wall 250 that creates a void space, or catch basin, between the chamber's outer side wall(s) and the inner surface walls of the media filtration bed. The catch basin 230 creates a continuous open area around the perimeter of the media filtration bed 400 between the media filtration bed perimeter and the chamber side walls, so influent contaminated water will fill the catch basin before penetrating the media filtration bed. With the media filtration bed encompassed within internal permeable walls spaced from the chamber side walls, the apparatus provides up to four times more surface area than a downward flow bioretention system.

The water filtration apparatus also operates by horizontal flow, such that the influent water is received at a side portion of the apparatus, such as through an opening in one of the chamber side walls or even an opening in the bottom surface of the chamber. The horizontal flow path allows for contaminated water to enter the chamber sub-surface via pipe or sheet flow into the top of the chamber. The benefits of horizontal flow will be described further herein.

Exemplary Embodiments

Figure 1:
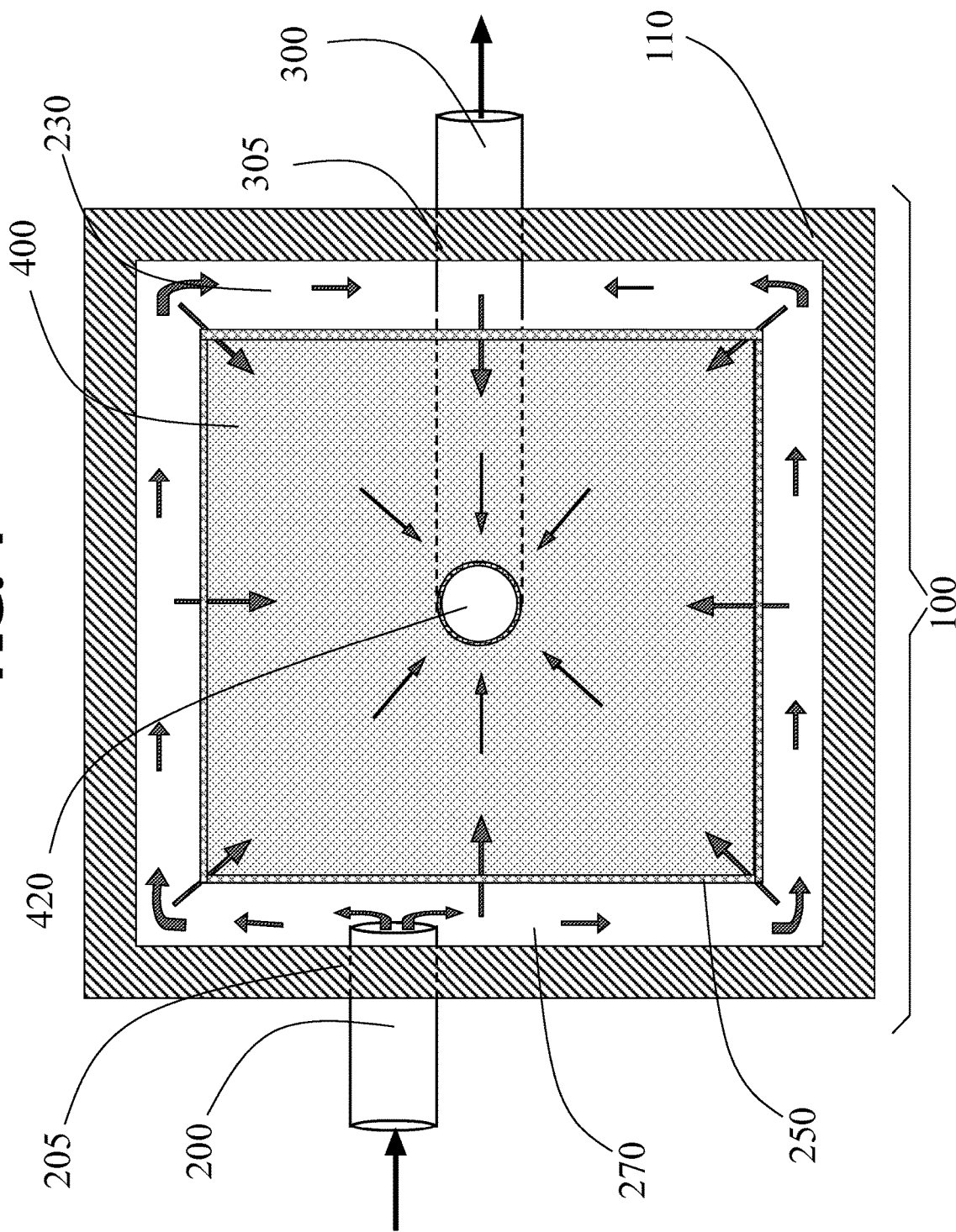
FIG. 1 is a top plan view of an embodiment of a horizontal flow wetland biofilter system with a catch basin.
Figure 2:
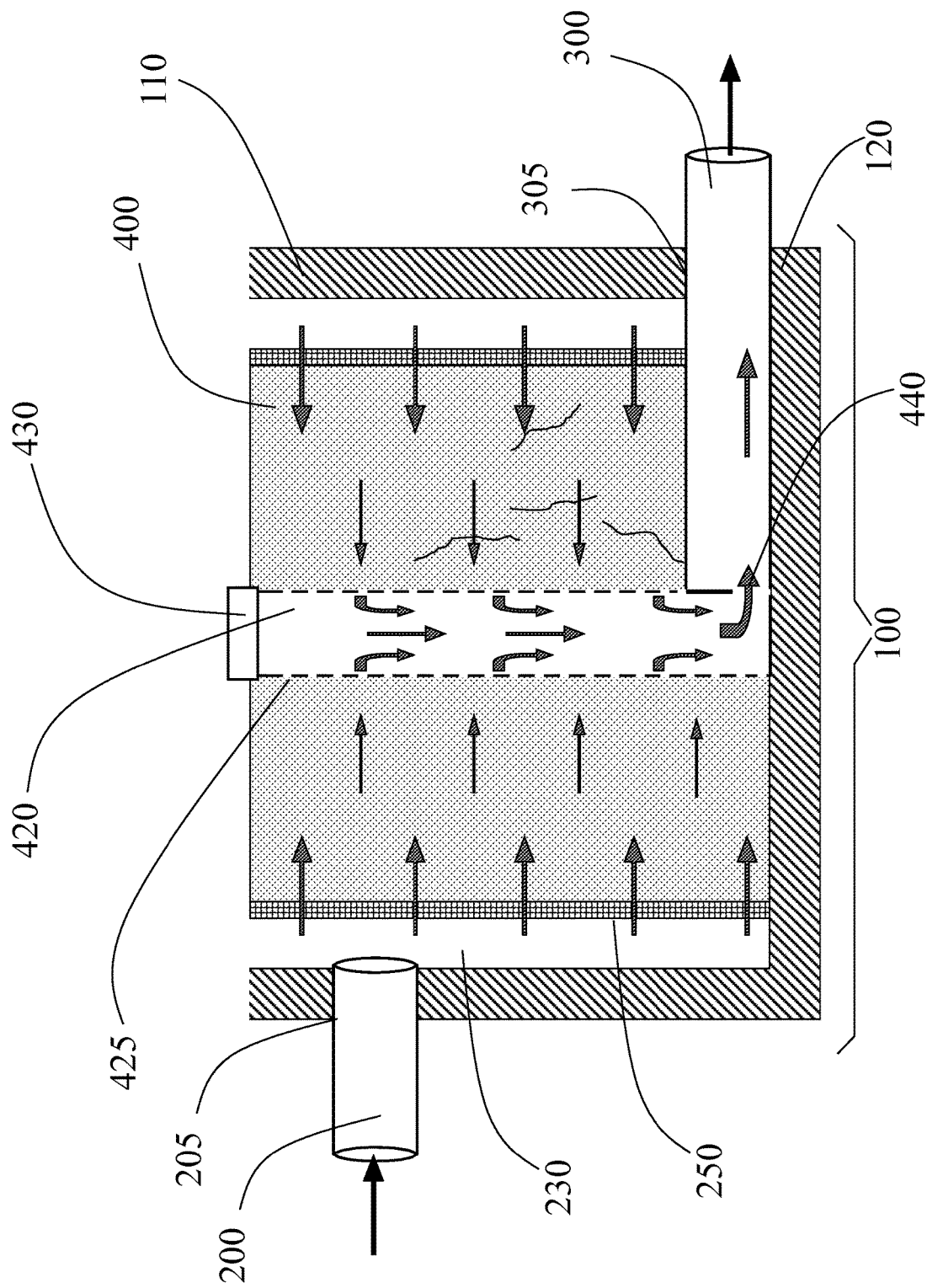
FIG. 2 is a side elevational section view of an embodiment of the horizontal flow wetland biofilter system.

With reference to FIGS. 1 and 2, an embodiment of a horizontal flow wetland biofilter system chamber 100 are shown and will be described, the chamber 100 being composed of a floor 120 (best presented in FIG. 2) defined by walls 110 running generally perpendicular to the floor 120 on all sides. One of the walls with an opening 205 in which an inlet pipe 200 allows water to flow into the chamber subsurface and into the perimeter catch basin 230 or void area, which is defined as the area between the chamber walls 110 and the internal permeable walls/partitions 250. The perimeter catch basin 230 extends vertically from the floor 120 upward to the top of the chamber walls 110. Water may fill the chamber to the top of the chamber walls 110 or to a height equal to the invert of an upstream bypass outside of the chamber 100. As the water fills up the column of the catch basin, larger particulates present in the water will settle to the floor. Also as water fills the perimeter catch basin on all sides 230 it builds up hydraulic head pressure which provides the force needed for it to flow horizontally inward through the permeable walls/partitions 250 which are made of a material that has a generally high open area for maximum water flow with the opening being smaller in size than the media granules of the media filtration bed 400 held within the interior of the permeable walls/partitions 250. In one embodiment, the catch basin may have a width of approximately 1 inch to 24 inches, but generally it is at least approximately 6 inches wide to facilitate access by a standard vacuum hose for cleaning.

Figure 4:
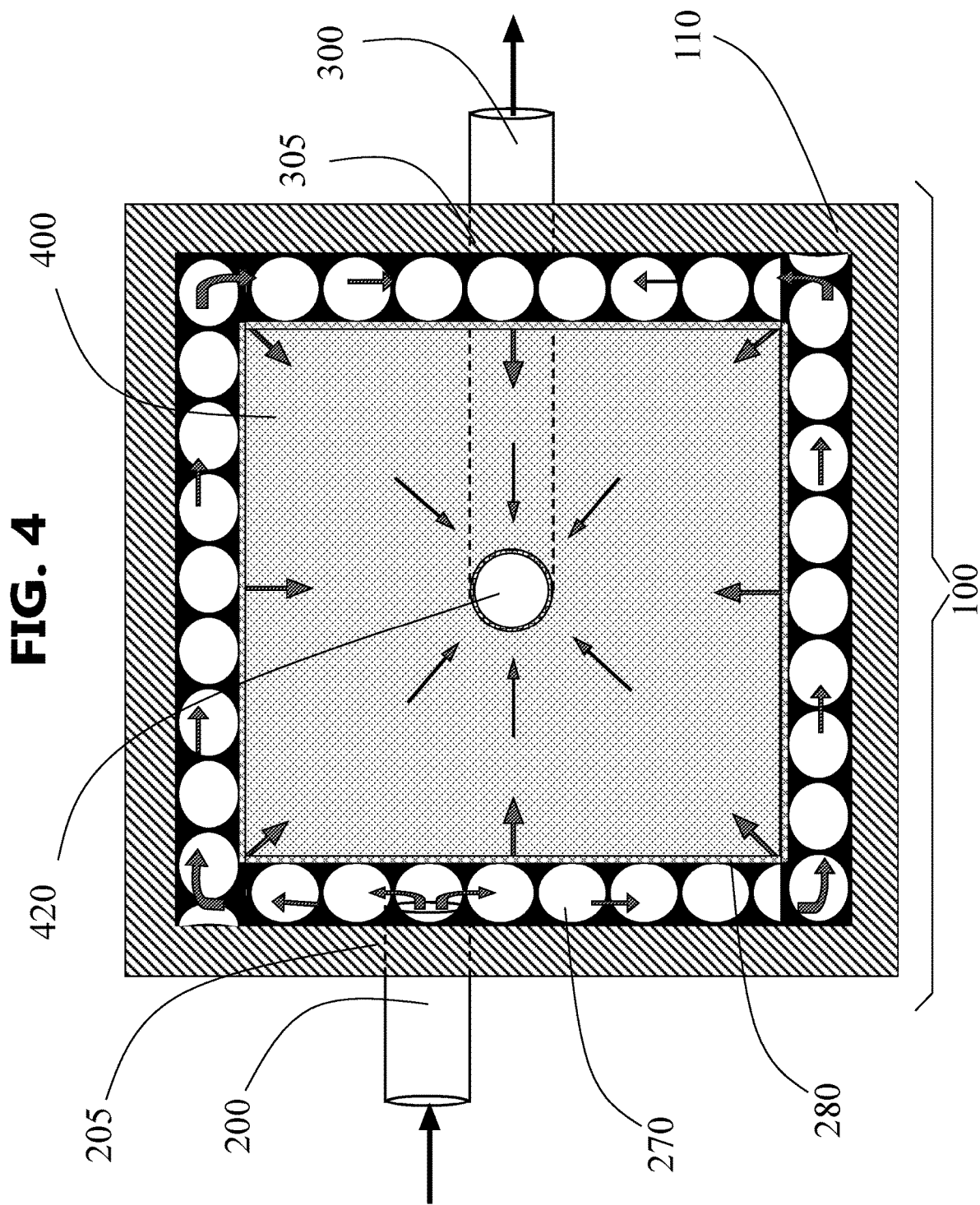
FIG. 4 is a top plan view of an embodiment of the horizontal flow wetland biofilter system where the catch basin is formed of a hollow structural matrix.

FIG. 1a is an alternate embodiment of a horizontal flow wetland biofilter system with two unconnected perimeter catch basin 230 areas within the chamber 100, the chamber 100, defined by walls 110 running generally perpendicular to the floor 120 (best presented in FIG. 2) on all sides. One of the walls with an opening 205 in which an inlet pipe 200 allows water to flow into the chamber subsurface and into one side of the unconnected perimeter catch basin 230 which is defined as the area between the chamber walls 110 and the internal permeable walls/partitions 250. The perimeter catch basin 230 extends vertically from the floor 120 upward to the top of the chamber walls 110. The flow of the water passes directly from the hollow structural matrix 270 (presented in FIG. 4) through the structural matrix cover 280, for example, netting (presented in FIG. 4) into the media filtration bed 400, the treated water then exits the media filtration bed 400 through another separate structural matrix cover 280, through the opening in the chamber wall 305, on the outlet side, and leaves the chamber 100 via a chamber outlet tube 300.

The internal permeable walls/partitions 250 mirror the chamber walls 110 in shape but with a smaller perimeter length. The permeable walls/partitions 250 contain the media filtration bed 400. In general, the permeable walls/partitions 250 are at least 25% the height of the chamber walls and may be the same height as the chamber walls. The permeable walls/partitions 250 are created by several, yet similar methods, and are not limited to the following materials: perforated metal, pervious pavers, concrete, or asphalt, geofabric, netting, screens and structural matrixes that are covered in a netting or screen. The permeable walls/partitions 250 have openings that are generally smaller than the size of the granules within the media filtration bed. In general, the permeable walls/partitions 250 have at least 30% void space. The permeable walls/partitions 250 must be of sufficient strength so as to not to warp in shape and must maintain the void space between the media filtration bed and chamber walls on all sides to insure a continuous perimeter void area to allow water to flow around with impediment. The permeable walls/partitions 250 may be of different shapes depending on the horizontal flow wetland biofilter system's site needs. An alternate, rounded shape is best presented in FIG. 22.

The media filtration bed 400 extends the height of the permeable walls/partition 250 or the hollow structural matrix 270. The said media filtration bed 400 is composed of various granular filtration media in various sizes and quantities. The composition of the media mix can vary depending on the targeted pollutants of concern. Types of media used are the following but not limited to: perlite, expanded aggregate, soil, compost, waste water residuals, zeolite, polymers, stone, top soil, sand, activated charcoal, iron oxide, aluminum oxide, bio balls, stonewool or rockwool, and other organic or inorganic materials. The flow through the media is horizontal from its surface adjacent to the permeable walls/partitions 250 to the perforated tube in the middle. The thickness of the media can be between a few centimeters to hundreds of feet. In general, the thickness of the media is between 12 and 48 inches. The top of the media filtration bed 400 contains blocks or a mat of inorganic material such as rockwool, stonewool, coconut coir or similar that are placed just below the surface of the media filtration bed 400 and is laid in a horizontal orientation. The purpose of the said material is to provide a base for the establishment of plants and vegetation. The referenced material is generally used for the growing of plants by the hydroponic method which is also referred to as soil-less agriculture. The materials referenced above retain the moisture in the perfect air to water ratio for plant life.

As water flows horizontally through the media filtration bed 400, pollutants carried in the water such as hydrocarbons, particulates, metals, nutrients, pathogenic bacteria, and chemicals are removed by a combination of physical filtration, chemical filtration, and biological filtration. The inclusion of vegetation 500 growing out of the top of the chamber 100 with the media filtration bed 400 allows for the establishment of their root systems 520 to take place. The root systems penetrate vertically downward through the column of the media filtration bed 400 which enhances the biological removal of pollutants through sorption, transformation and uptake by root system 520 and the surrounding beneficial microbial community. The establishment of vegetation in biofilter system is generally difficult because the granule media in the media filtration bed 400 is fast draining and does not hold enough moisture close to the surface for the vegetation root systems to establish. To overcome this, a layer of soil-less inert growing media 800 (FIG. 3) is laid just below the surface of the media filtration bed 400 horizontally where the vegetation's root system will start to establish. The soil-less grow media 800 is generally made of rockwool, stonewool, coconut coir or similar which is designed to have a high internal void space and hold substantial amounts of moisture which providing an ideal air water ration to optimal plant growth.

Collection Tube

As seen in FIG. 2, water enters the chamber 100 with chamber walls 110 through the inlet pipe 200 through the opening 205 and enters the perimeter catch basin 230 before passing through internal permeable walls/partitions 250, then moving horizontally, through the media filtration bed 400 toward the center of the chamber containing a vertical collection tube 420 which may have, in preferred embodiments, a series of horizontally perforated slots 425 which are spaced vertically from the bottom to the top of the collection tube 420. The perforations 425 allow water to enter the inside of the collection tube 420 and travel downward, at the bottom of the chamber floor 120, the collection tube 420 with horizontally perforated slots 425 is connected by a 90 degree elbow to a solid horizontal chamber outlet tube 300 that connects to an opening in the chamber wall 305 which allows water to exit the chamber. In some embodiments the chamber outlet tube 300 contains an internal restriction plate 440 which has a smaller diameter (orifice) than the interior diameter of the chamber outlet tube 300 and a single orifice 435 located at the bottom. The restriction plate controls in part, the maximum amount of flow which is allowed to be processed through the horizontal flow wetland biofilter system chamber 100. The collection tube 420 with horizontally perforated slots 425 has a cap 430 on the top that protrudes out of the top of the chamber 100 and allows for accessible cleaning.

Figure 23:
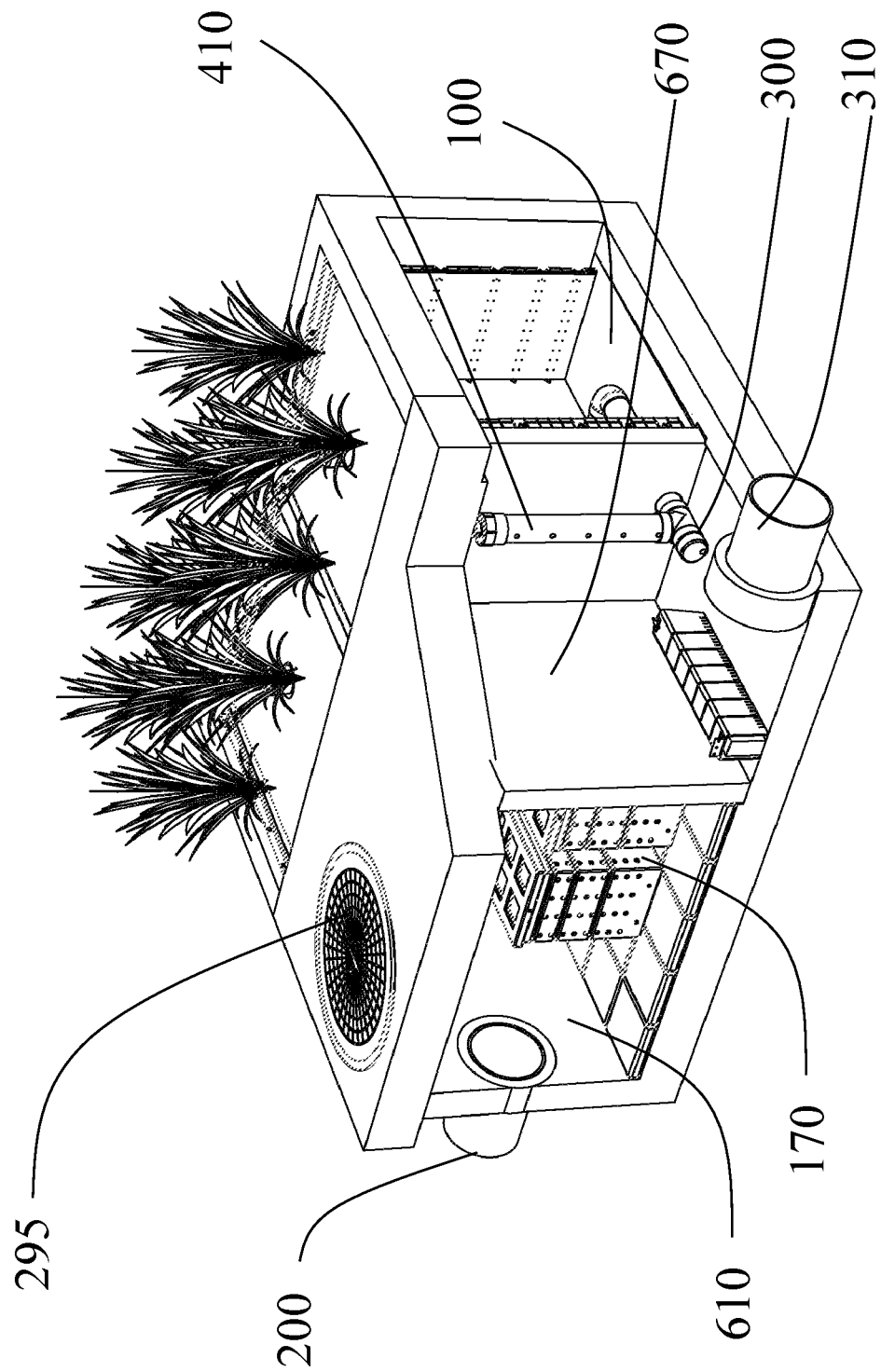
FIG. 23 is a cross-sectional view of a horizontal flow wetland biofilter system with flow control riser with multiple orifices installed within a horizontal flow wetland biofilter system with a catch basin.

The collection tube 420 with horizontally perforated slots 425 extends to at least 5% the height of the permeable walls/partitions 250. The widths of the slots are equal to or smaller in size than the granular media which composes the media filtration bed 400. In some embodiments the collection tube 420 with horizontally perforated slots 425 is wrapped in a netting sleeve when the granular media is smaller than the perforated slots 425. The perforated slots 425 run from the bottom of the bottom of the collection tube 420 where it comes in contact with the floor 110 and the slots extend up vertically at least 50% the height of the collection tube 120. The collection tube 420 with horizontally perforated slots 425, adjacent to the floor 120, to a non-perforated horizontally laying chamber outlet tube 300. This chamber outlet tube 300 connects to the opening 305 in the side wall of the chamber 100 (FIG. 2) or a discharge chamber outlet tube 310 (FIG. 23). In other embodiments the collection tube 420 with horizontally perforated slots 425 connects directly to an opening in the floor 120 in order to allow treated water to exit the wetland biofiltration system.

Figure 3B:
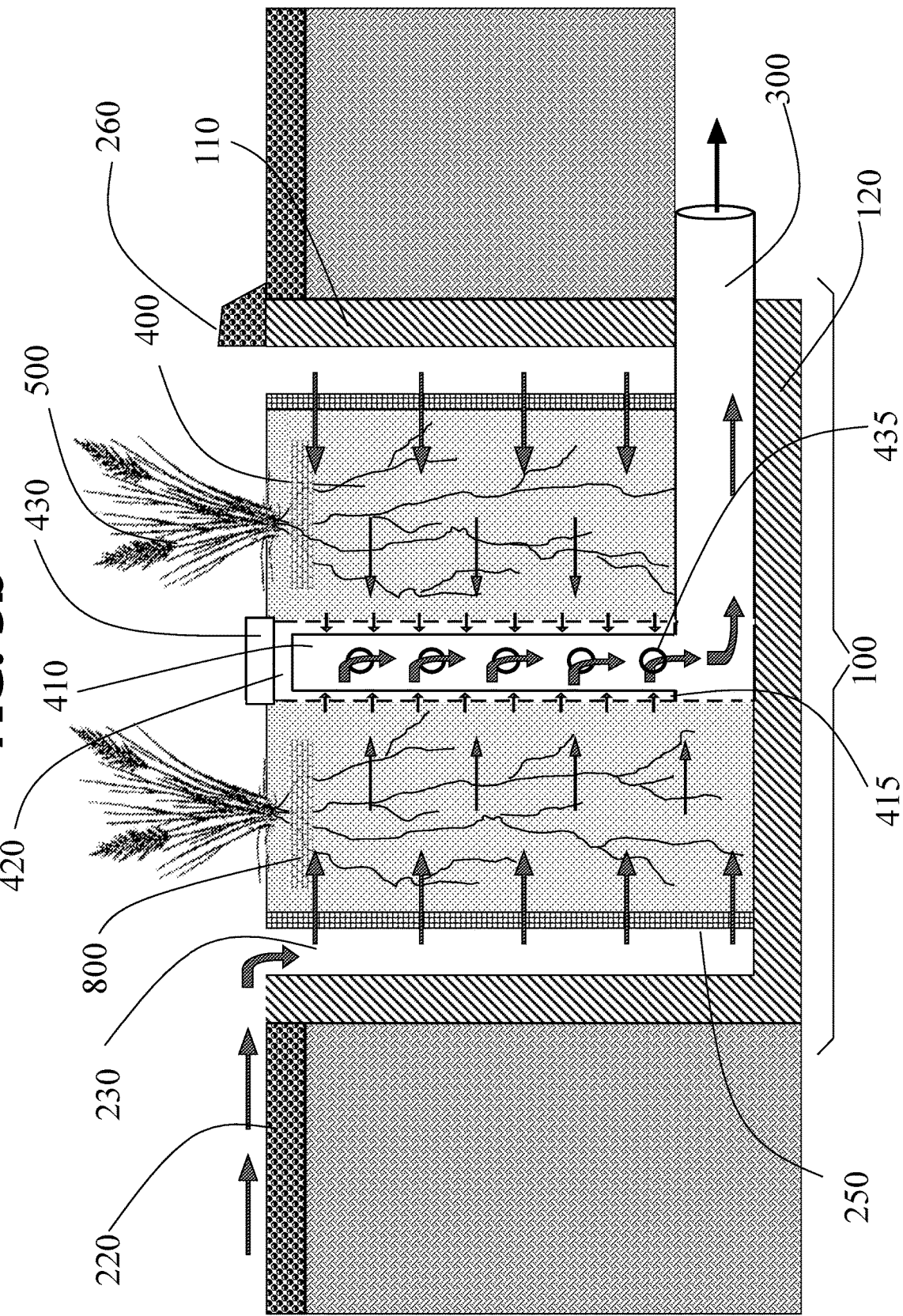
FIG. 3b is an alternative embodiment of FIG. 3a and it includes the flow control riser 410 with multiple orifices 435 and a bottom seal flange 415.
Figure 27:
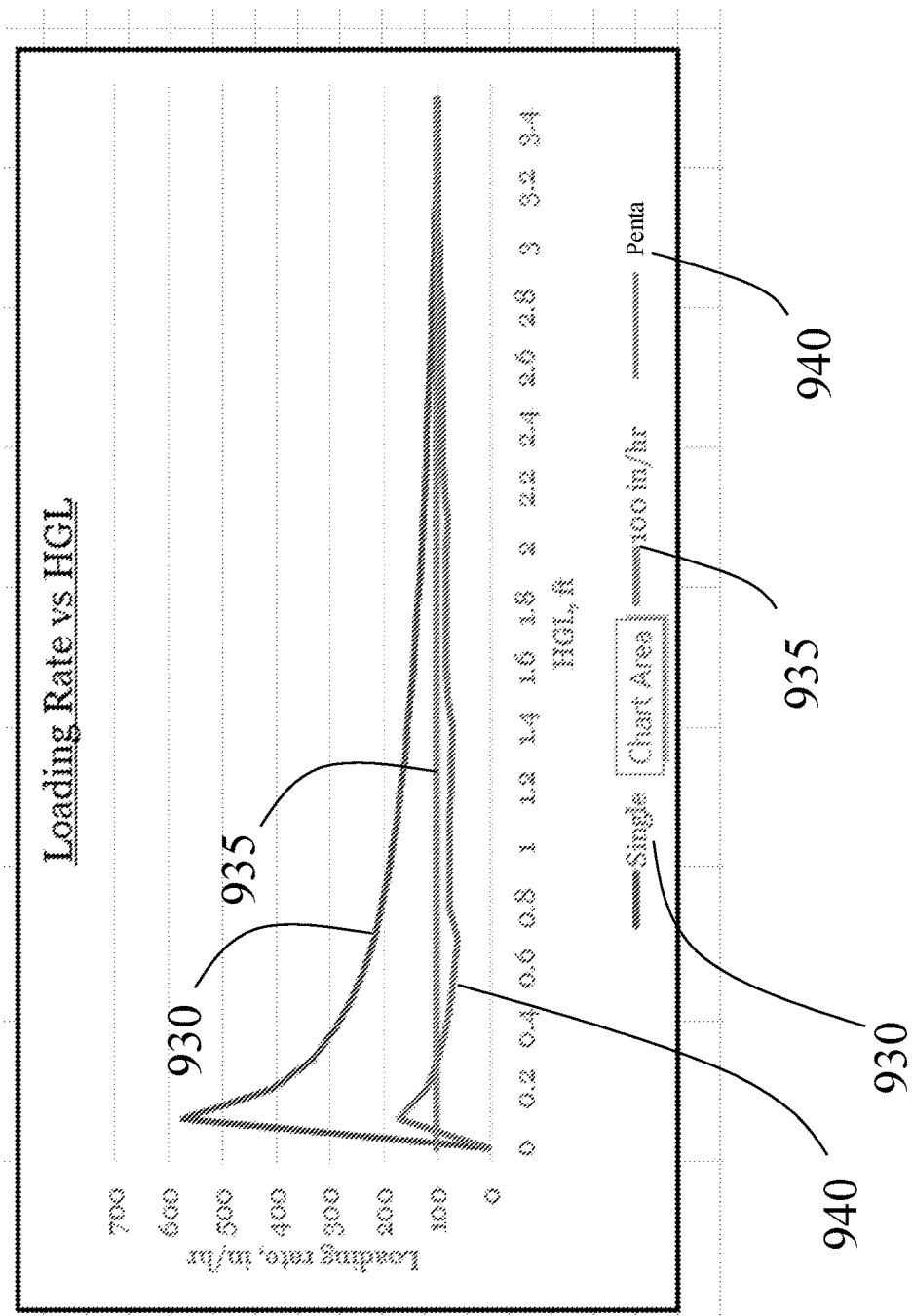
FIG. 27 presents third-party test results of the loading rate of a flow control riser with one orifice versus a flow control riser with five orifices

FIG. 3*b* presents an alternate and an improved embodiment of the collection tube 420, including an internal flow control riser 410 with multiple orifices 435 and a flow control riser bottom seal flange 415. The flow control riser 410 with multiple orifices 435 allows for a consistent loading rate on the media filtration bed 400 during the drain down and fill-up periods or at any water level 940 less than the peak allowable water level in the chamber 100. This is illustrated in FIG. 27 by the multiple (penta) orifice loading rate over different HGLs line 940 in comparison to a single orifice configuration illustrated by line 930. The improved embodiment described above replaces the single restriction plate 440 (single orifice configuration).

The horizontal flow wetland biofilter system, in some embodiments is placed at ground level with the top of the chamber 100 (FIG. 3) equal to the elevation of ground level 220. Stormwater runoff from the surfaces adjacent to the horizontal flow biofilter system is allowed to flow toward and directly into the perimeter catch basin 230 of the chamber. On sides of the chamber 100 in which flow is not needed to enter, a concrete or asphalt curb 260 is built with a top elevation higher than the top of the chamber wall 110. In this embodiment, stormwater or other contaminated waters are allowed to enter the system directly by means of sheet or surface flow.

Hollow Structural Matrix

Figure 6B:
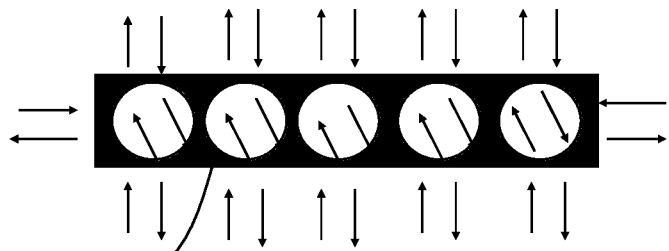
FIGS. 6a and 6b are front and side views, respectively, of an embodiment of the hollow structural matrix illustrating openings on all sides of the hollow structural matrix.
Figure 6A:
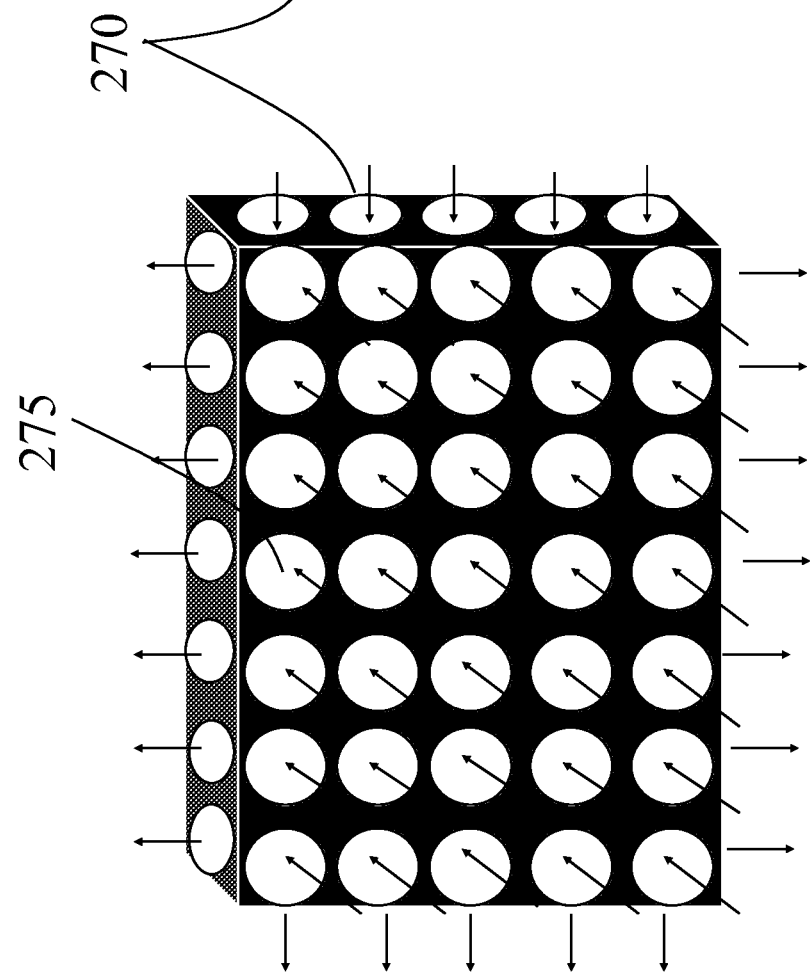

In some embodiments of the horizontal flow wetland biofilter system, the chamber's 100 (FIG. 4) perimeter catch basin 230, is includes a hollow structural matrix 270. The hollow structural matrix 270 has large surface and internal voids which makes up a majority of its volume. FIG. 5 presents the side cut view of the hollow structural matrix 270 within the wetland biofiltration system similar to what is described in FIG. 3 or FIG. 3*a*. The void hollow areas have open paths 275 (FIG. 6) which allows water to flow in any direction unimpeded. The surface of the hollow structural matrix 270 is highly void with the large openings. To prevent granules from the media filtration bed 400 from entering the internal voids of the hollow structural matrix 270 it is covered or wrapped in netting, screen, fiber or similar structural matrix cover 280. The hollow structural matrix 270 is covered in the structural matrix cover 280 on at least the side that is adjacent to the media filtration bed 400 and generally covered on all sides. The hollow structural matrix 270 is strong enough to support the weight of the lateral loading of the media filtration bed 400. In one embodiment, the large hollow voids of the structural matrix 270 are created by a series of circular opening that extend throughout the material on all three plains and are interconnecting and have opening spaces on all internal and external surfaces. The function of the hollow structural matrix 270 is identical to the perimeter catch basin 230 created by the spacing between the chamber walls 110 and the internal permeable walls/partitions 250.

The hollow structural matrix 270 has an internal void space of at least 10% and a void area of at least 25% on its surface, making contact with the media filtration bed 400. Generally, the internal and surface void area of the hollow structural matrix 270 is above 90% and therefore acts and functions just like a 100% void space. Because the hollow structural matrix 270 has a large surface void area, it is commonly covered in a netting, screen, or fabric which have openings smaller than the size of the granular media within the media filtration bed 400. The hollow structural matrix 270 is designed to be strong enough to hold the lateral loading of the media filtration bed 400.

Adjacent Storage and Filtration Systems

Figure 7:
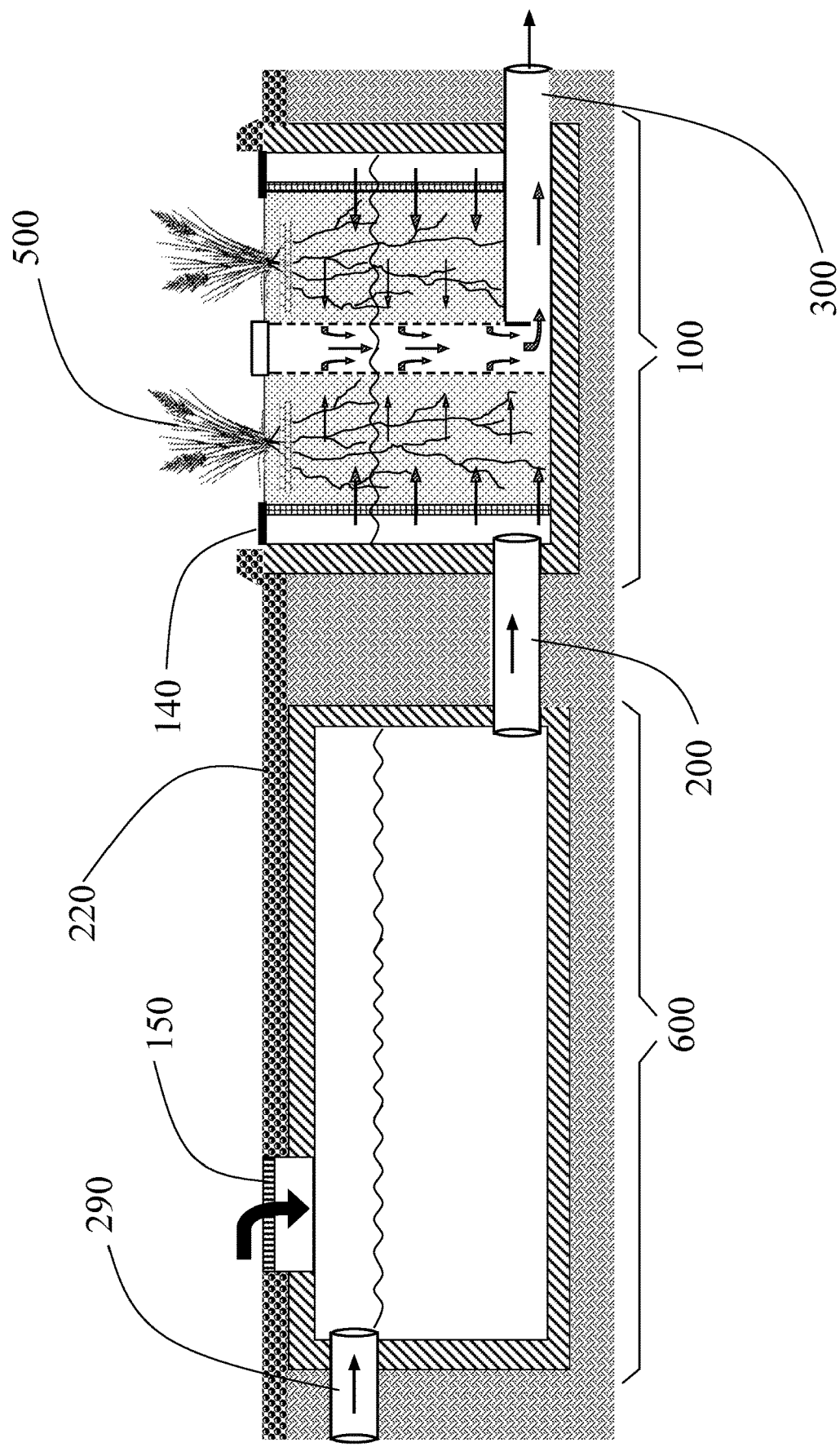
FIG. 7 is a side elevational section view of an embodiment of the horizontal flow wetland biofilter system installed below the ground surface level and in connection with an adjacent underground water storage system.
Figure 8:
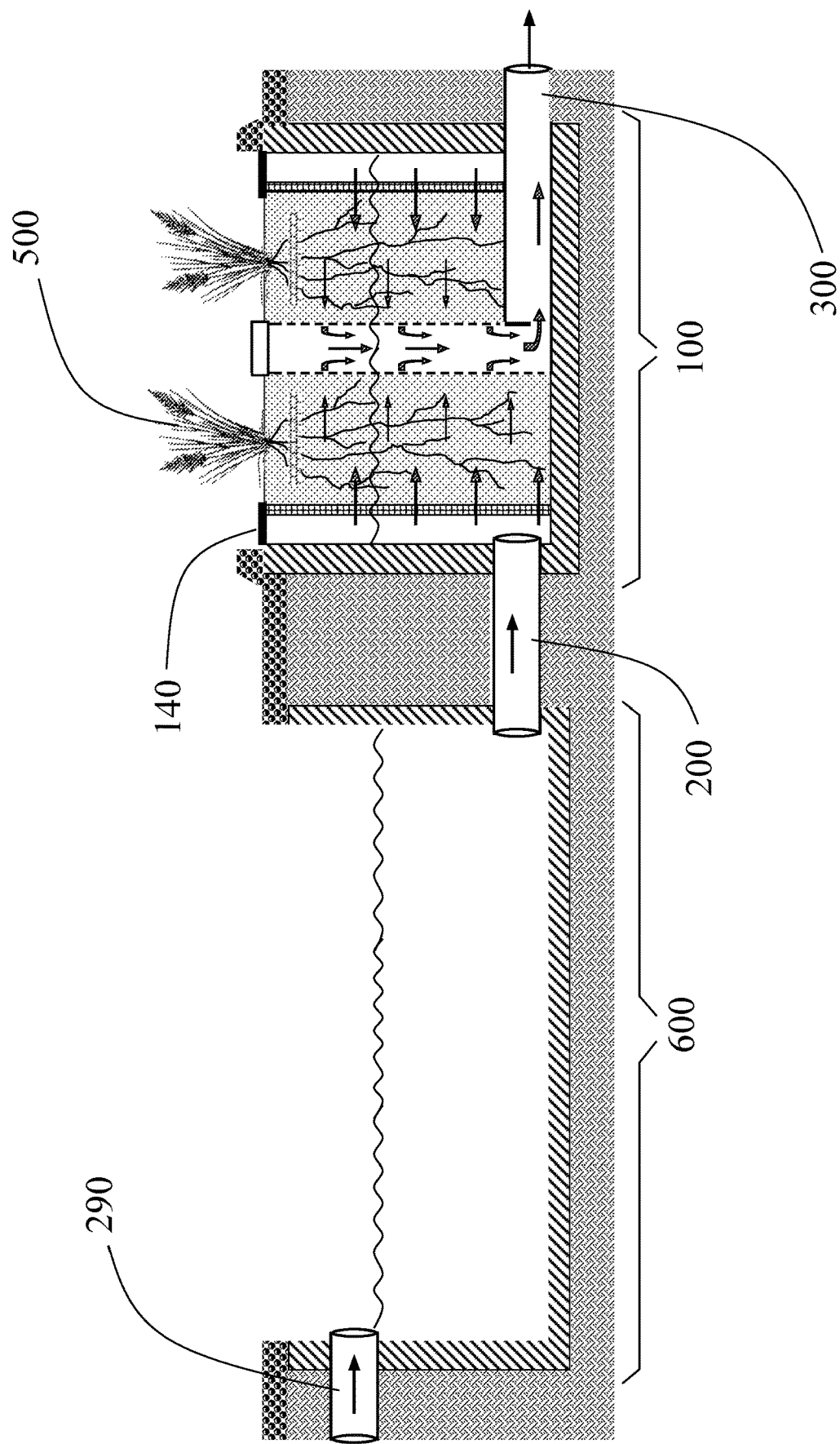
FIG. 8 is a side elevational section view of an embodiment of the horizontal flow wetland biofilter system installed below the ground surface level and connected with an adjacent above-ground water storage system.
Figure 28:
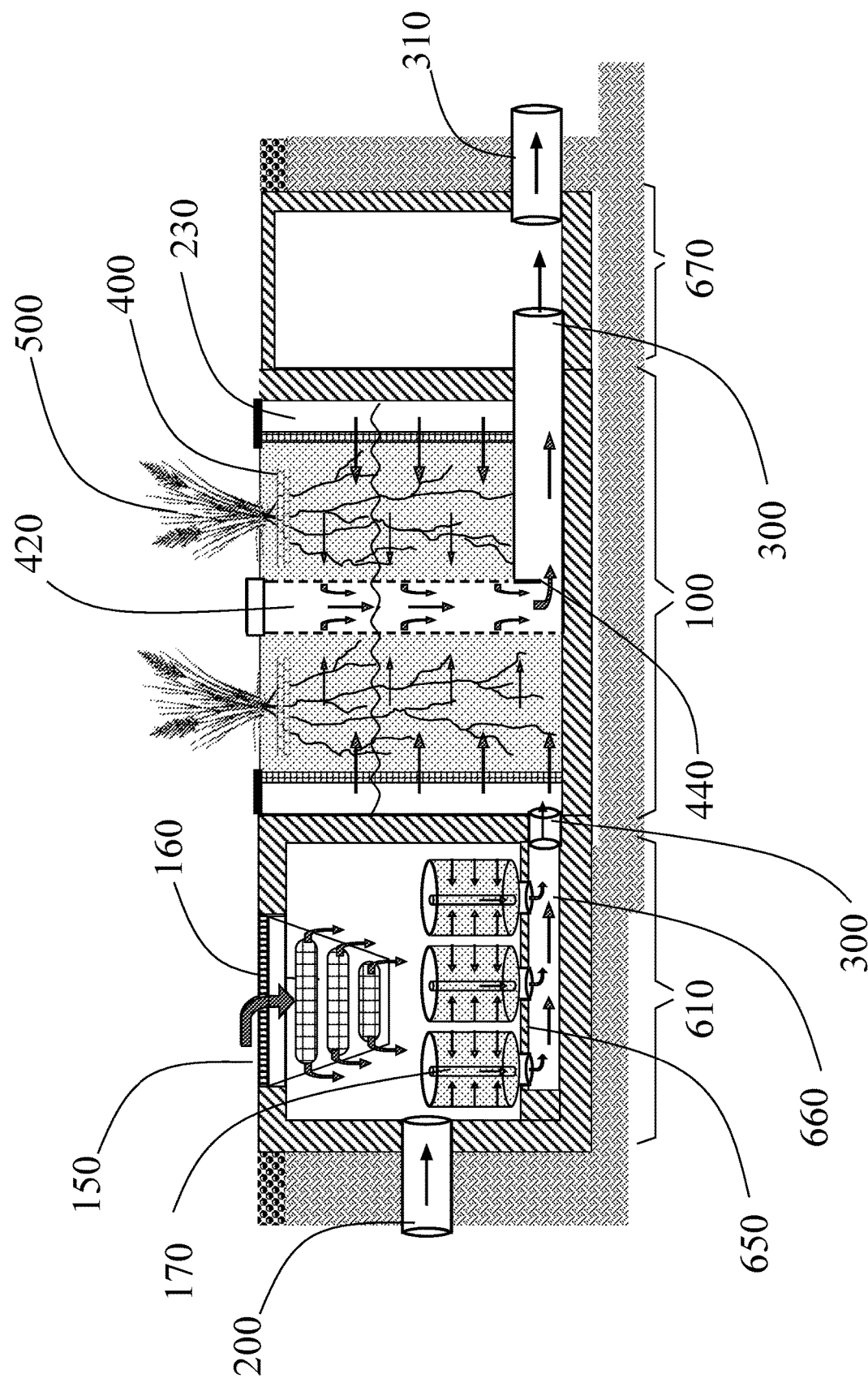
FIG. 28 is a side view of a screening basket installed within the horizontal flow wetland biofilter system with a catch basin and discharge chamber.
Figure 28A:
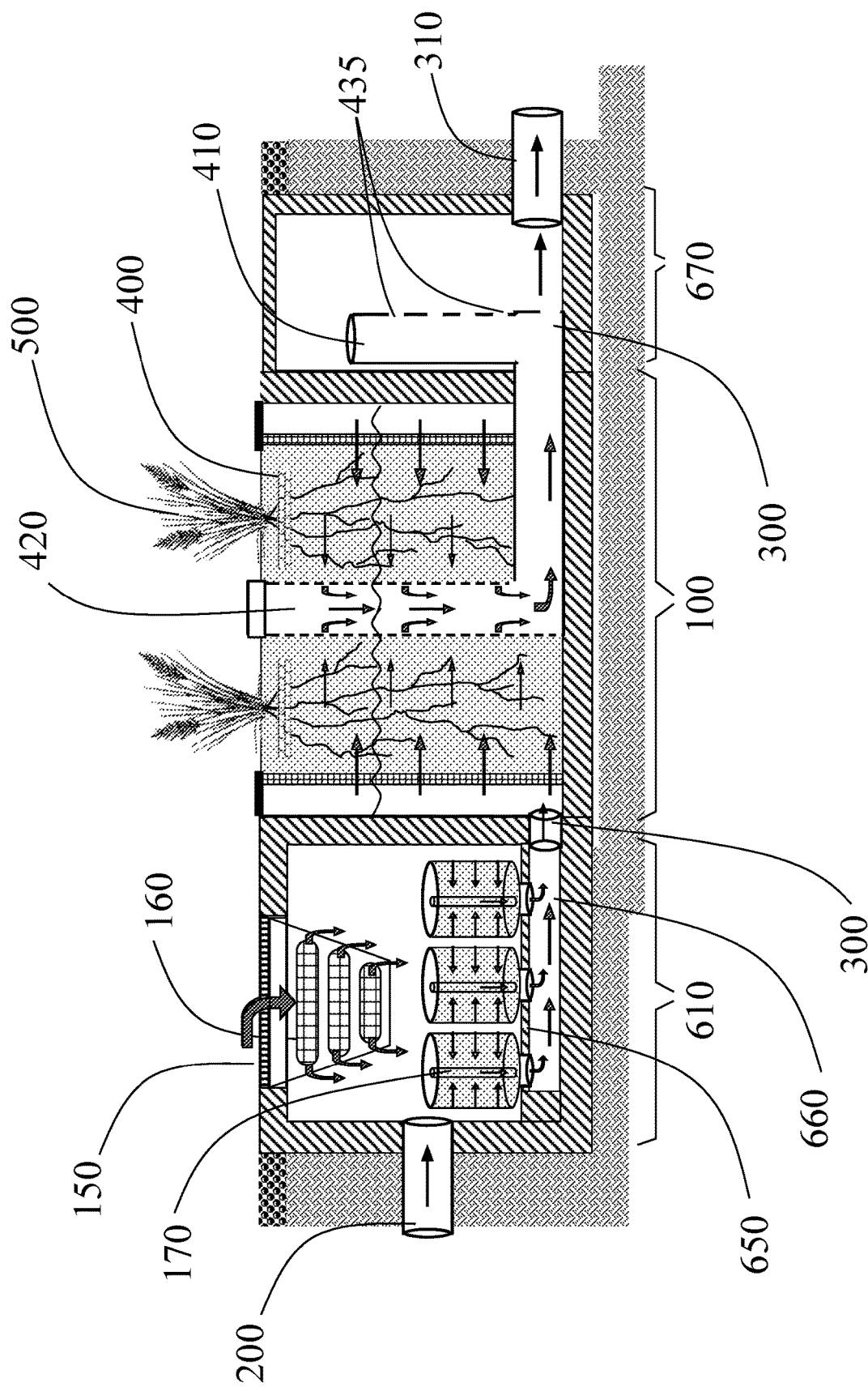
FIG. 28a is a side view of a screening basket installed within the horizontal flow wetland biofilter system with a catch basin and discharge chamber and a flow control riser with multiple orifices.
Figure 32:
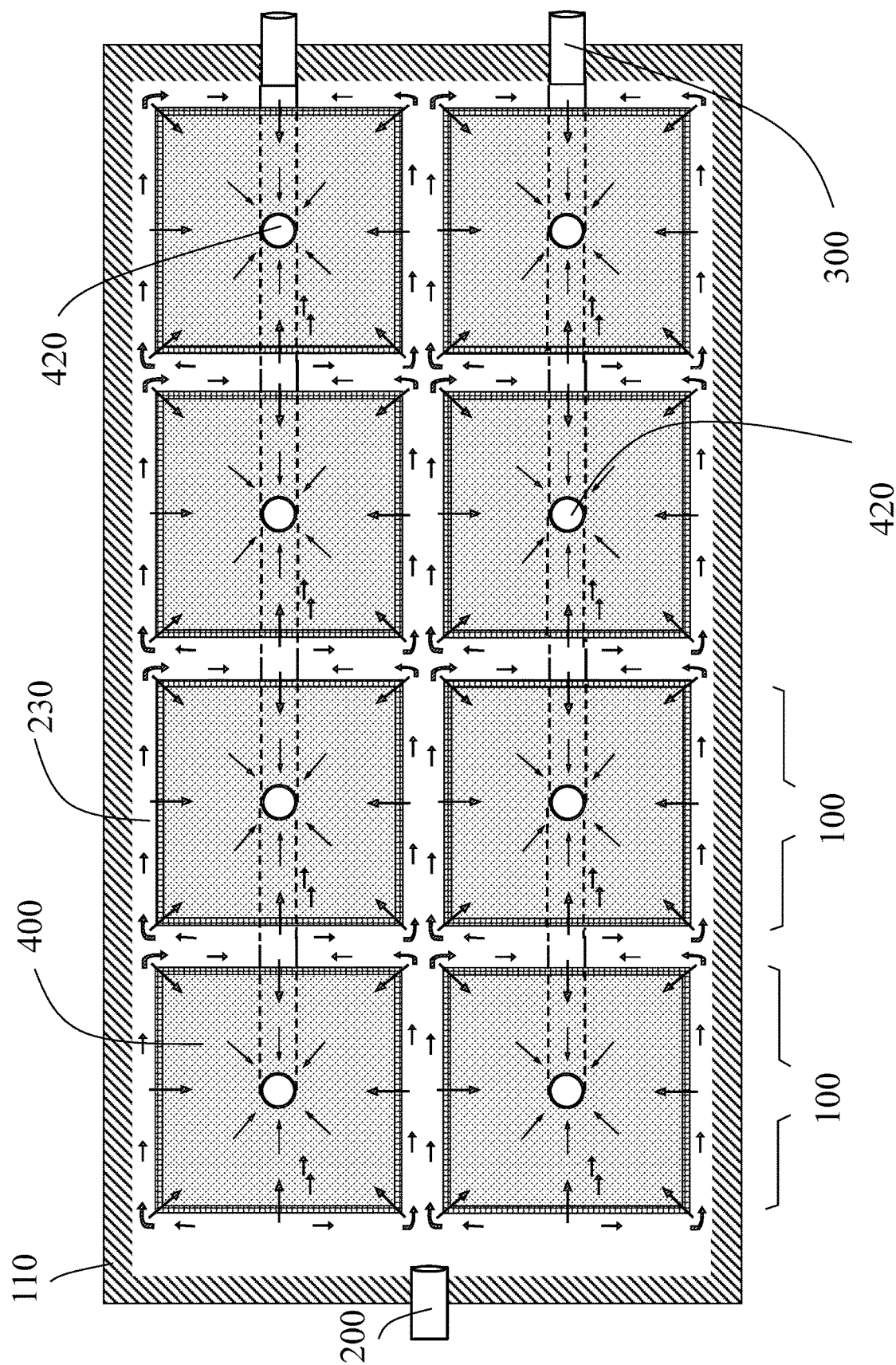
FIG. 32 is a top view of multiple horizontal flow wetland biofilter chambers assembled side-by-side.
Figure 33:
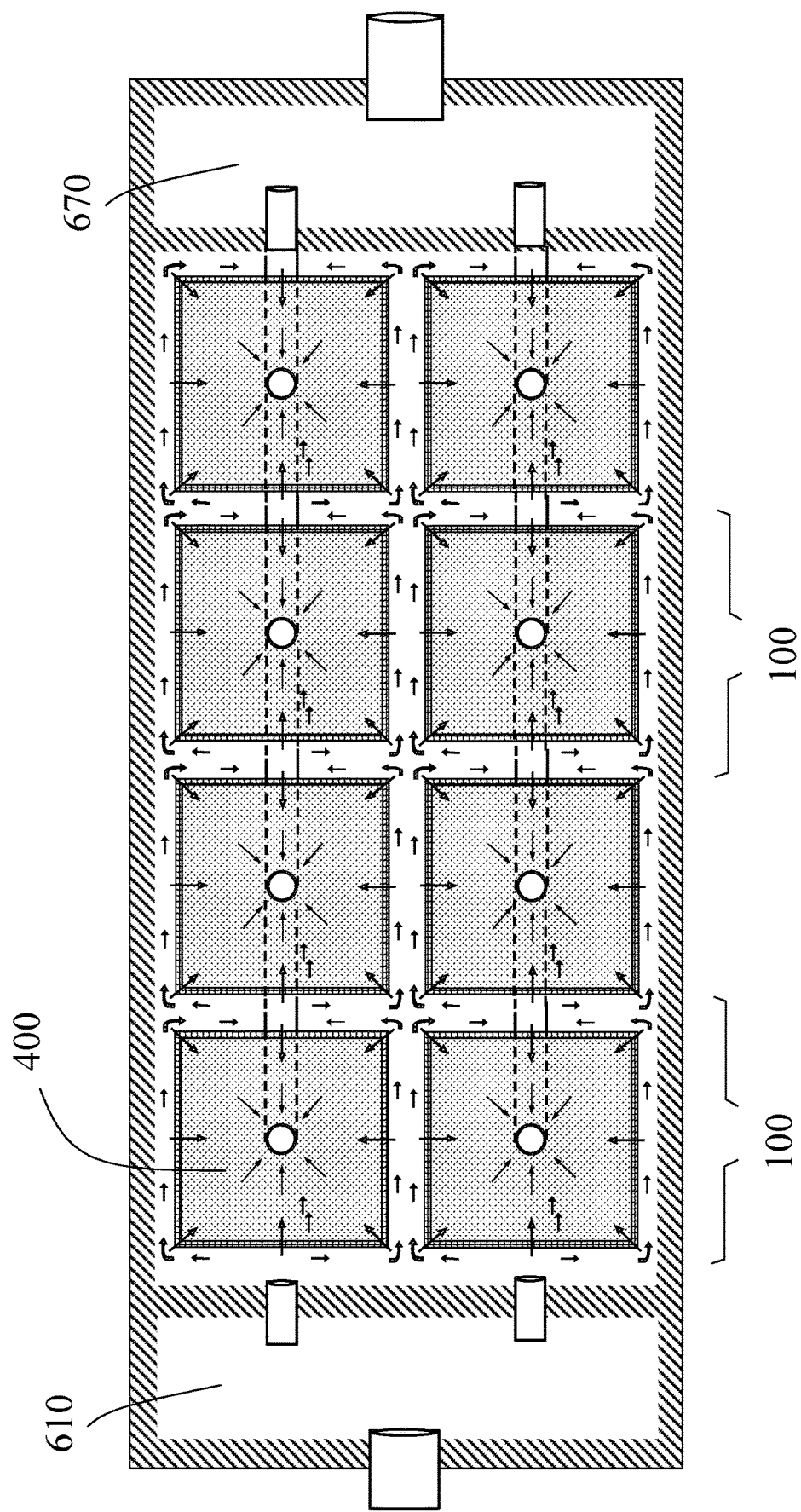
FIG. 33 is a top view of multiple horizontal flow wetland biofilter chambers assembled side-by-side and a pretreatment chamber and discharge chamber.
Figure 34:
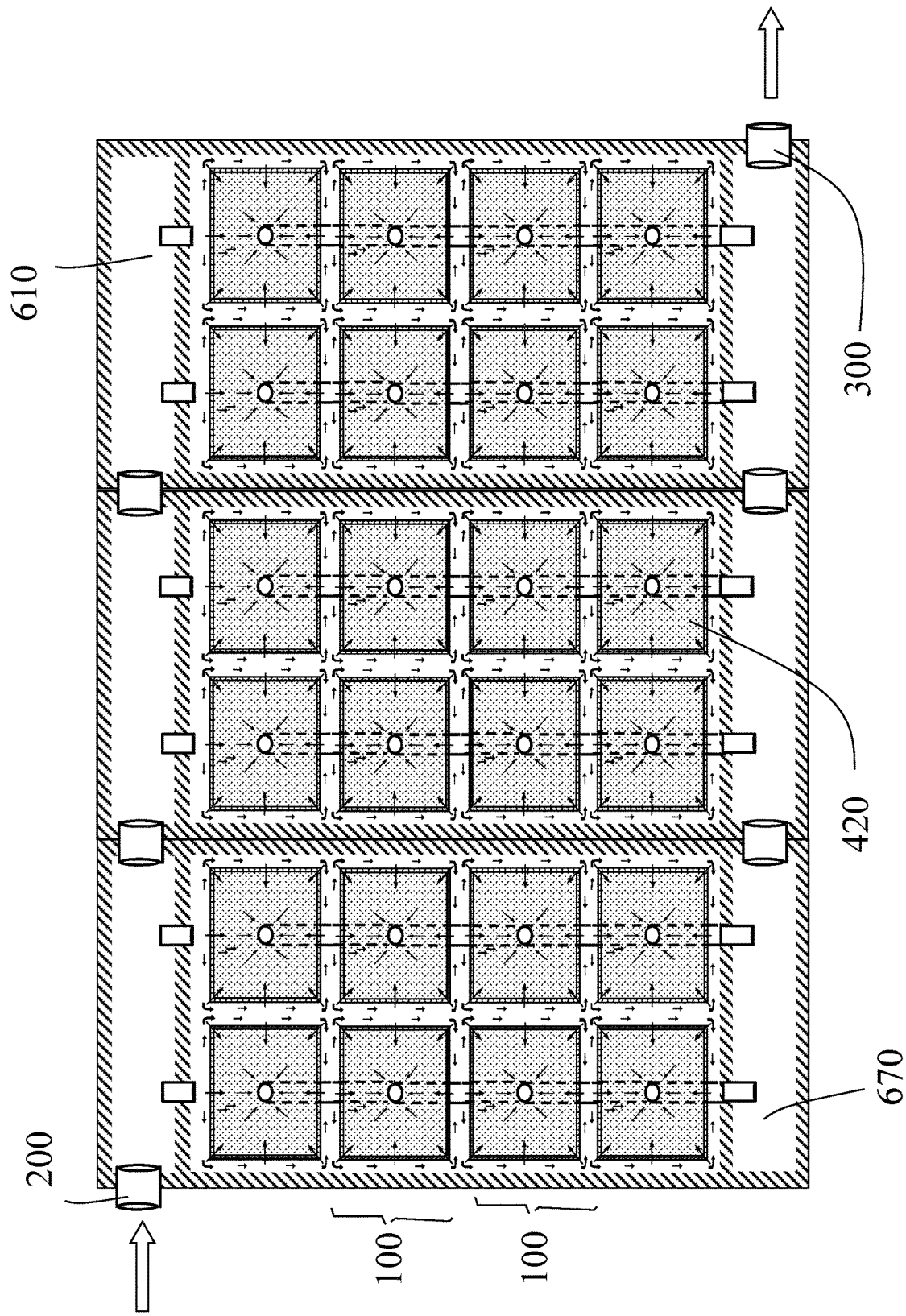
FIG. 34 is a top view of multiple horizontal flow wetland biofilter chambers with assembled side-by-side and end-to-end.

The horizontal flow wetland biofilter system is designed to be used as a standalone treatment system (for example, FIGS. 1, 2, 3, 3a, 4, 5, 32, and 35) or in combination with upstream treatment or storage (FIGS. 28a, 33, and 34). It may also be designed with more than one chamber 100 assembled side-by-side (FIG. 35) or side-by-side and end-to-end (FIG. 36). In another embodiment, the chamber 100 is used in combination with an upstream storage system 600 which is placed below ground with a solid top (FIG. 7) and includes either an inflow pipe 290 from upstream collection systems and/or an grated opening 150 built into the solid top to allow water to be directly conveyed into the storage system 600. The storage system 600 can also have an open top (FIG. 8) which are commonly known as ponds, detention basins, or bio swales. As water enters the storage system 600 the water level builds. As the water level builds it provides the head pressure needed to allow the water to enter the chamber 100 through a connecting chamber inlet pipe 200. As the water level builds in the storage system 600 it will build inside the perimeter catch basin 230 or hollow structural matrix 270 of the chamber 100. Also, as water builds, it is forced through the media filtration bed 400 and toward the center-oriented, vertical collection tube 420 with horizontally perforated slots 425. The collection tube 420 with horizontally perforated slots 425 collects the treated water and conveys it downward and through the restriction plate (single orifice configuration) 440 and out of the chamber 100 via the chamber outlet tube 300. The top of the chamber 100 has its catch basin covered by plates or caps 140 that are removable in configurations in which water is not wanted to enter directly into the perimeter catch basin 230.

Pretreatment Chamber

Figure 9:
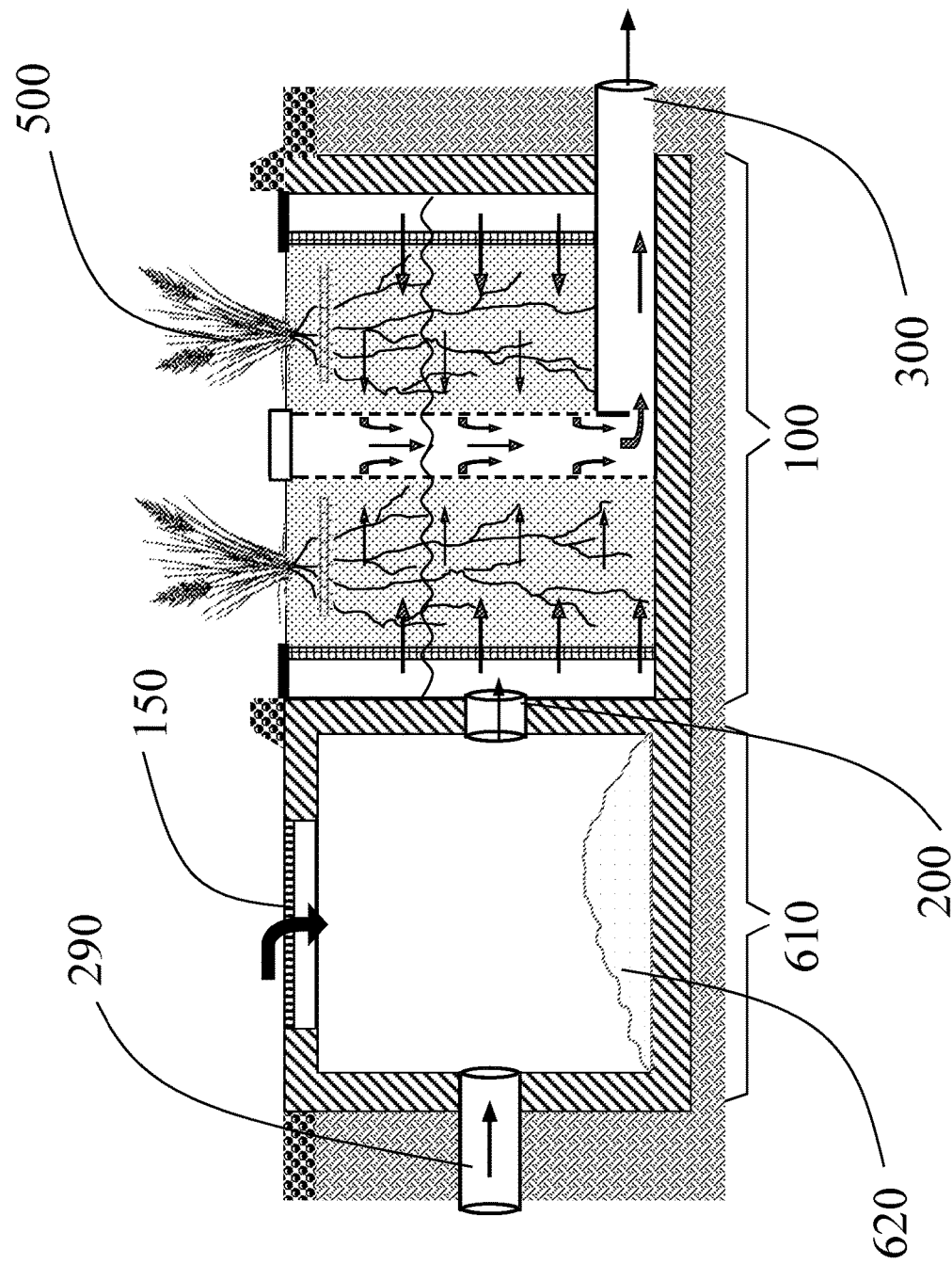
FIG. 9 is a side elevational section view of an embodiment of the horizontal flow wetland biofilter system installed below the ground surface level and separated by a common wall from an adjoining chamber which contains a settling area.

The chamber 100 of the aforementioned embodiments can also be placed adjacent to a pre-treatment chamber 610 that houses other treatment processes to remove specific pollutants before entering the treatment chamber 100 of the said invention. The pre-treatment chamber is housed in the same horizontal flow wetland biofilter system, but is separated by a common wall 110. The pre-treatment chamber 610 contains an open area to encourage 665 settling of particulates. The pre-treatment chamber 610 may include a screening basket 160 (FIG. 10) under the grated curb 150 (FIG. 9) or pipe opening into the chamber to remove trash and debris.

The two-chamber system (FIG. 9) with the chamber 100 and a pretreatment chamber 610 share a common wall 110 and are interconnected via pipe or other opening 200. In one embodiment the pretreatment chamber 610 is designed with a large settling area 620 with the inflow pipe 290 and the pipe or opening 200 interconnecting the pretreatment chamber 610 and treatment chamber 100 raised off the floor to allow for the accumulation of sediment and other particulates. Water can also enter the pretreatment chamber from the top via a grated or curbed inlet 150. In this embodiment the horizontal flow wetland biofilter system is a complete multi-stage treatment device for contaminated water containing various concentrations of particulate and dissolved pollutants. To provide additional treatment stages the grate or curb opening 150 located in the top of the pretreatment chamber (FIG. 10), the screening basket 160 can remove large solids such as trash and debris. The screening basket also prevents floatables from accumulating in the settling area 620.

In further embodiments, the pretreatment chamber 610 (FIG. 11) is fitted with square, rectangular or round filter cartridges 170 which contain filtration media with a central tube which is perforated to collect water and convey it through a false floor 650 and convey the water into a horizontal under drain pipe 660 which is connected to a pipe or opening 200 that transfers water into the perimeter catch basin 230 or hollow structural matrix 270 of the downstream treatment chamber 100.

Figure 12:
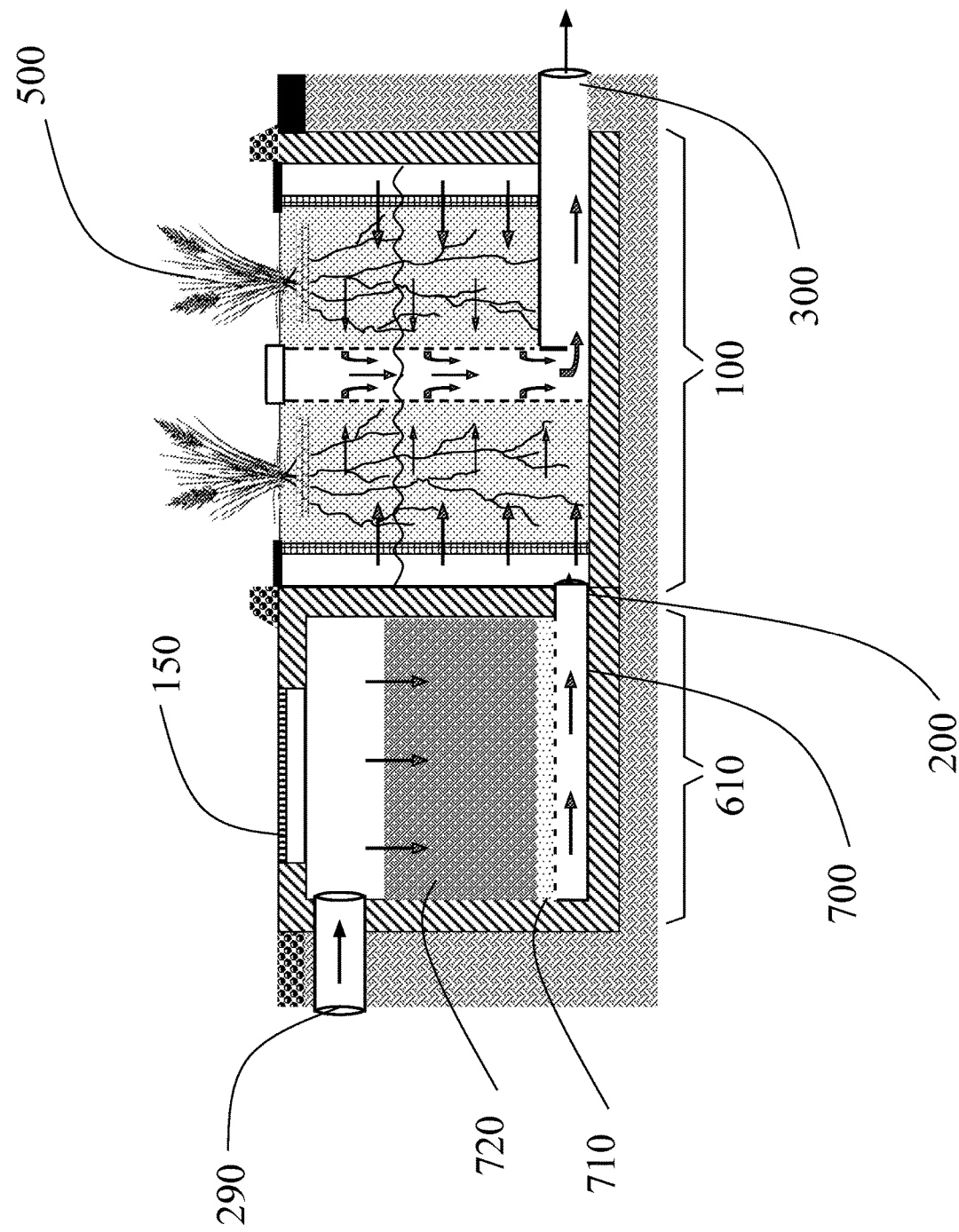
FIG. 12 is a side elevational section view of an embodiment of the horizontal flow wetland biofilter system where the adjoining chamber contains a media filtration bed with a lower drain and a solid top.
Figure 13:
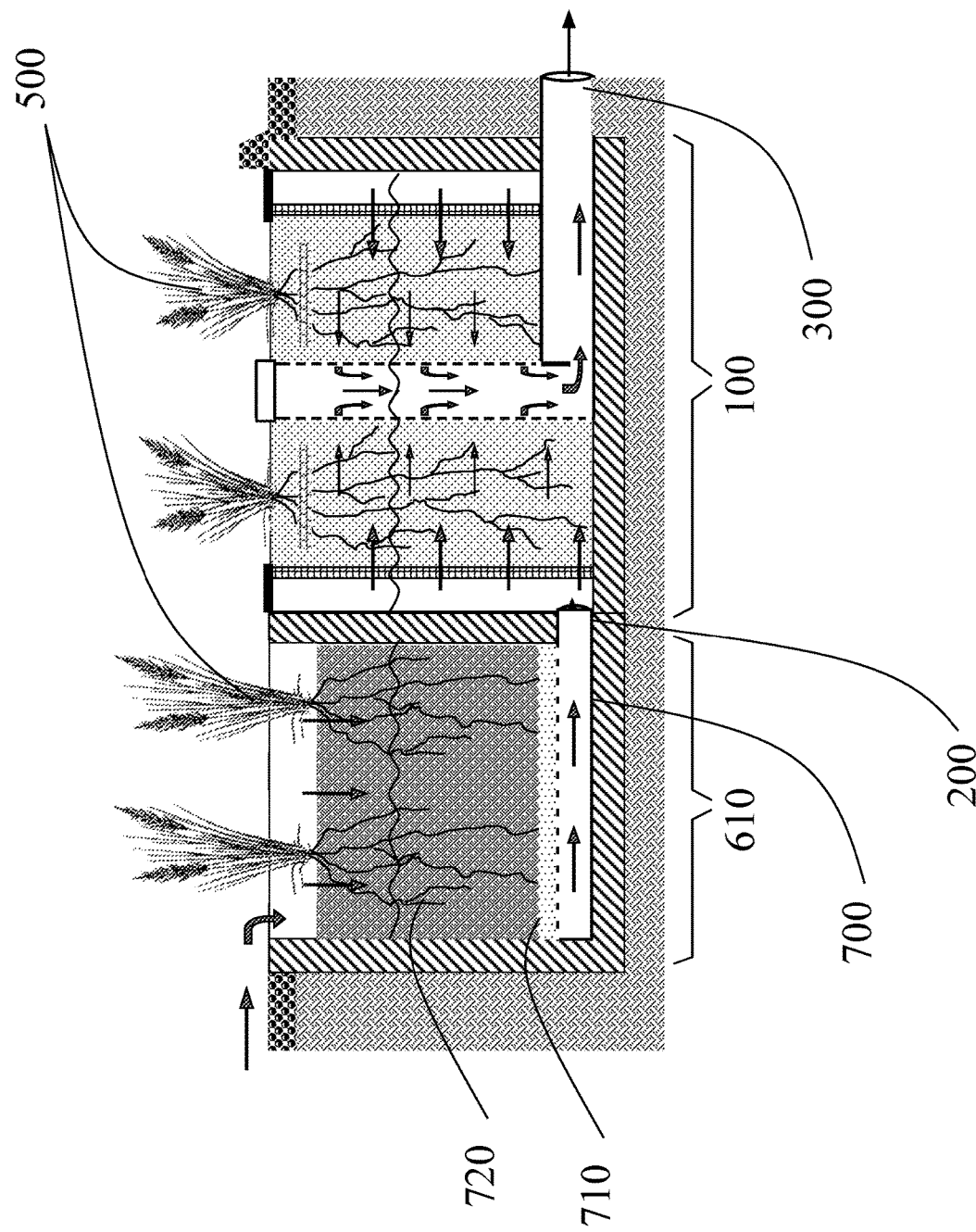
FIG. 13 is a side elevational section view of an embodiment of the horizontal flow wetland biofilter system where the adjoining chamber contains a media filtration bed with a lower drain and an open top.

In other embodiments (FIG. 12), the pretreatment chamber 610 is filled with filtration media 720 the size of a majority of the height of the chamber. Under the filtration media 720 is an underdrain material 710 made of a granular substance which are larger in size than the granules of the filtration media 720. Underneath the under drain material 710, laying horizontally on the bottom of the pretreatment chamber 610, is a pretreatment perforated tube 700 which collects treated water and conveys it through a pipe or opening in the chamber wall 200 and into the perimeter catch basin 230 of the treatment chamber 100. The pretreatment chamber 610 in some embodiments (FIG. 13), has an open top in which water can enter the chamber directly from the surface and flow downward through the filtration media 720. In this embodiment, the filtration media 720 is exposed and incorporates living vegetation 500.

Figure 14:
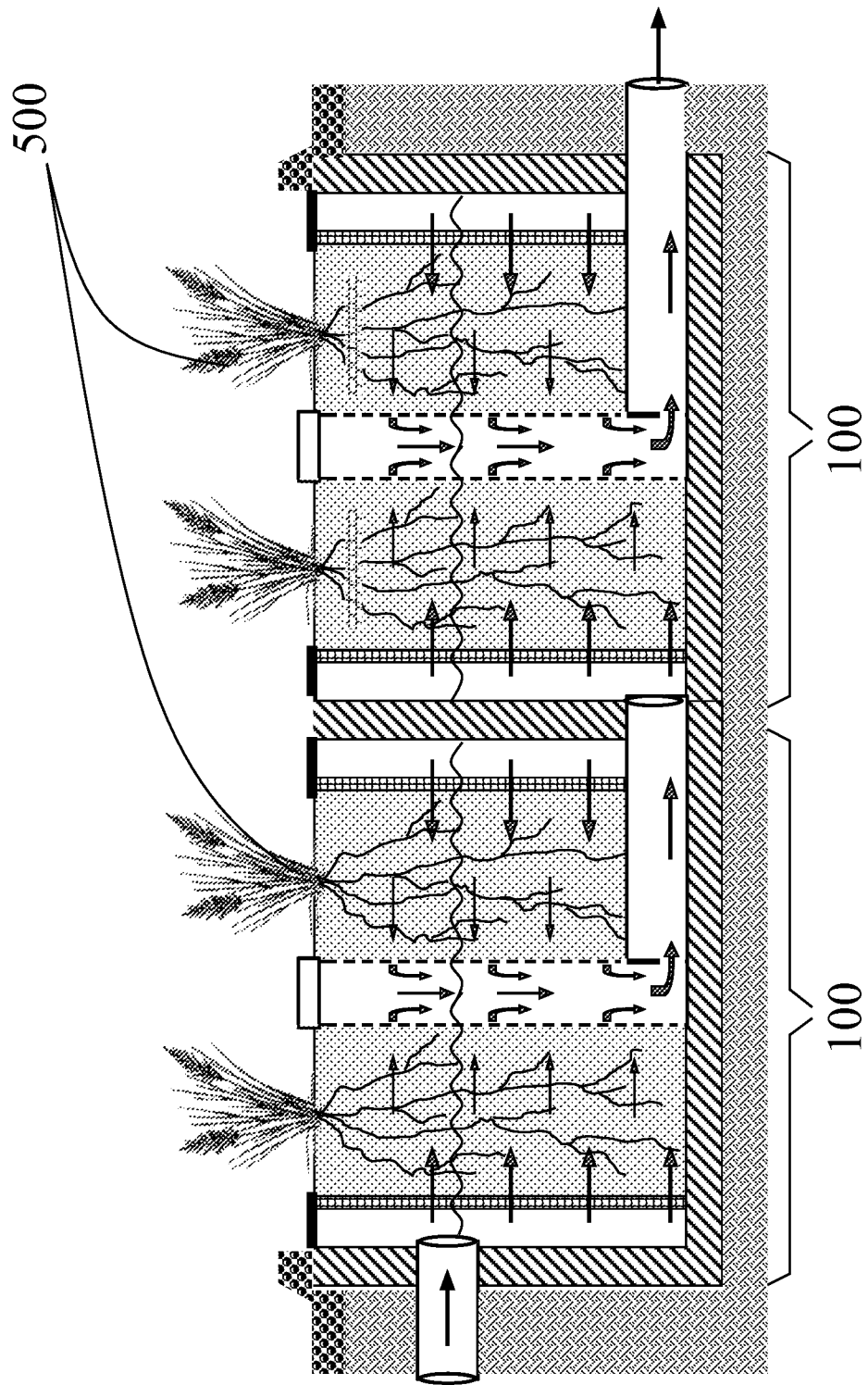
FIG. 14 is a side elevational section view of an embodiment of the horizontal flow wetland biofilter system where the system is connected with an adjacent horizontal flow wetland biofilter system.

The design of the horizontal flow wetland biofilter system chamber 100 is modular. Its design allows it to be shaped in various sizes. In some embodiments (FIG. 14), multiple chambers 100 can be placed side-by-side as individual structures or share the same structure with a common and adjacent wall 110 separating them. This configuration allows the system to be used to treat a wide variety of pollutants with each chamber housing different filtration media targeted at treating different pollutants.

Restriction Plate

Figure 15:
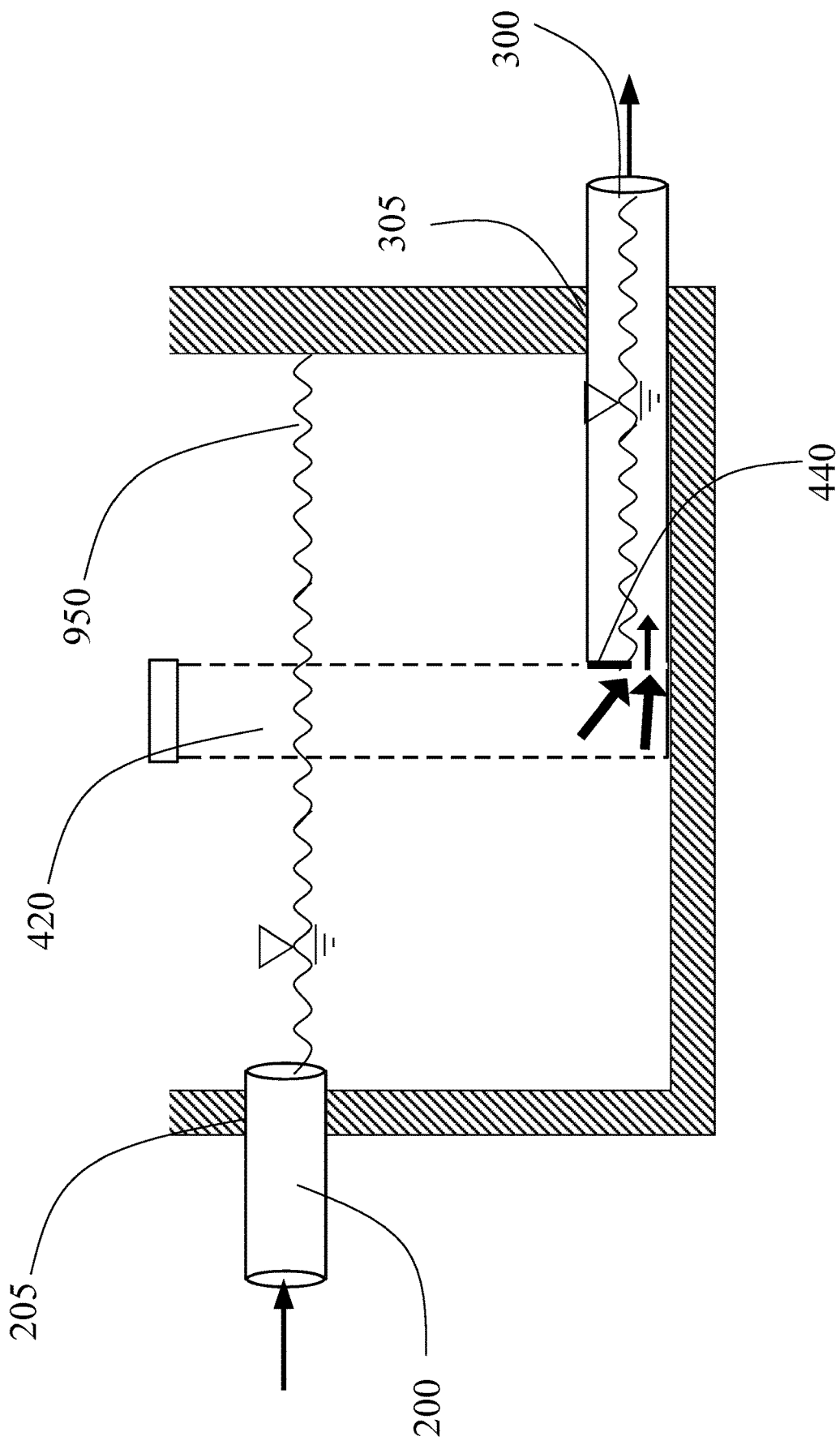
FIG. 15 is a side elevational section view of an embodiment of the horizontal flow wetland biofilter system illustrating hydraulic grade lines in the chamber upstream and downstream of an orifice flow control plate.

Flow control through the chamber 100 is important in order to control the loading rate on the media surface and hydraulic retention time within the media filtration bed 400. Surface loading rate and hydraulic retention time are important variables that affect the performance of the media and its ability to remove pollutants. Specific retention times are needed, specifically to allow for certain chemical reactions such as precipitation and ion exchange to occur between the surfaces of the media granules and dissolved pollutants. Most biofilter systems use the filter media itself as the controlling factor or critical point of restriction for water flow through the system. The problem with this design is that as the media starts to clog, the flow rate through the media decreases and the peak treatment flow rate designed for a system is no longer achieved. To overcome this downfall the horizontal flow wetland biofilter system (FIG. 15) is designed with a restriction plate 440 (orifice) in the horizontally laying chamber outlet tube 300 which becomes the critical point of water flow restriction in the system. The restriction plate 440 creates a singular orifice configuration in the collection tube 420. The maximum amount of flow that can go through the orifice at peak hydraulic head is less than the hydraulic conductivity of the media filtration bed 400. An additional improvement presented here also includes a flow riser 410 with multiple orifices 435, which offers even greater control of the flow rate through the wetland biofiltration system. Each of these, either separately or in varied combinations, allow the system to continue and operate at the same peak flow rate even as the filter media may start to clog. These devices ensure the system treats the specified amount of contaminated water over an extended period of time.

In some embodiments, the restriction plate (single orifice configuration) 440 is of specific size, hydraulically calculated, and tested to allow a set amount of water to process through the system when water within the chamber is at maximum level. The restriction plate (single orifice configuration) 440 sets the peak treatment flow rate in the system. The flow through the restriction plate 440 is less than the flow rate through the media filtration bed 400 itself. This provides a safety factor to account for any clogging that may occur overt time within the filter media itself. Other systems peak treatment flow rate is controlled by the hydraulic conductivity of the media itself. With these other systems taught in the art, as clogging of their media starts to occur, the flow rate through the media filtration bed 400 decreases and therefore is no longer treating the amount of water it was designed to treat.

Flotation Valve

Figure 16:
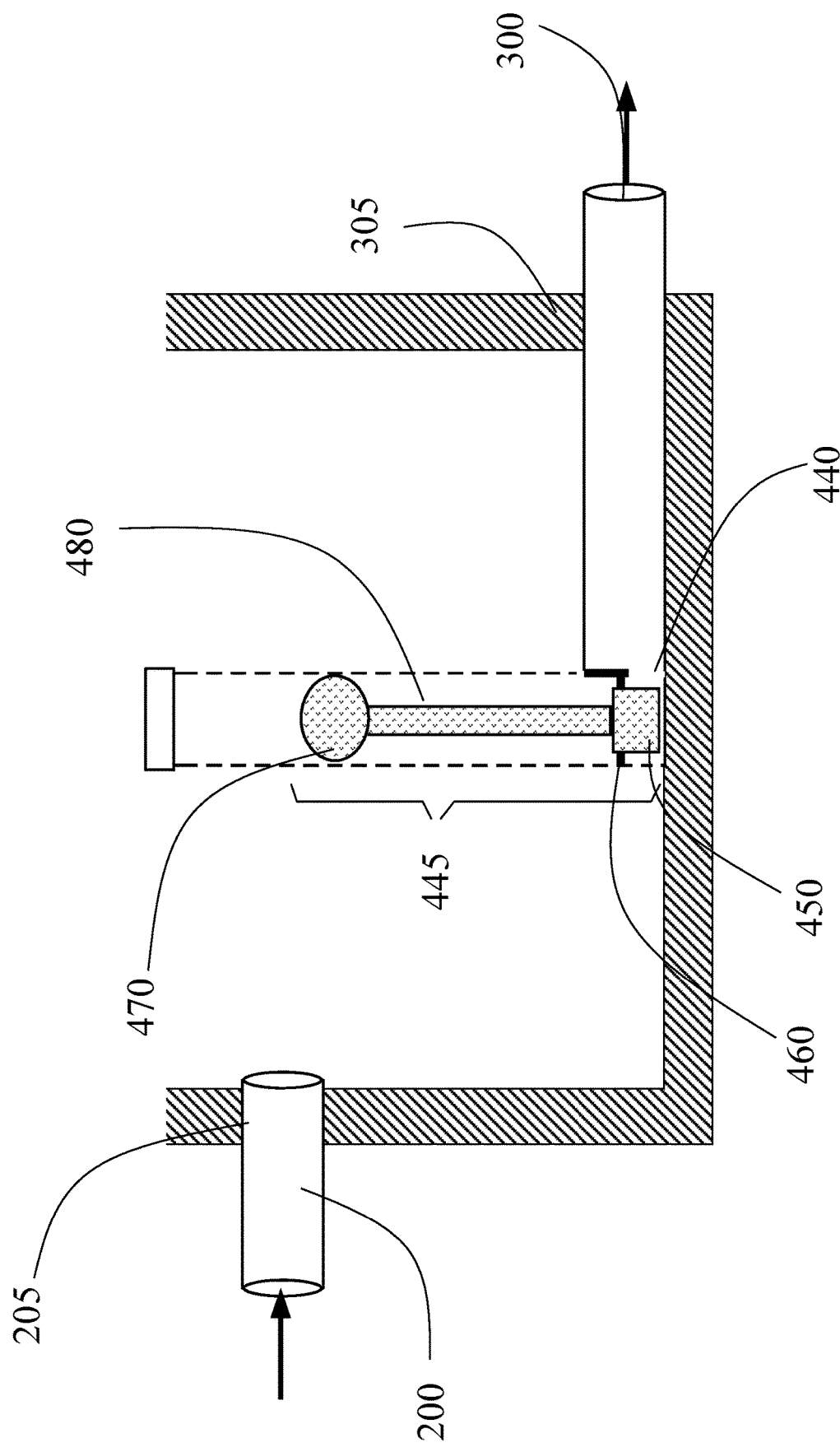
FIG. 16 is a side elevational section view of an embodiment of the horizontal flow wetland biofilter system with a perforated tube containing a float valve in a closed position.
Figure 17:
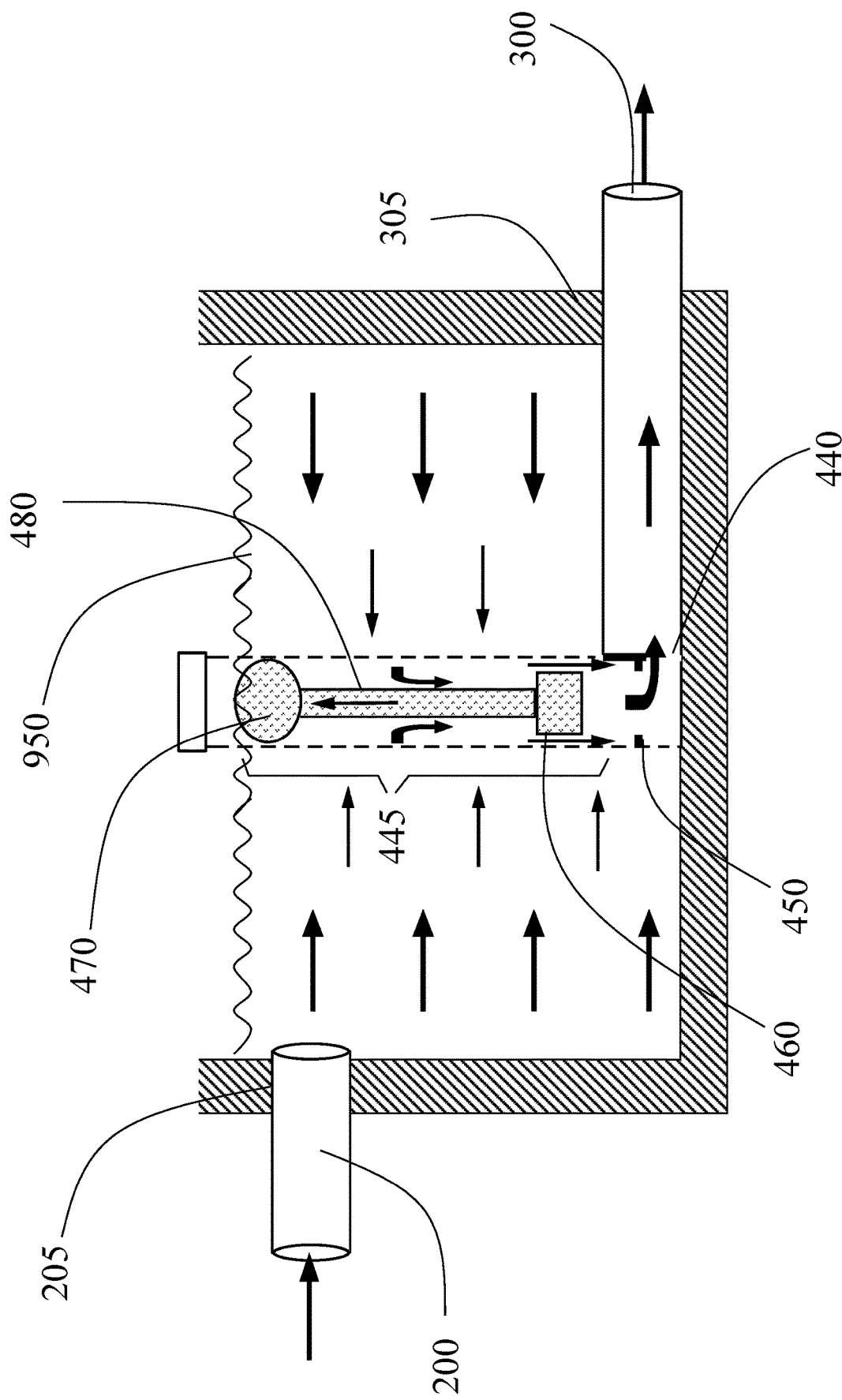
FIG. 17 is a side elevational section view of an embodiment of the horizontal flow wetland biofilter system illustrating the float valve in an open position.
Figure 18:
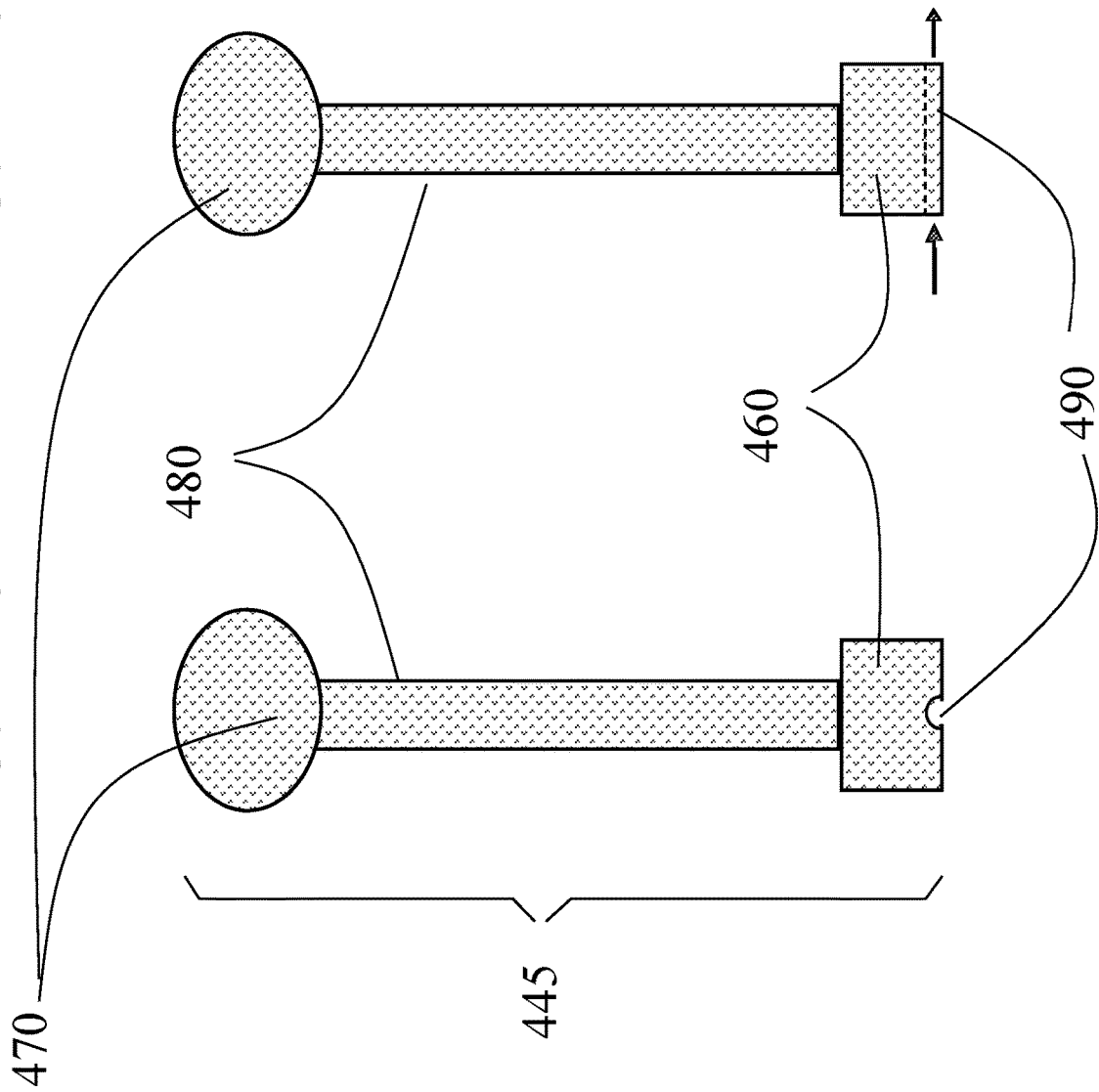
FIGS. 18a and 18b are side and front views, respectively, of a float valve with a small flow orifice extending along a base of a valve stop.

In one exemplary embodiment, the flow control through the system is further enhanced (FIG. 16) by the inclusion of an internal floatation valve 445 housed inside the collection tube 420. The collection tube 420 controls at what level the water must reach in the chamber before it is allowed to discharge out of the chamber. The reason for this the collection tube 420 is to ensure even distribution of contaminated water throughout the vertical height of the media filtration bed's 400 surface area over a range of different flow rates which correlate to the wide variation of rain fall patterns. The flotation valve 445 has three pieces: the float 470, the connecting rod 480 and the valve stop 460. The bottom of the collection tube 420 with horizontally perforated slots 425 has a valve seat 450 that prevents water from flowing through it and into the restriction plate (single orifice configuration) 440 located in the horizontally lying chamber outlet tube 300 when the internal floatation valve 445 is in the off position. The internal float valve remains closed until the water level in the chamber 100 reaches a level greater than 50% the height of the chamber (FIG. 17). Once the water reaches the specified height the internal float valve 445 raises with the water level and the valve stop 460 rises above the valve seat 450 and allows the water to pass downward around the valve stop 460 and through the valve seat 450 and then travels through the restriction plate (single orifice configuration) 440 and exits the chamber through the horizontal chamber outlet tube 300 which passes through the opening in the chamber wall 305. The internal float valve will once again close as water flow to the chamber 100 ceases and the water level falls below 50% the height of the chamber 100. To allow the water to drain all the way to the bottom of the chamber after the internal float valve 445 closes and the valve stop 460 sets inside the valve seat 450, a small flow orifice 490 is located on the bottom of the valve stop 460 and spans the length of the valve stop 460 (FIGS. 18*a*, 18*b*). FIG. 18*a* illustrates a front view of the small flow orifice 490 showing the opening, while FIG. 18*b* illustrates a side view showing the flow of influent from a rear opening to a front opening of the small flow orifice 490. A very small amount of flow is allowed through this small flow orifice 490 which is substantially smaller than the restriction plate (single orifice configuration) 440, and it therefore allows the chamber 100 to drain dry during periods when no water is being treated. Typically, the flow rate though the small flow orifice 490 is less than one tenth the peak treatment flow rate of the treatment chamber.

Catch Basin Features

The configuration of the filtration chamber 100 with a perimeter catch basin 230 that extends vertically between the media filtration bed 400 and the walls 110 serves two distinct and unique advantages over traditional downward flow media filtration beds. First, it maximizes the initial media surface area for a given volume of liquid and thereby lowers the hydraulic loading rate on the media. The increased surface area improves performance and longevity of the biofilter apparatus and also provides an area for larger particulates that are contained in the influent contaminated water to settle out before the water penetrates the filtration media. Secondly, the horizontal flow prevents the larger particulates from accumulating on top of a media filtration bed 400, as with a downward flow system where influent water is received on a top portion of the apparatus. The design presented herein is especially apt for treating contaminated water from parking lots, roads, rooftops and other areas which contaminated stormwater can originate.

Media Filtration

The media filtration bed 400 contains granular filtration media such as, but not limited to: zeolite, expanded aggregate, perlite, activated charcoal, activated alumina, iron oxide, polymers, waste water residuals and other physical, biological, or chemical filter media. The media filtration bed 400 incorporates a layer of non-organic soilless growing media near the top of the media filtration bed 400 column to assist in the establishment of vegetation 500 and to promote growth and longevity of vegetative life. It does so by retaining moisture close to the surface for roots 520 to tap into and establish themselves. The non-organic soil-less growing media, such as stonewool or rockwool holds substantial moisture and provides an ideal air to water ratio which is ideal for plant growth.

Horizontal Flow

Other flow paths such as horizontal or upward vertical flow have proven to have fewer issues with clogging. Vertical upward flow has the least amount of clogging issues but also has the most issues with channeling. The horizontal flow path provides minimized clogging and channeling concerns and promotes good performance and longevity in biofilter systems. Systems with horizontal flow media bed filtration also have the advantage of being able to accept incoming stormwater subsurface via pipe or upstream storage system while still being able to grow vegetation on the upper surface. Traditional downward flow systems have limitations in this area along with having a large head drop between inflow and outflow points. In contrast, horizontal flow systems do not need a large head drop between inflow and outflow points, as the hydraulic force of the water itself drives it through the filtration media.

The horizontal flow path also allows the biofilter apparatus to be easily connected to an adjacent pretreatment chamber 610 which may house other forms of treatment such as screening, separation and media filtration. These other forms of treatment can be easily incorporated without additional head drop to further reduce the risk of clogging to the media filtration bed.

Additionally, horizontal flow into and through the media clogs slower when compared to downward flow media bed filtration systems. Horizontal flow path media filtration beds have the initial media surface extending vertically so that the contaminated water makes contact first with the media surface. Therefore, the media surface is parallel to the force of gravity, which causes particles that make contact with the surface of the media to fall off and travel downward away from the surface of the media.

Figure 20:
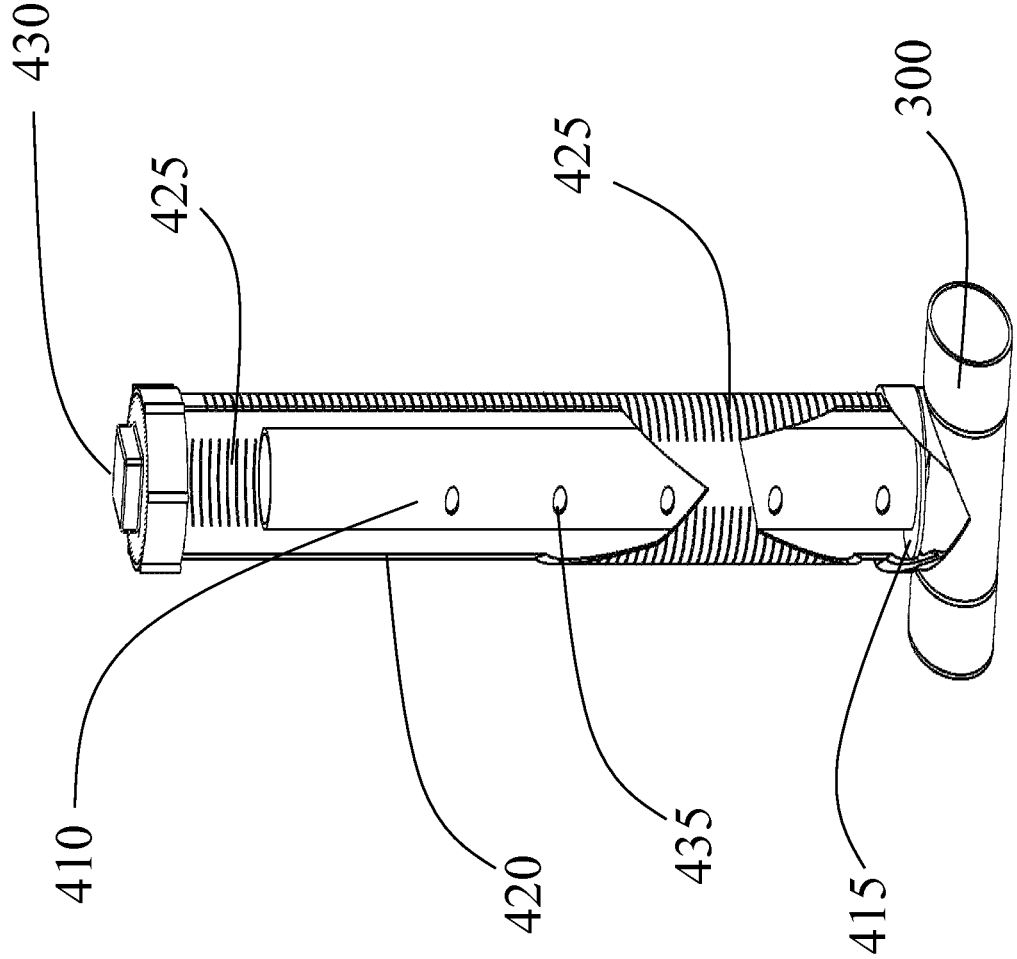
FIG. 20 is a cut-away view of a flow control riser with multiple orifices.

FIG. 20 begins to introduce a new element of the system which has previously been presented in related applications and the new element significantly improves functionality of the system. FIG. 20 features a cutaway view of the flow control riser 410 with multiple orifices 435. A preferred embodiment is to include five, (Penta) orifices 435 as show within the collection tube 420 with horizontally perforated slots 425. Water passing into the collection tube 420 via the perforated slots 425 encounters the flow control riser 410. The contained multiple orifices 435 controls the flow out of the flow control riser 410 through specific placement and size derived by calculations in a computer program to obtain the optimal discharge rate as illustrated FIG. 26. The bottom of the flow control riser 410 is spaced apart and seals via bottom seal flange(s) 415 between it and the collection tube 420 to force the water to pass only through the orifices 435.

Figure 21:
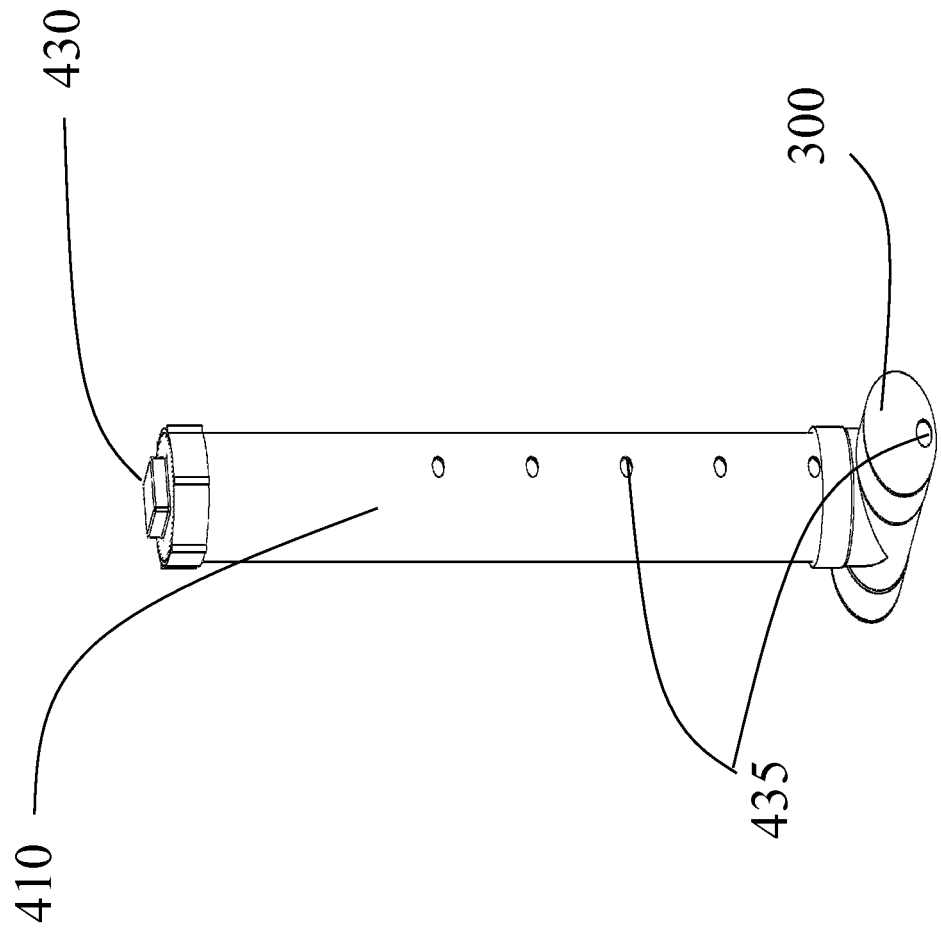
FIG. 21 is a three-dimensional view of a flow control riser with multiple orifices.

FIG. 21 presents the assembled flow control riser 410 with multiple orifices 435 with a cap 430 and connected to the chamber outlet tube 300. This alternate version of flow control riser 410 with multiple orifices 435 is located in a downstream discharge chamber 670 (FIG. 23). In this embodiment the flow control riser is 410 is not integrated into the collection tube 420, and it is mounted in a downstream discharge chamber 670. Water must flow through the orifices 435 and out of the flow control riser 410 in order to enter the discharge chamber 670.

Figure 22:
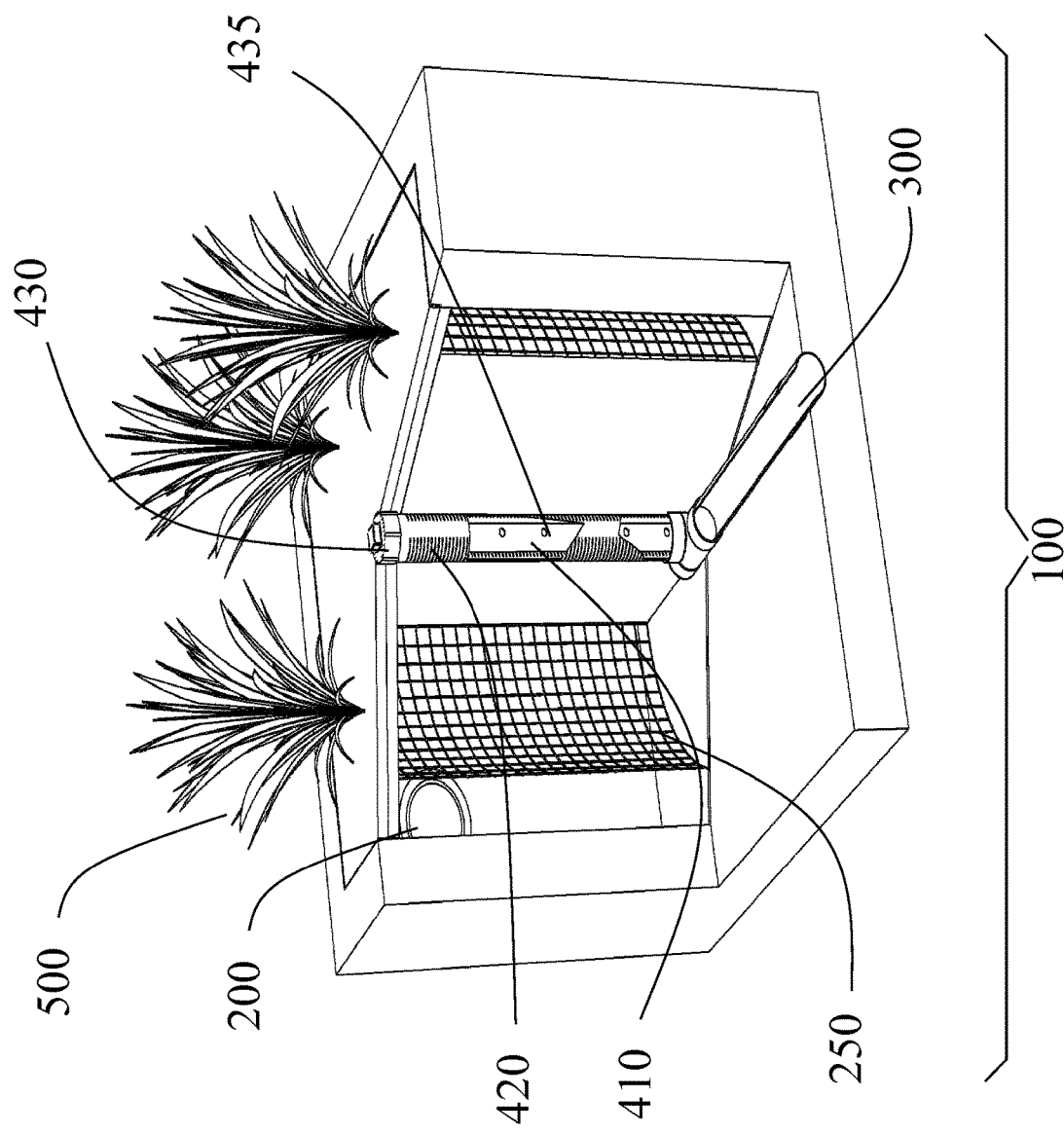
FIG. 22 is a cut-away view of a horizontal flow wetland biofilter system with flow 410 control riser with multiple orifices installed within a chamber of the horizontal flow wetland biofilter system with a catch basin.

FIG. 22 demonstrates how the flow control riser 410 with multiple orifices 435 is positioned within the collection tube 420 positioned in the center of the media filtration bed 400 within the chamber 100. In this embodiment the flow control riser 410 with multiple orifices 435 is included with top vegetation 500. This figure clearly shows the internal permeable walls/partitions 250 within the chamber 100 with an inlet pipe 200, surrounding the media filtration bed 400 in a round orientation.

FIG. 23 is a cutaway view of an assembled wetland biofilter system with a pretreatment chamber 610 presented in earlier figures and a discharge chamber 670. In this improved embodiment, the pretreatment chamber 610 is accessible via an access hatch 295, allowing for the maintenance of filter cartridges 170. The flow control riser 410 with multiple orifices 435 is located in the discharge chamber 670, rather than in the chamber 100.

Figure 24:
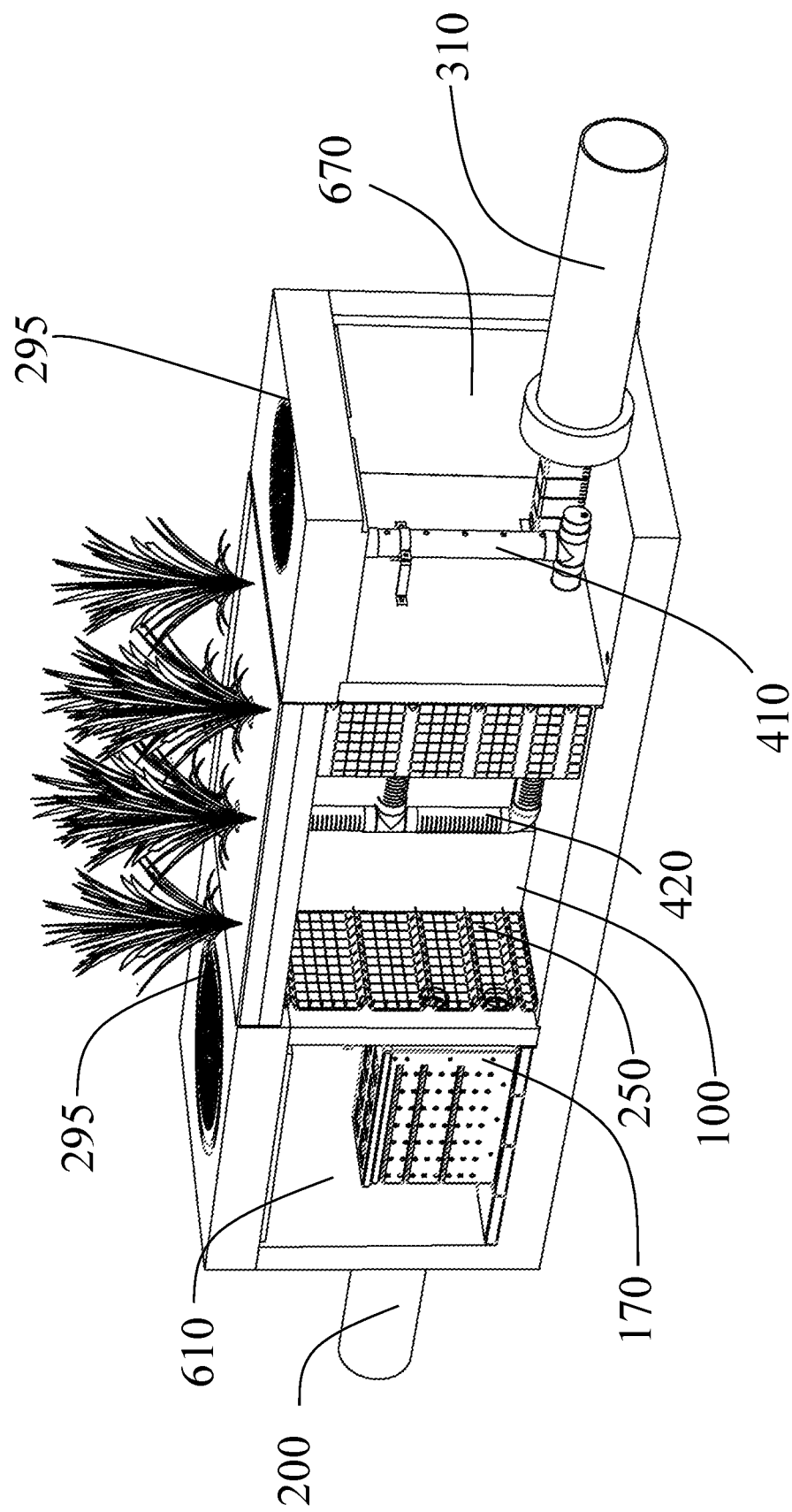
FIG. 24 is an iso view of a horizontal flow wetland biofilter system with flow control riser with multiple orifices installed within a within a horizontal flow wetland biofilter system with a catch basin.

FIG. 24 is an iso view of an alternate configuration of the assembled wetland biofilter system with the pretreatment chamber 610, chamber 100, and discharge chamber 670. The pretreatment chamber 670 has filter cartridges 170 and an access hatch 295. The pretreatment chamber 610 is connected upstream to the chamber 100, where water flows horizontally through the internal permeable walls/partitions 250 for further treatment via a media filtration bed 400 (not shown). Also, within the chamber is a collection tube 420 with perforated slots 425 mounted on the chamber wall 110. The collection tube 420 with perforated slots 425 does not have flow control riser 410 with multiple orifices 435 within it. The treated water continues to flow horizontally through the chamber 100 then into the downstream discharge chamber 670 where there is a flow control riser 410 with multiple orifices 435, then the treated water exits the system via the discharge outlet tube 310. An access hatch 295 may also be added to the discharge chamber 670 for easy maintenance.

Figure 25:
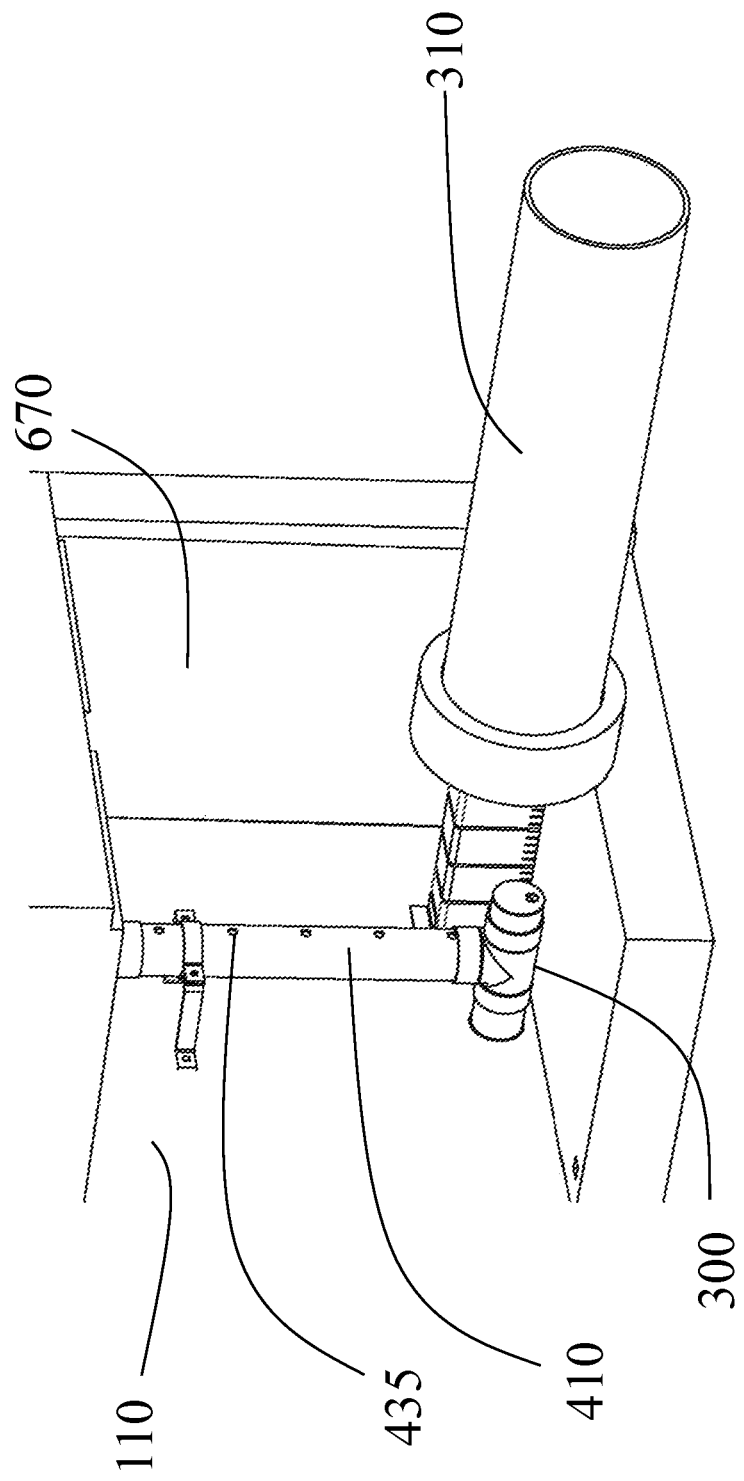
FIG. 25 is a cross-sectional view of the discharge chamber with flow control riser with multiple orifices coupled with a horizontal chamber outlet tube.

FIG. 25 is a close-up cut view illustrating the discharge chamber 670 with a flow control riser 410 with multiple orifices 435 as mounted to the wall 110 and the flow control riser 410 with multiple orifices 435 is also connected to the chamber outlet tube 300. Water flow through the discharge chamber. The controlled flow exits the discharge chamber 670 via discharge chamber outlet tube 310.

Figure 26:
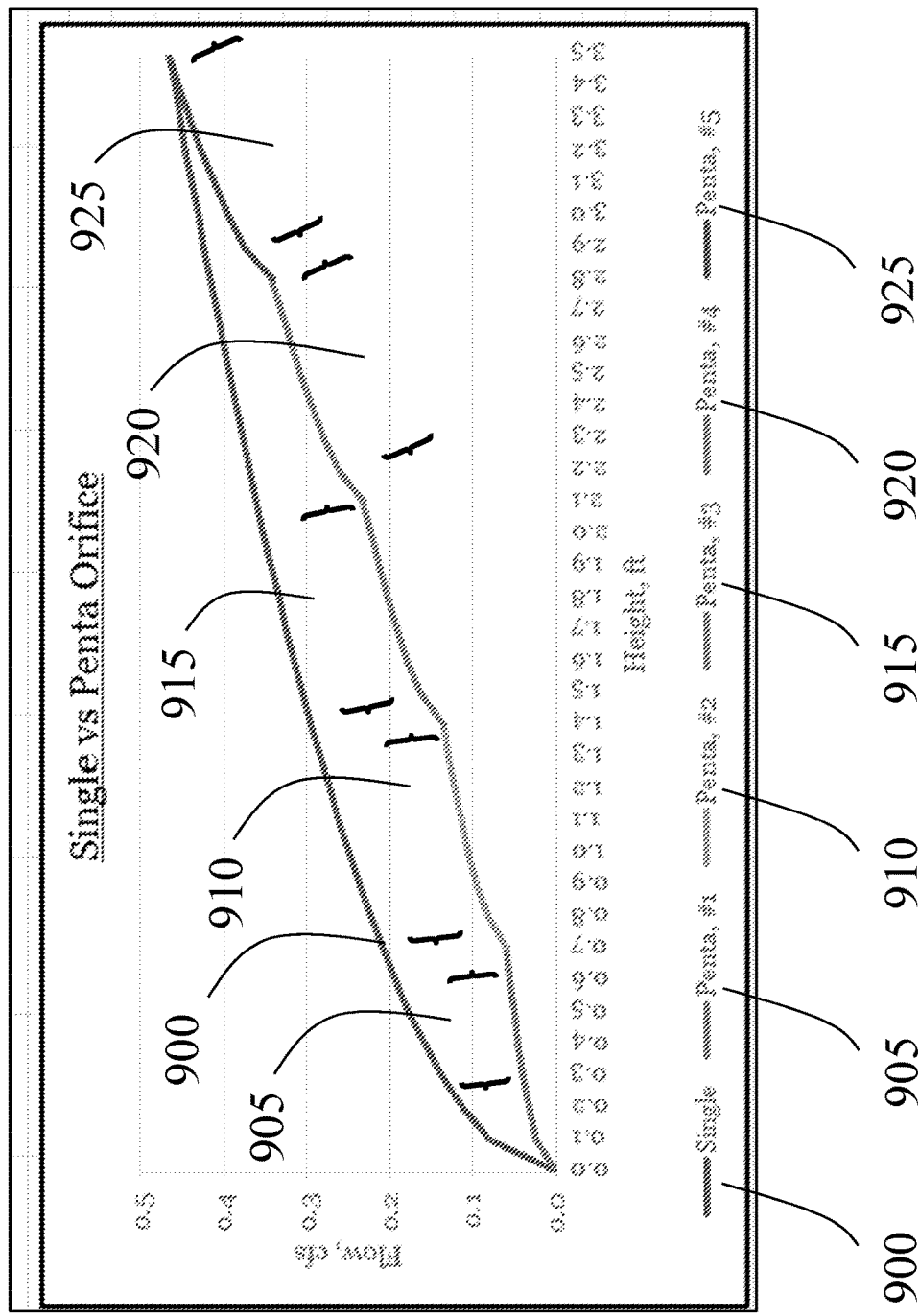
FIG. 26 presents third-party test results of the performance of a flow control riser with one orifice versus a flow control riser with five orifices.

FIG. 26 presents third-party testing data (2019) conducted by Good Harbours Laboratories located in Ontario, Canada. The testing data compares a collection tube 420 with a single orifice 440 (also known as a restriction plate) at the bottom to a collection tube 420 with an internal flow control riser 410 with multiple orifices 435. The water flow rate tested is measured in Flow, cubic feet per square (cfs) at different water heights, measured in feet (ft). The graph line, Single 900 (collection tube 420 with a single orifice 440) illustrates an initial fast rise and an overall slope (flow rate) significantly higher than that of a collection tube 420 with a flow control riser 410 with multiple orifices 435 (graph line data represented as Penta, #1 900, Penta, #2 905, Penta #3 910, Penta #4 915, Penta #5 920, and Penta #925). The summation of the graph lines for the multiple orifice 435 configuration provides better overall flow control at all water heights to optimize system performance.

The graph line, Single 900 illustrates minimal control over the flow rate on the y-axis as the height of water changes on the x-axis. In contrast, as the water level rises or falls in the wetland biofilter system chamber with a flow control riser 410 with multiple orifices 435 maintains a consistent flow to height ration as is illustrated by 905 as Penta #1, 910 as Penta #2, 915 as Penta #3, 920 as Penta #4, and 925 as Penta #5. The data of FIG. 26 specifically presents the performance a flow control riser 410 with five (penta) orifices 435 although configurations with fewer orifices 435 is possible and conceived of at the time of this invention.

FIG. 27 represents additional testing data taken at the same time period as FIG. 26 and shows the results of water Loading Rate versus HGL between a collection tube 420 with a single orifice 425 and a flow control riser 410 with five (penta) orifices 435. The "Loading Rate vs HGL" is measured in inches (in) per hour (hr). The graph line 930 spike is the loading rate when water first enters the chamber 100 (collection tube 420 with a single orifice 440). The flat line measuring 100 in/hr is the water loading rate 935, which represents the target loading rate. The line generally below 100 in/hr, water loading rate 935, is the Penta loading rate 940 of the flow controlling riser 410 with multiple orifices 435. The Penta loading rate 940 has a significantly lower peak as water enters the chamber 100 than the Single 930. As water flows through the system, the HGL as measured in feet of the Penta loading rate 940 drops below the target of the 100 in/hr is the water loading rate 935, thereby creating even better performance than is the standard.

Figure 10:
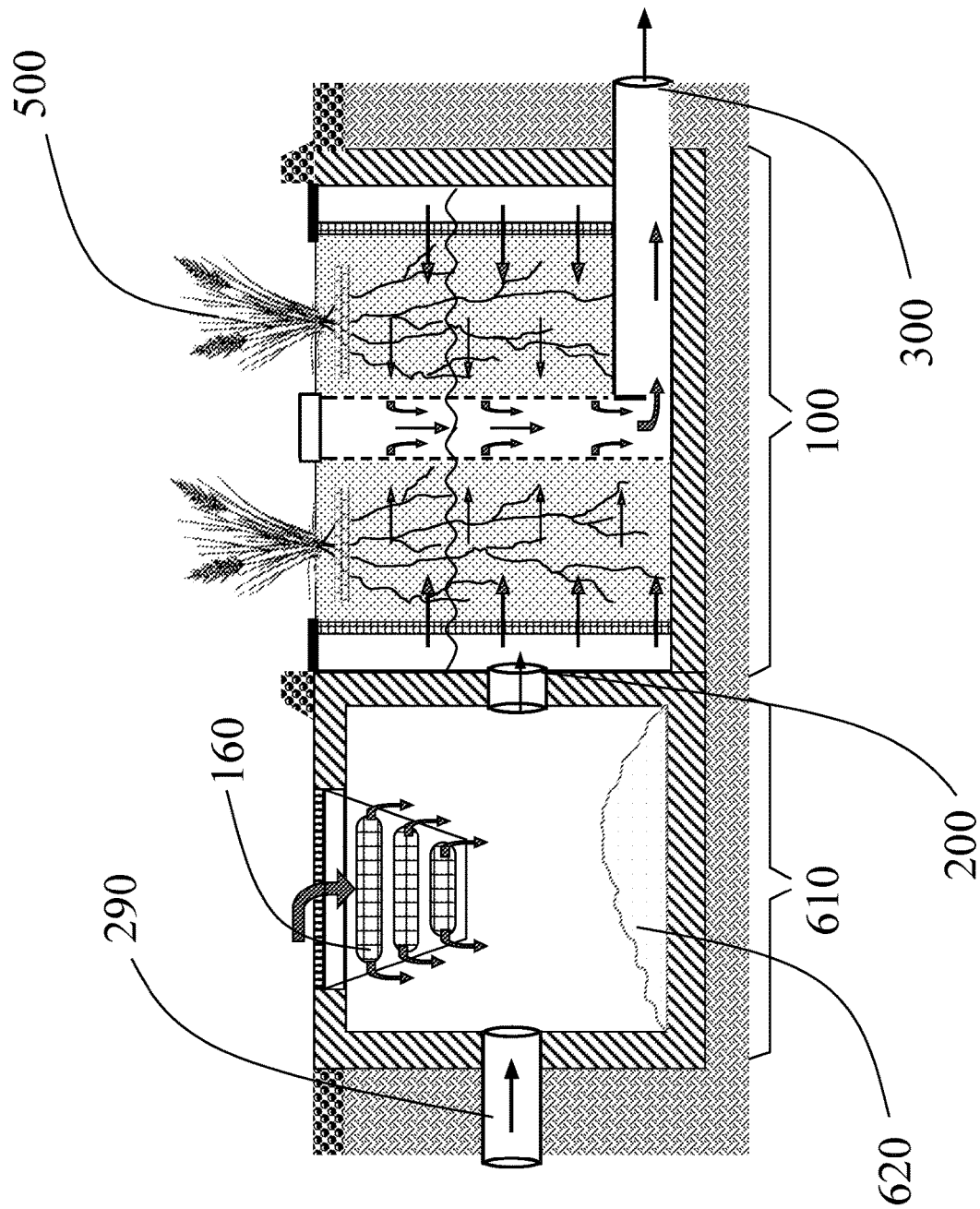
FIG. 10 is a side elevational section view of an embodiment of the horizontal flow wetland biofilter system where the adjoining chamber contains screens to remove trash and debris from inflowing water.
Figure 11:
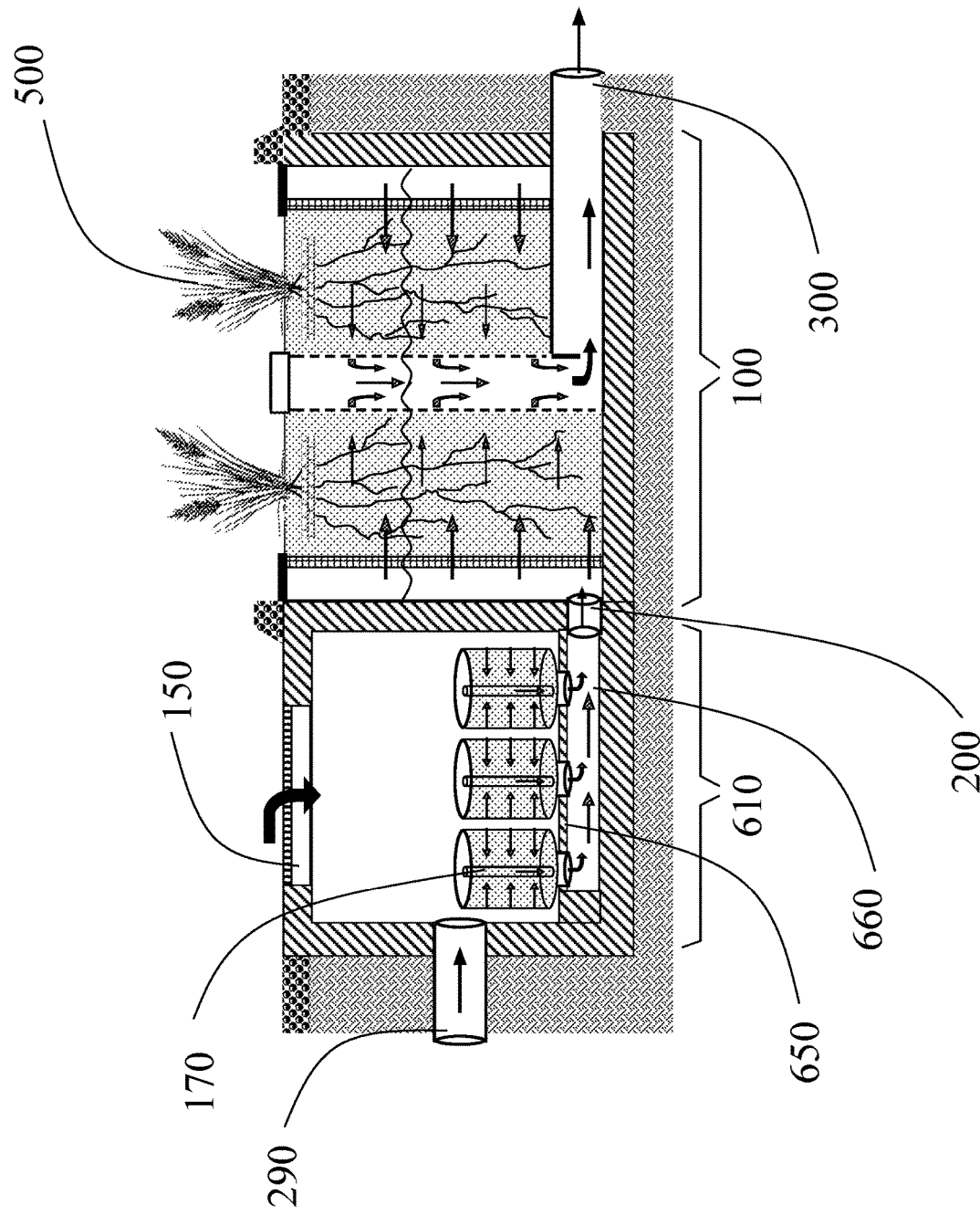
FIG. 11 is a side elevational section view of an embodiment of the horizontal flow wetland biofilter system where the adjoining chamber contains a plurality of media filter cartridges.

FIG. 28 builds on FIGS. 10, 11, and 24. It is a side view and includes the media filtration bed 400 with vegetation 500. It also clearly distinguishes the different types of horizontal pipes running through the entire horizontal flow wetland biofilter system, including the inlet pipe 200, the chamber outlet tube 300, and the discharge outlet tube 310. In this embodiment, water may enter the system via in inlet pipe 200 or a grated opening 150 and is first collected in the pretreatment chamber 610. In this illustration, the grated opening 150 includes a screening basket 160. The screening basket 160 can help prevent trash and debris from entering the horizontal wetland biofilter system. Also, within the pretreatment chamber 610, there are filter cartridges 170 to enhance the stormwater treatment process by capturing finer particulates and pollutants suspended in the water. The filter cartridges 170 sit on false floor 650. Below the false floor is a drain pipe 660 which ushers the treated water into the chamber outlet tube 300, which can run through multiple chambers as seen here. The water exits the pretreatment chamber 610, entering the perimeter catch basin 230 before encountering the media filtration beds 400 and, in this embodiment, above ground vegetation 500. In this illustration, the flow control riser 410 with multiple orifices 435 is not depicted in the collection tube 420 with horizontally perforated slots 425 but its inclusion would be obvious based on information already described herein. After filtration through the media filtration bed 400, water drains down the collection tube 420 with horizontally perforated slots 425 at a slower rate because of the restriction plate (with single orifice configuration) 440 connected to the chamber outlet tube 300 which leads to the discharge chamber 670.

Alternatively, FIG. 28a presents a flow control riser 410 with multiple orifices 435 within the discharge chamber wall 670 and connected to the chamber outlet tube 300. Finally, treated water exits the horizontal flow wetland biofilter system via the discharge chamber outlet tube 310.

Figure 29:
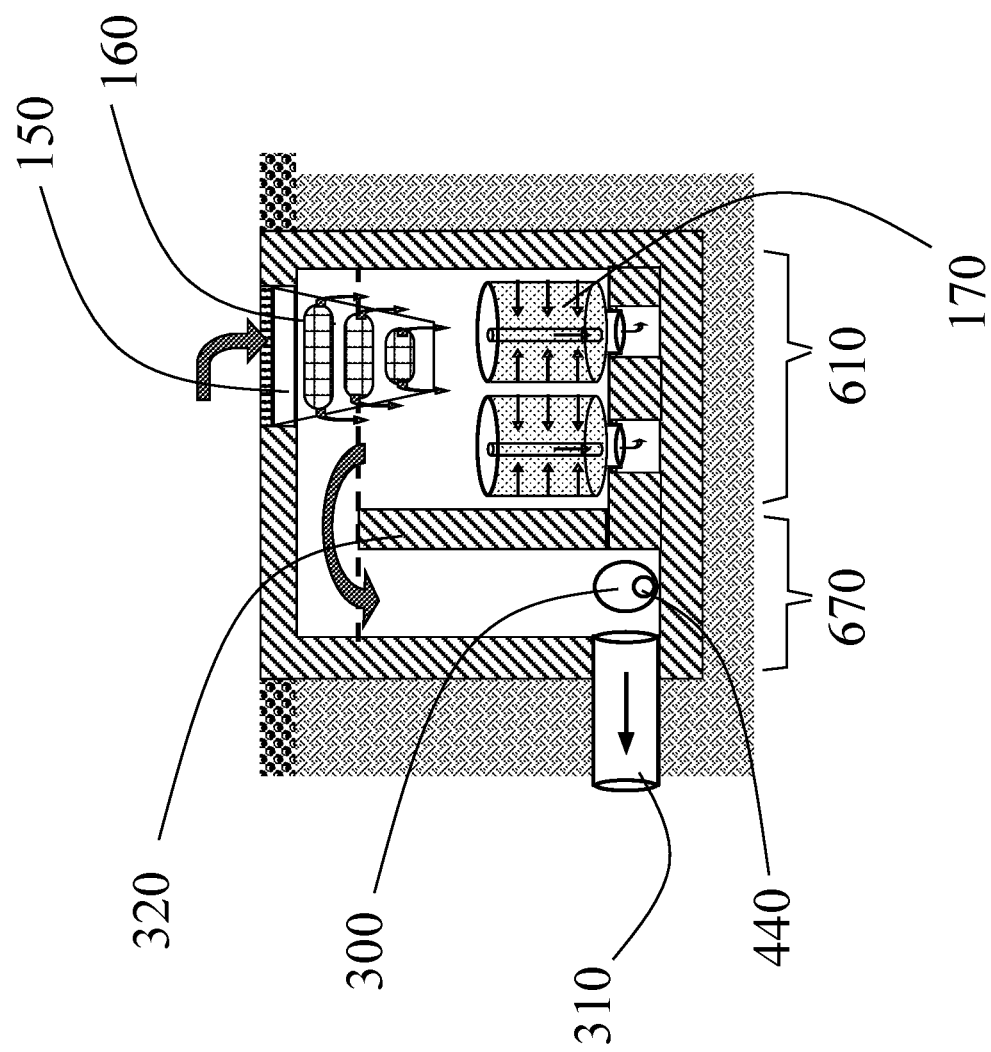
FIG. 29 is an end view of the pretreatment chamber and discharge chamber with a screening basket and a high flow bypass weir wall.

FIG. 29 illustrates a pretreatment chamber 610 with a high flow bypass weir wall 320 and includes a grated opening 150, screening basket 160, filter cartridges 170, the horizontal outlet tube 300, the restriction plate 440, discharge chamber 670, and discharge chamber outlet pipe 310.

Figure 30:
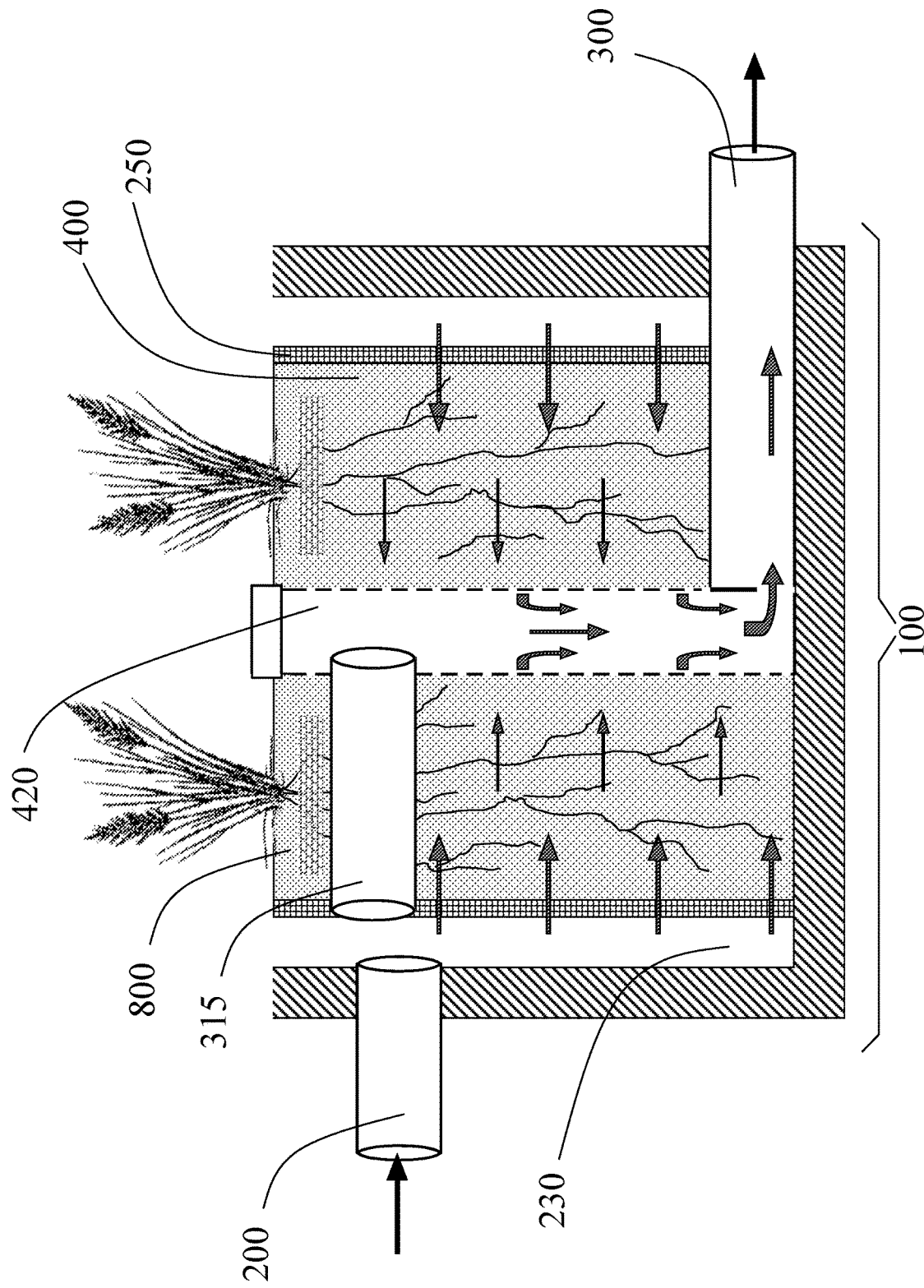
FIG. 30 is a side elevational section view of an embodiment of the horizontal flow wetland biofilter system with a high flow bypass pipe.

FIG. 30 illustrates the chamber 100 with a high flow bypass pipe 315. Also identified from left to right is the inlet pipe 200, perimeter catch basins 230, internal permeable walls/partitions 250, media filtration beds 400, soil-less inert growing media 800 to help plants propagate, a collection tube 420 with perforated slots 425, and a horizontal outlet tube 300.

Figure 31:
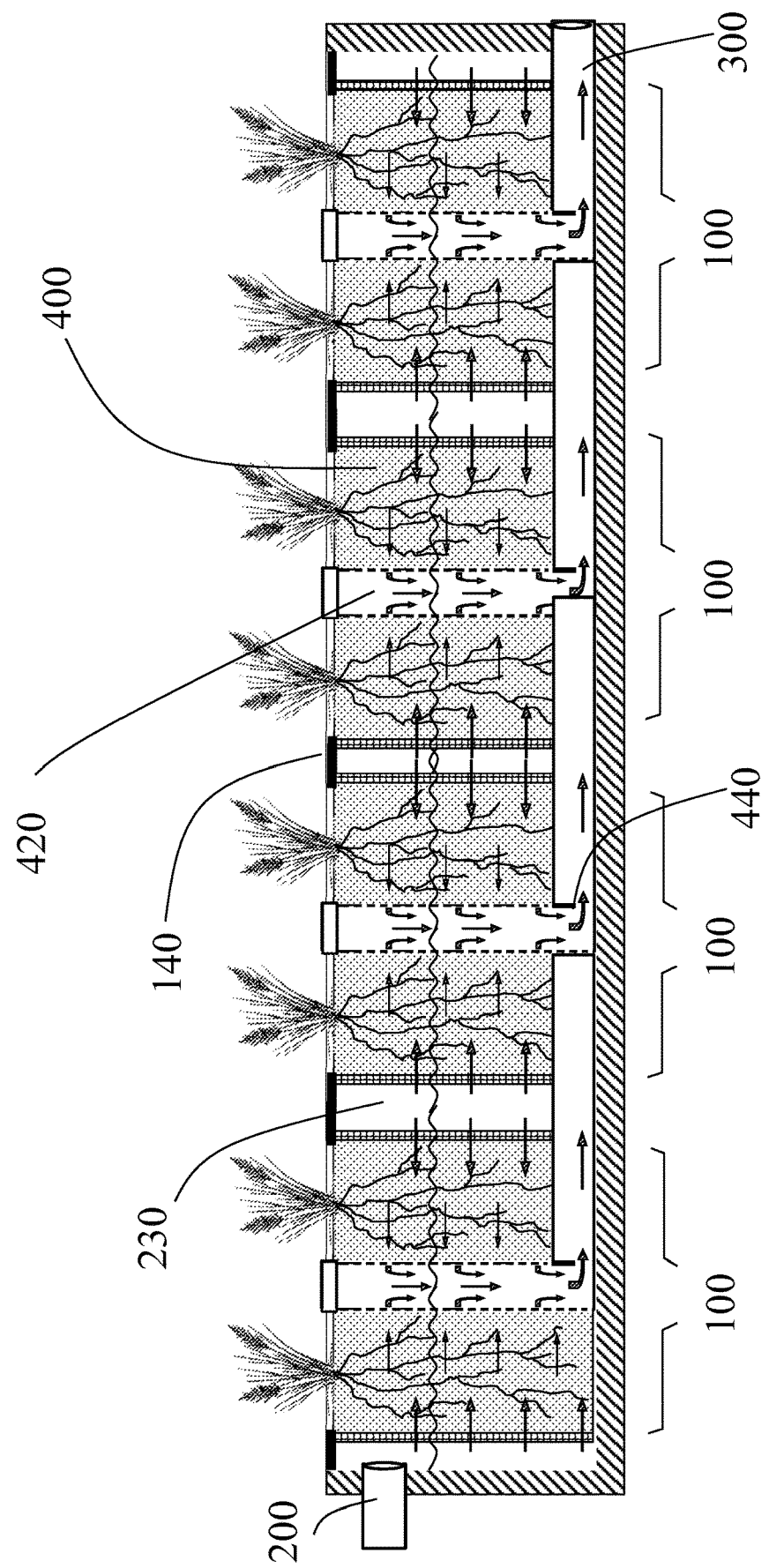
FIG. 31 is a side elevational section view of an embodiment of multiple horizontal flow wetland biofilter chambers with filtration media and vegetation assembled side-by-side.

FIG. 31 begins to demonstrate an alternate embodiment of the invention where more than one chamber 100 is positioned side-by-side. This allows for larger wetland biofilter systems to be installed depending on the site-specific needs for stormwater management. Also identified is the inlet pipe 200, perimeter catch basins 230, collection tubes 420 with horizontally perforated slots 425 within individual media filtration beds 400, restriction plates (single orifice configuration) 440, and the chamber outlet tube 300.

Figure 31A:
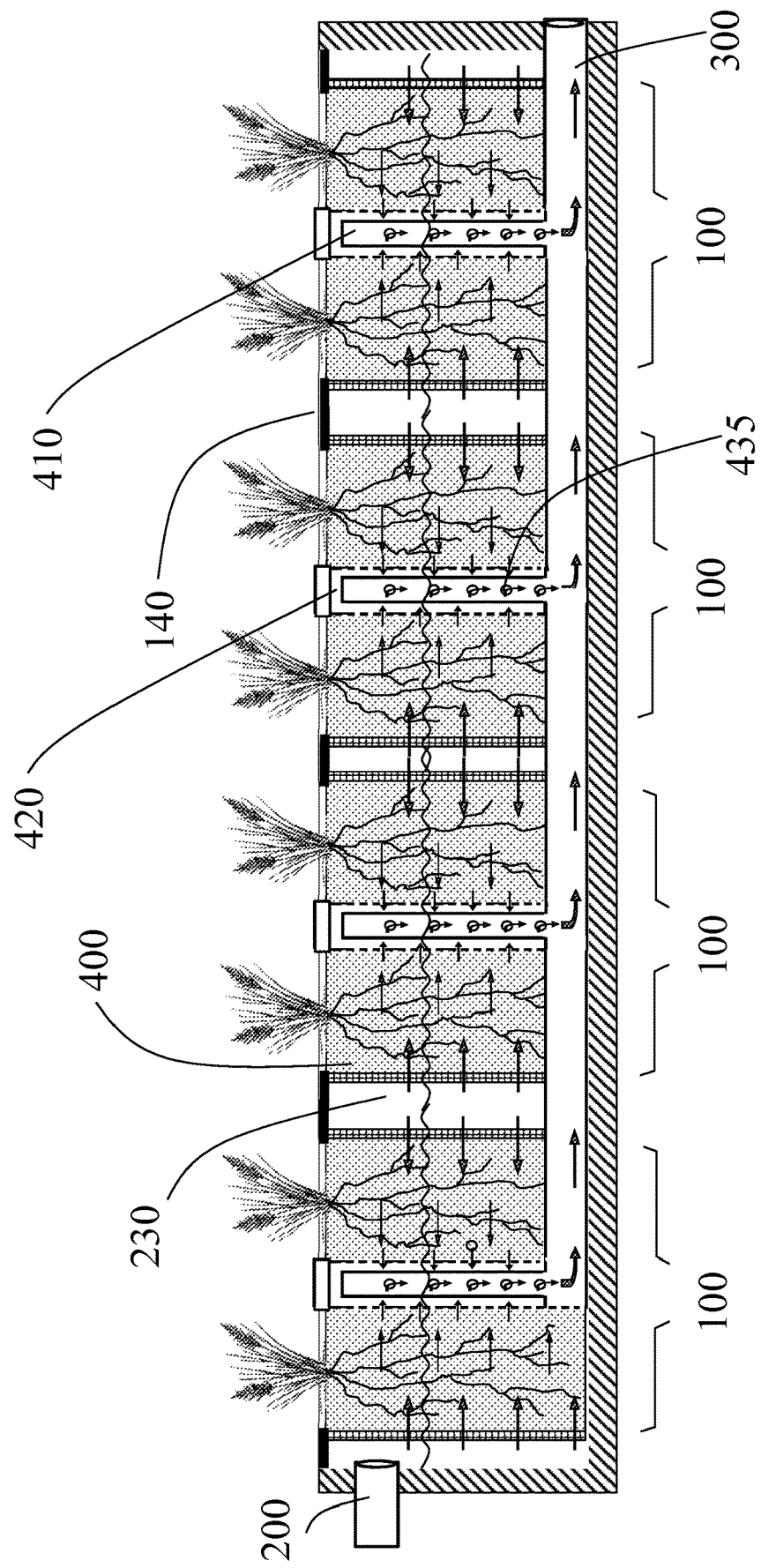
FIG. 31a is a side elevational section view of an embodiment of multiple horizontal flow wetland biofilter chambers with filtration media and vegetation assembled side-by-side and with flow control risers with multiple orifices.

FIG. 31a is an alternate embodiment of FIG. 31 wherein collection tubes 420 with horizontally perforated slots 425 also includes an internal flow control riser 410 with multiple orifices 435. Alternatively, 31a does not include restriction plates (single orifice configuration) 440.

FIG. 32 is a top view demonstrating the water flow between the perimeter catch basins 230 and media filtration beds 400 when more than one chamber 100 is side-by-side and end-to-end. Components of the horizontal flow wetland biofilter system identified here also include: the inlet pipe 200, chamber walls 110, collection tubes 420 with horizontally perforated slots 425, and the chamber outlet tube 300. The inclusion of multiple chambers allows for more filtration in locations where larger capacity is needed.

FIG. 33 is an alternate top view demonstrating the water flow between the perimeter catch basins 230 and media filtration beds 400 when more than one chamber 100 is side-by-side and end-to-end and when chambers 100 are preceded by a pretreatment chamber 610 and the horizontal flow wetland biofilter system also includes a pretreatment chamber 610 discharge chamber 670.

FIG. 34 demonstrates an alternate configuration of FIG. 33 where the horizontal flow wetland biofilter system has a larger footprint for larger stormwater management projects. The chambers 100 are still side-by-side and end-to-end. Also shown is the inlet pipe 200 and the chamber outlet tube 300.

Figure 35:
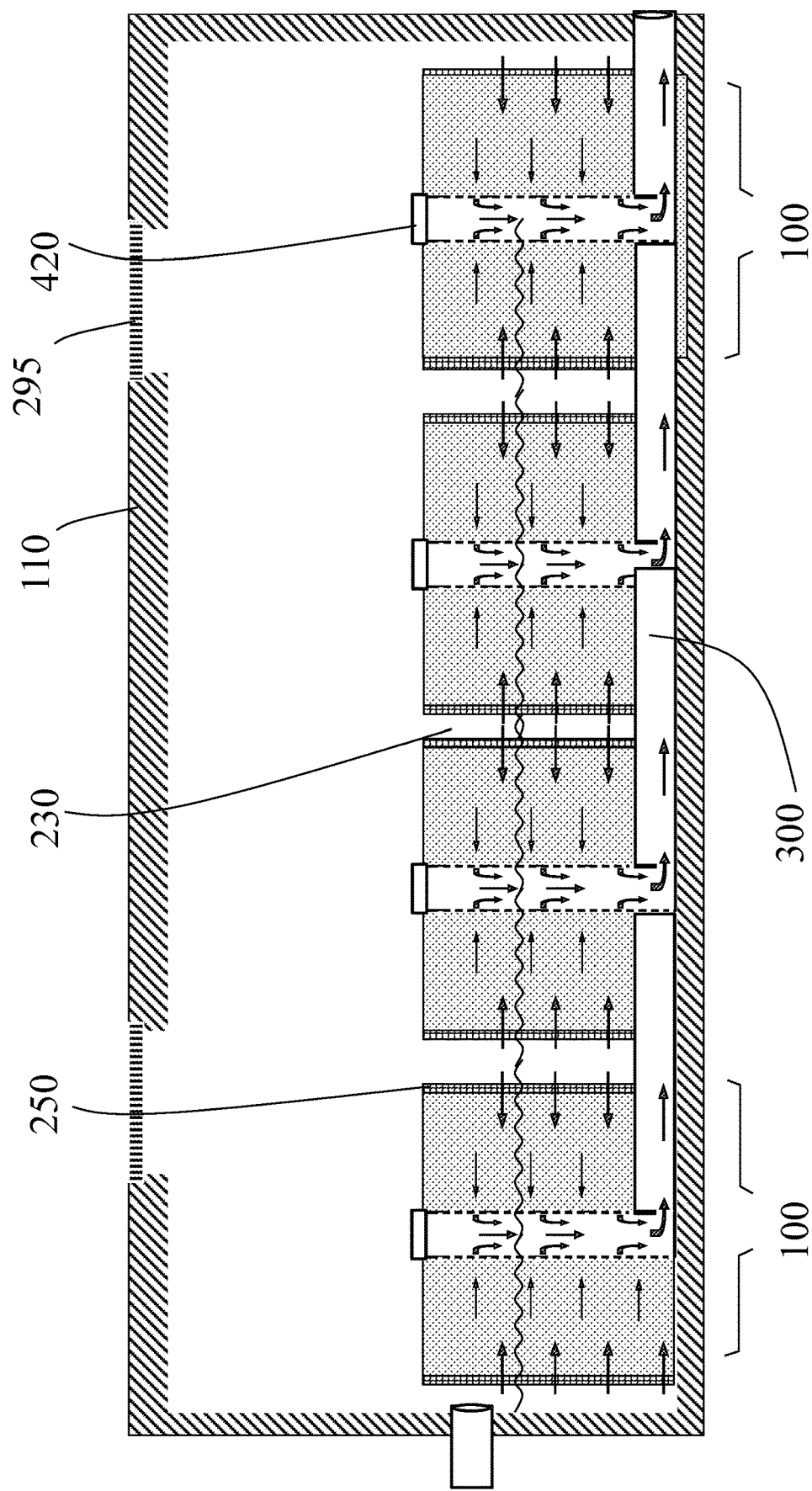
FIG. 35 is side elevational section view of another embodiment of multiple underground horizontal flow wetland biofilter chambers.

FIG. 35 presents several chambers 100 side-by-side in an underground configuration with perimeter catch basins 230 with multiple access hatches 295. Also shown chamber walls 100, and the chamber outlet tube 300.

FIG. 36 is a top view of a variation of FIG. 34 where the chambers 100 are side-by-side and end-to-end in combination with pretreatment chambers 610 and discharge chambers 670 and where there are multiple inlet pipes 200 and outlet chamber pipes 300.

Implementation

In general, the invention is used for the treatment of stormwater and similar contaminated water sources. This system is designed to be utilized in urbanized or other developed areas in which the percentage of impervious areas is generally high. The invention when utilized by those skilled in the art is generally placed adjacent to any impervious area which generates rainwater runoff or runoff of other contaminated waters from its surface. The invention also can be directly connected to specific point sources of contaminated waters. When used in stormwater applications the system is generally used to treat rainwater and runoff generated by human activities such an irrigation, car washing, and similar which are generated from parking lots, road ways, public plazas, industrial facilities, freeways and rooftops. Since the system has an open top and contains live vegetation, the system is generally located adjacent to hardscape or impervious areas when some form of landscaping exists. The invention is generally located above ground with the top of the chamber equal to the finish surface. In some embodiments the invention is located above ground (raised up) to accept waters from rooftops or elevated plazas or bridges.

Figure 19:
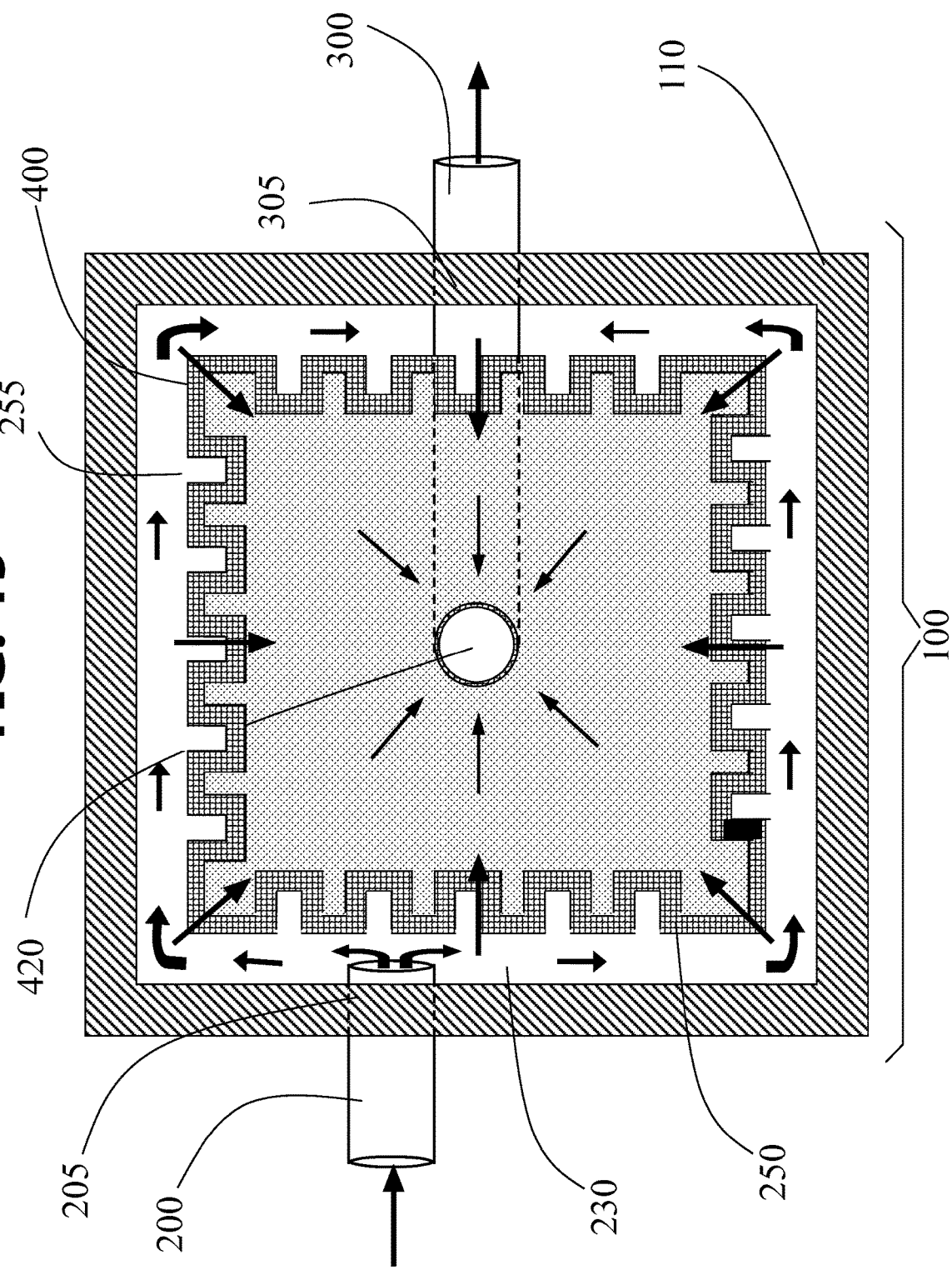
FIG. 19 is a top plan view of an embodiment of the horizontal flow wetland biofilter system illustrating a permeable inner wall with an irregular surface area.

The modular design of the treatment chamber makes it easily scalable to various sizes and shapes, though generally square or rectangular. The concept of this invention also will work in a round orientation. The horizontal flow path through the media which makes it unique to biofiltration systems in this field offers several advantages. As mentioned, the flow orientation of this invention minimizes clogging concerns when compared to downward flow systems. The invention also creates up to four times the media surface area for a given volume of a media filtration bed 400. In one embodiment illustrated in FIG. 19, the interior walls/partitions 250 of the media filtration bed 400 may have an irregular shape with a series of grooves 255 along its sides, further increasing the surface area which interacts with the incoming influent. The horizontal flow path of the invention also offers allows for several individual chambers to be placed side-by-side or side-by-side and end-to-end in series without any hydraulic drop in the chamber. By doing so, several chambers can be placed in series, with each successive chamber containing a filter media that offers higher levels of treatment. One example of this would be for the first chamber to contain perlite to remove particulates, the next chamber housing polymers to remove hydrocarbons, and the following chamber housing activated alumina to remove dissolved nutrients.

The invention also can be placed adjacent to an upstream storage system. The advantage of this invention is no hydraulic head drop is required between the bottom of the storage system and the bottom on the said inventions floor. With stormwater requirements moving toward volume base design a biofilter system which is easy to adapt downstream to a storage system is of need.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

What is claimed is:

1. A biofilter chamber comprising:
one or more outer side walls defining a first chamber;
a first media filtration bed disposed within the first chamber and enclosed by one or more permeable inner side walls, the inner side walls being separated from the outer side walls by a void area for receiving an influent; whereas
a permeable collection tube is disposed within the first media filtration bed configured to collect the influent from the first media filtration bed as filtered influent; the permeable collection tube, containing within it, a flow control riser,
said flow control riser contains one or more orifices, arranged vertically along the flow control riser, and a bottom seal flange, such that filtered influent entering the permeable collection tube must pass through the one or more orifices in the flow control riser at a rate less than a flow rate capacity of the permeable collection tube, and
said permeable collection tube and flow control riser are connected to a horizontal chamber outlet tube, said horizontal chamber outlet tube protruding through a chamber wall opening to an outside of the first chamber, the chamber wall opening configured to receive the filtered influent from the permeable collection tube via the chamber outlet tube.

2. The biofilter chamber of claim 1, further comprising one or more additional media filtration beds within the first chamber, each of said one or more additional media filtration beds having its own surrounding permeable one or more inner side walls, a permeable collection tube being disposed within each of said one or more additional media filtration beds, containing within it, a flow control riser containing one or more orifices.

3. The biofilter chamber of claim 2, further comprising a high flow bypass mechanism coupled to the permeable collection tube of the first media filtration bed, the high flow bypass mechanism configured to allow the influent to flow around the first media filtration bed to the chamber wall opening.

4. The biofilter chamber of claim 1, wherein the first media filtration bed contains live plant material.

5. The biofilter chamber of claim 1, wherein the first chamber contains a floor section.

6. The biofilter chamber of claim 5, wherein the permeable collection tube outlets through the floor section.

7. The biofilter chamber of claim 1, further comprising a second chamber coupled to the permeable collection tube, the second chamber being positioned below the first chamber.

8. The biofilter chamber of claim 1, wherein the influent enters directly into the void area directly from above the one or more outer side walls.

9. The biofilter chamber of claim 1, further comprising a removable permeable cover disposed over the void area.

10. The biofilter chamber of claim 1, further comprising a removable impermeable cover disposed over the void area.

11. The biofilter chamber of claim 1, wherein the first media filtration bed contains one or more granular filtration media comprising organic, inert, or sorptive substances that provide physical, chemical and biological filtration of contaminants from the influent.

12. The biofilter chamber of claim 1, wherein the one or more outer side walls comprise an intake opening into the void area.

13. The biofilter chamber of claim 1, further comprising an outlet tube disposed horizontally across a lower portion of the first chamber and coupling the permeable collection tube to the chamber wall opening.

14. The biofilter chamber of claim 1, wherein the permeable collection tube extends from a top portion of the media filtration bed to a lower portion of the media filtration media bed.

15. The biofilter chamber of claim 1, further comprising an orifice disposed between the permeable collection tube and the outlet tube, the orifice configured to have a lower flow rate of the filtered influent than a flow rate of the influent through the first media filtration bed.

16. The biofilter chamber of claim 1, further comprising a second chamber coupled to the first chamber in parallel.

17. The biofilter chamber of claim 16, further comprising one or more additional chambers, in addition to the second chamber, coupled to the first chamber.

18. The biofilter chamber of claim 1, wherein the void area comprises a substantially hollow structural matrix.

19. The biofilter chamber of claim 1, further comprising a settling chamber coupled to the first chamber and configured to discharge fluid into the void area as the influent.

20. The biofilter chamber of claim 19, wherein the settling chamber comprises a screening device.

21. The biofilter chamber of claim 1, further comprising a media filter cartridge chamber coupled to the first chamber, the media filter cartridge chamber having one or more media cartridges and being positioned upstream of the first chamber and configured to discharge fluid into the void area as the influent.

22. The biofilter chamber of claim 1, further comprising a discharge chamber coupled to the first chamber and configured to accept the filtered influent from the first chamber.

* * * * *